United States Patent
Young

(10) Patent No.: US 10,008,178 B2
(45) Date of Patent: Jun. 26, 2018

(54) APPARATUS, METHODS, AND SYSTEMS FOR MULTI-PRIMARY DISPLAY OR PROJECTION

(71) Applicant: Prism Projection, Inc., Sully, IA (US)

(72) Inventor: Garrett Joseph Young, Sully, IA (US)

(73) Assignee: Prism Projection, Inc, Sully, IA (US)

( * ) Notice: Subject to any disclaimer, the term of this patent is extended or adjusted under 35 U.S.C. 154(b) by 640 days.

(21) Appl. No.: 14/147,109

(22) Filed: Jan. 3, 2014

(65) Prior Publication Data

US 2014/0118424 A1    May 1, 2014

Related U.S. Application Data

(60) Continuation of application No. 12/952,854, filed on Nov. 23, 2010, now Pat. No. 8,624,941, which is a
(Continued)

(51) Int. Cl.
*G03B 21/16* (2006.01)
*G09G 5/02* (2006.01)
(Continued)

(52) U.S. Cl.
CPC .................. *G09G 5/02* (2013.01); *G01J 1/32* (2013.01); *G01J 3/506* (2013.01); *G01J 3/51* (2013.01);
(Continued)

(58) Field of Classification Search
CPC .. G03B 21/006; G03B 21/16; G03B 21/0046; G03B 21/0073; G03B 21/0088; G02B 6/009; H01L 23/367; H01L 23/427
See application file for complete search history.

(56) References Cited

U.S. PATENT DOCUMENTS 6,570,584 B1   5/2003   Cok et al.
6,633,302 B1   10/2003  Ohsawa et al.
(Continued)

FOREIGN PATENT DOCUMENTS

EP   1528315 A2   5/2005
EP   1569467 A2   8/2005
(Continued)

OTHER PUBLICATIONS

"U.S. Appl. No. 11/557,861, Final Office Action mailed Oct. 8, 2010", 11 pgs.
(Continued)

*Primary Examiner* — Sultan Chowdhury
(74) *Attorney, Agent, or Firm* — Schwegman, Lundberg & Woessner, P.A.

(57) ABSTRACT

An apparatus, methods, and systems for multi-color projection or display for video or lighting applications. One aspect of the present invention comprises an algorithm for utilizing at least four primary light sources to represent a projected pixel color. The algorithm and associated system can be applied to both a natively monochromatic light source or traditional light sources filtered for their colored components. The algorithm can be used for either color sequential or parallel modes of operation. The algorithm takes input pixel data represented in a universal color coordinate system, performs a color transform, and disperses the results among parallel display devices or sequentially to a single device such that each pixel is presented by the combination of four or more primaries.

19 Claims, 33 Drawing Sheets

Related U.S. Application Data division of application No. 11/557,861, filed on Nov. 8, 2006, now Pat. No. 7,859,554.

(60) Provisional application No. 60/734,701, filed on Nov. 8, 2005.

(51) Int. Cl.
| | |
|---|---|
| G01J 1/32 | (2006.01) |
| G01J 3/50 | (2006.01) |
| G01J 3/51 | (2006.01) |
| G03B 21/20 | (2006.01) |
| G03B 33/04 | (2006.01) |
| H04N 9/31 | (2006.01) |

(52) U.S. Cl.
CPC ........... *G03B 21/16* (2013.01); *G03B 21/206* (2013.01); *G03B 21/2013* (2013.01); *G03B 21/2033* (2013.01); *G03B 33/04* (2013.01); *H04N 9/3155* (2013.01)

(56) References Cited

U.S. PATENT DOCUMENTS

| | | | |
|---|---|---|---|
| 6,683,421 B1 * | 1/2004 | Kennedy | B29C 35/0288 315/149 |
| 6,870,523 B1 | 3/2005 | Ben-David et al. | |
| 6,873,339 B2 | 3/2005 | Ohsawa et al. | |
| 6,922,198 B2 | 7/2005 | Lee et al. | |
| 6,962,414 B2 | 11/2005 | Roth | |
| 6,984,043 B2 | 1/2006 | Nakamura et al. | |
| 7,004,602 B2 | 2/2006 | Waters | |
| 7,095,187 B2 | 8/2006 | Young | |
| 7,119,500 B2 | 10/2006 | Young | |
| 7,119,501 B2 | 10/2006 | Young | |
| 7,132,805 B2 | 11/2006 | Young | |
| 7,208,881 B2 | 4/2007 | Young | |
| 7,212,359 B2 * | 5/2007 | Richards | H04N 9/3111 348/743 |
| 7,598,961 B2 | 10/2009 | Higgins | |
| 7,626,345 B2 | 12/2009 | Young | |
| 7,859,554 B2 | 12/2010 | Young | |
| 7,956,556 B1 | 6/2011 | Gordin et al. | |
| 8,624,941 B2 | 1/2014 | Young | |
| 2002/0135741 A1 * | 9/2002 | Lee | G03B 21/16 353/61 |
| 2003/0024698 A1 * | 2/2003 | Bosak, III | H01L 23/367 165/185 |
| 2003/0214499 A1 | 11/2003 | Ohsawa et al. | |
| 2004/0021833 A1 * | 2/2004 | Koide | G02B 27/102 353/31 |
| 2004/0046939 A1 | 3/2004 | Nakamura et al. | |
| 2004/0057027 A1 * | 3/2004 | Tani | G03B 21/208 353/102 |
| 2004/0252130 A1 | 12/2004 | Lee et al. | |
| 2005/0062937 A1 * | 3/2005 | Imade | F21S 6/003 353/31 |
| 2005/0083341 A1 | 4/2005 | Higgins et al. | |
| 2005/0156103 A1 | 7/2005 | May et al. | |
| 2005/0201107 A1 * | 9/2005 | Seki | G03B 21/16 362/373 |
| 2005/0212728 A1 | 9/2005 | Miller et al. | |
| 2005/0225232 A1 | 10/2005 | Boroson et al. | |
| 2007/0091281 A1 * | 4/2007 | Radominski | G03B 27/54 353/94 |
| 2011/0157245 A1 | 6/2011 | Young | |

FOREIGN PATENT DOCUMENTS

| | | |
|---|---|---|
| EP | 1692585 A2 | 8/2006 |
| EP | 1852000 A2 | 11/2007 |
| GB | 2389706 | 12/2003 |
| WO | WO-2005060409 A2 | 7/2005 |
| WO | WO-2006091398 A2 | 8/2006 |
| WO | WO-2006110286 A2 | 10/2006 |
| WO | WO-2006110286 A3 | 10/2006 |
| WO | WO-2007056541 A2 | 5/2007 |

OTHER PUBLICATIONS

"U.S. Appl. No. 11/557,861, Non-Final Office Action mailed Apr. 16, 2010", 14 pgs.
"U.S. Appl. No. 11/557,861, Notice of Allowance mailed Nov. 12, 2010", 4 pgs.
"U.S. Appl. No. 11/557,861, Response filed Jul. 15, 2010 to Non Final Office Action mailed Apr. 16, 2010", 24 pgs.
"U.S. Appl. No. 11/557,861, Response filed Oct. 25, 2010 to Final Office Action mailed Oct. 8, 2010", 16 pgs.
"U.S. Appl. No. 11/557,861, Restriction Requirement mailed Dec. 14, 2009", 12 pgs.
"U.S. Appl. No. 11/557,861, Restriction Requirement mailed Sep. 9, 2009", 9 pgs.
"U.S. Appl. No. 12/952,854, Notice of Allowance mailed Sep. 3, 2013", 10 pgs.
"European Application Serial No. 06827685.6, Examination Notification Art. 94(3) mailed Dec. 9, 2010", 3 Pgs.
"European Application Serial No. 06827685.6, Response filed Jun. 17, 2011 to Examination Notification Art. 94(3) mailed Dec. 9, 2010", 18 pgs.
"Featured Technology: Liquid Cooling System (LCS) for Microprocessor Thermal Management", Thermacore International. [online]. [archived Jun. 17, 2005]. Retrieved from the Internet: <URL: http://web.archive.org/web/20050617080253/http://www.thermcore.corm>, 1 pg.
"International Application Serial No. PCT/US2006/043696, Preliminary Report on Patentability mailed Jun. 2, 2008", 11 pgs.
"International Application Serial No. PCT/US2006/043696, International Search Report and Written Opinion mailed Aug. 30, 2007", 19 pgs.
"PID Controller", Wikipedia. Nov. 5, 2005, Nov. 7, 2005. <http://www.en.wikipedia.org/wiki/PID_controller>, (2007), 12 pgs.
"Polarization Recycling for Lighting LCDs More Efficiently", [online]. [retrieved Aug. 31, 2005]. Retrieved from the Internet: <URL: http://web.archive.org/web/20050831083624/www.nasatech.com/Briefs/June01/NPO20824.html, (Jun. 1, 2001), 3 pgs.
"RGB/XYZ Matrices", (Undated), 1 pg.
"Sensing color with the TAOS TCS230", (c) 2005 TAOS, Inc., (2005), 15 pgs.
"Symbology Overlay", DDC Digital Design Corporation [online]. [archived May 6, 2006]. Retrieved from the Internet: <URL: http://web.archive.org/web/20060506171116/http://www.digidescorp.com/products/IP/DataSheets/DDC_symbology_overlay.pdf>, (2006), 4 pgs.
"The TAOS Inc. Product Family", (c) 2005 TAOS Inc. / Texas Advanced Optoelectronic Solutions. [online]. [archived Oct. 24, 2005]. Retrieved from the Internet: <URL: http://web.archive.org/web/20051024004240/http://www.taosinc.com/>, (2005), 1 pg.
"What is a Heatpipe?", Thermacore Europe. [online]. [archived Mar. 6, 2005]. Retrieved from the Internet:: <URL: http://web.archive.org/web/20050306123815/http://www.thermacore-europe.com/>, (2005), 1 pg.
Davis, W., et al., "Color quality scale", Optical Engineering, vol. 49(3), (Mar. 2010), 033602-1-033602-16.
Lindbloom, Bruce Justin, "RGB/XYZ Matrices", <http://www.brucelindbloom.com/index.html?Eqn_RGB_XYZ_Matrix.html>, (Apr. 20, 2003, Nov. 7, 2005).
Muthu, Subramanian, et al., "Red, Green and Blue LED-based White Light Source: Implementation Challenges and Control Design", Industry Applications Conference 2003, 38th IAS Annual Meeting vol. 1: 515-522, (Oct. 12-16, 2003), 515-522.
Poynton, Charles, "Sensing color with the TAOS TCS230", TAOS, Inc., (May 17, 2005), 1-15.

* cited by examiner

APPARATUS, METHODS, AND SYSTEMS FOR MULTI-PRIMARY DISPLAY OR PROJECTION

CROSS-REFERENCE TO RELATED APPLICATION

This application is a continuation of and claims the benefit of priority under 35 U.S.C. § 120 to U.S. patent application Ser. No. 12/952,854, filed Nov. 23, 2010, which is a divisional of and claims the benefit of priority under 35 U.S.C. § 120 to U.S. patent application Ser. No. 11/557,861, filed Nov. 8, 2006, which claims the benefit of priority under 35 U.S.C. § 119(e) U.S. Provisional Patent Application Ser. No. 60/734,701, Filed Nov. 8, 2005, the benefit of priority of each of which is claimed hereby, and each of which are incorporated by reference herein in its entirety.

I. BACKGROUND OF THE INVENTION

A. Field of the Invention

The present invention relates generally to methods and systems of video display or projection and, in particular, to methods, apparatus, and systems of color video signal decoding, manipulation, and display or projection with improved color gamut and brightness. Applications of the invention include, but are not limited to, video display or projection for home or commercial entertainment purposes or architectural lighting.

B. Problems in the Art

Video displays and projectors have advanced significantly in recent years. Presently, digital methods of encoding video are beginning to dominate. A variety of display and projection technologies using digital encoding have emerged.

Existing electronic video devices can be generally divided into two groups: direct view devices and projection devices. An example of a direct view device is a cathode ray tube (CRT). A direct view device will generally have a display screen composed of a plurality of RGB pixels. Each RGB pixel will be comprised of a plurality of sub-pixel elements, which most likely comprise a red sub-pixel element, a green sub-pixel element, and a blue sub-pixel element. The color image is created by the viewer's physiological and mental visual system, which mentally integrates the rapidly changing and vacillating sub-pixels and their spatial neighbors to give a full color impression.

A projection system works differently than a direct view device. A projection system displays an image by projecting light on a viewing screen or surface. Different colors of light can be created in two manners. The first method is to sequentially project separate images using only a single primary color and rapidly showing the same image with a second and then a third primary color. The images are flashed at sufficiently high frequency to give the human eye the impression that a specific color has been generated. This sequential presentation relies upon color combinations recorded by the human mind through temporal integration of the separate primary color images. An issue with the use of the sequential method is that it takes three (or the number of primary colors being used to generate the image) times the number of frames to generate the same images that could be shown with a system that integrated multiple light sources into a single image. The increased frame rate further limits the time in which a pixel can be modulated for primary color contribution control because of the fixed pixel transition time; therefore, the color resolution available decreases. The sequential system does have the benefit of having a simpler optic system. Examples of a sequential system are disclosed in U.S. Pat. Nos. 6,962,414 and 5,448,314 which are incorporated by reference in their entirety herein.

The second type of digital video projection system is a simultaneous display system based upon the concept of projecting light of all primaries (example: the red, green, blue primaries) simultaneously onto a screen. The combination is then used to generate the colors perceived by the human eye. The simultaneous (also called parallel or integrated) system integrates multiple primary light sources and provides an output comprised of an image in a single frame.

A variety of processes for digitally encoding a video signal and decoding it for display or projection have been developed and are well-known. Several approaches include using a Digital Micromirror Device (DMD) (a proprietary technology of Texas Instruments Incorporated, Dallas, Tex. USA), liquid crystal on silicon (LCoS), and liquid crystal display (LCD). Each of these technologies can be used to display an image in a sequential or parallel (integrated) color mode. Typically, these devices include a white light source separated into red, green, and blue illuminating components. The utilization of only three primary colors limits the gamut of displayable colors. The three color primaries are unable to effectively render colors throughout the entire color space the human eye can perceive.

By varying the amount of red, green, and blue light reflected from a surface or projected to a human eye, a limited number of colors in the visible spectrum, as perceived by the human eye, can be approximated.

One method of encoding three primary colors for subsequent projection of a target color is described by Lindbloom, at "RGB/XYZ Matrices." 20 Apr. 2003. 7 Nov. 2005 http://www.brucelindbloom.com/index.html?Eqn_RGB_XYZ_Matrix.html, incorporated by reference herein. Generally, this known algorithm takes pixel data represented in a universal color coordinate system (e.g. XYZ color space), performs a color transform, and parses the result among parallel display devices or sequentially to a single device such that each pixel is represented by the combination of three primaries.

FIG. 2A generally illustrates the basic process. A conventional video processor 35 is used to encode a portion 31 of an image 30 (e.g. light blue sky from image of yellow flowers and blue sky in FIG. 2A) by representing a target color (here light blue) for a pixel 34 of the image as a combination of red (R), green (G), and blue (B). In this example of FIG. 2A, the contributions of primary red and primary green are smaller than primary blue. Thus, the output from video processor 35 would encode the target color to be displayed for that pixel as having the indicated proportional contributions from the blue, red, and green primary sources (RGB values are R=65, G=105, and B=255). Thus, the color reproduced on display device 36 would basically be as close to the light blue of the image as possible. FIG. 2A indicates diagrammatically video processor 35 could be configured to instruct sequential display of each primary (see reference #36 where the proportional contribution of blue is T=0, green at T=1, and red at T=2). Processor 35 could also operate the display device in parallel mode (e.g. red 38R, green 38G, blue 38B contribution simultaneous at T=0).

The purpose of this known primary color mixing algorithm is to determine the relative proportions of three given colored light sources, for example Light Emitting Diodes (LEDs), required to produce a target color.

a) CIE Color Space

The light emitted by each source is represented in CIE 2-degree 1931 format, where x and y are the chromaticity coordinates and Y' is the photometric flux. The known quantities are represented as follows:

Primary Color Coordinates:
Given $(x_r, y_r, Y'_r)$, $(x_g, y_g, Y'_g)$, $(x_b, y_b, Y'_b)$ Target Color Coordinates:
Given $(X, Y, Z)$ Although the sources are designated as red (sub r), green (sub g), and blue (sub b), it is important to note that other colors can be substituted. The three color points form the triangle 11A or gamut (see FIG. 1A) and those three coordinates, referred to as "primary colors," can be used to create a chromaticity point that is within triangle 11A.

CIE color space is a widely used mathematical definition of color space (a color model describing the way colors can be represented by multiple color components). It was created in 1931 by the International Standard Body Commission Internationale De l'Eclairage (CIE). The CIE color space is defined by a special set of what are called imaginary primaries, which roughly correspond to red, green, and blue respectively. The chromaticity of the imaginary primaries are the XYZ tristimulus curves plotted at (0,1), (0,0), and (1,0) and are the same as the DCI 3.2.1.5 Encoding Primaries. The primaries are imaginary as they are mathematical creations, meaning their chromaticity would be plotted beyond the domain of what the human eye can perceive.

The chromaticity diagram of FIG. 1A describes CIE color space 14 in xy space. As seen in FIG. 1A, it appears as basically a closed horseshoe shape or area (see reference number 14 in FIG. 1A). The points on the border of the horseshoe (line 10), known as a spectrum locus, and the xy values corresponding to dominant wavelength excitation, range from approximately 400 nanometers to 780 nanometers, as indicated. The CIE color space 14 defines the range of color, the visible spectrum, which a typical human eye can perceive. Line 12 closes the horseshoe between the extreme monochromatic excitation after the long and short wavelengths. Region 16 of the color space, at which the human eye perceives the color "white", lies within the closed area 14. All colors discernable by human eyes are inside the closed area 14. The closed area 14 defines the color gamut of the eye. If excitation is monochromatic, it is placed on the horseshoe border 10 and 12.

A triangle 11A with vertices R, G, and B has been superposed on color space 14 of FIG. 1A; (e.g. RGB points at REC709 standard). Vertices R, G, and B represent the position in color space 14 of primary colors Red, Green, and Blue respectively. Triangle 11A illustrates one problem with three primary color reproduction. Only hues within triangle 11A can be reproduced with those three primaries. As can be seen in FIG. 1A, the area of triangle 11A is but a fraction of the entire color space 14.

b) White Point

What is called in the art the white point, denoted by subscript w, is the color that results from the full contribution of all three sources, and may not appear white to the human eye. A proportionality constant (m) is calculated for each source and then used to calculate the (x, y) coordinates of the white point. The photometric flux of the white point is simply the sum of the flux from each source.

$$m_r = (Y'_r / y_r)$$
$$m_g = (Y'_g / y_g) \qquad [1]$$
$$m_b = (Y'_b / y_b)$$

-continued $$x_w = \frac{x_r m_r + x_g m_g + x_b m_b}{m_r + m_g + m_b} \qquad [2]$$

$$y_w = \frac{y_r m_r + y_g m_g + y_b m_b}{m_r + m_g + m_b}$$

$$Y'_w = Y'_r + Y'_g + Y'_b$$

c) Tri-Stimulus Values

The three light sources and the white point are then translated from CIE 2-degree format into XYZ tri-stimulus values (see FIG. 1A, ref no. 18) using the following equations:

$$X_r = \frac{x_r Y'_r}{y_r} \quad Y_r = Y'_r \quad Z_r = \frac{(1 - x_r - y_r) Y'_r}{y_r} \qquad [3]$$

$$X_g = \frac{x_g Y'_g}{y_g} \quad Y_g = Y'_g \quad Z_g = \frac{(1 - x_g - y_g) Y'_g}{y_g}$$

$$X_b = \frac{x_b Y'_b}{y_b} \quad Y_b = Y'_b \quad Z_b = \frac{(1 - x_b - y_b) Y'_b}{y_b}$$

$$X_w = \frac{x_w Y'_w}{y_w} \quad Y_w = Y'_w \quad Z_w = \frac{(1 - x_w - y_w) Y'_w}{y_w}$$

d) Square Matrix

The tri-stimulus values of the three light sources can then be represented as a square matrix. This matrix is inverted and multiplied by the white point to get an array of scaling factors (S). The scaling factors manipulate the matrix of the primaries in order to relate to a reference white point. If the desired white point is not the result of the full contribution of each primary color, then $S_r$, $S_g$, and/or $S_b$ will deviate from unity. However, if the reference white is set equal to the full contribution of each primary color, then those values are equal to one.

In the event that the lighting system is being controlled by a communication protocol, which indicates the desired colors in levels of red, green, and blue, then a reference white is needed to maintain the intuitive nature that full red, green, and blue produce white. If the protocol allows the capability of selecting a specific color coordinate, then a reference white is not needed.

$$[S_r \; S_g \; S_b] = [X_w \; Y_w \; Z_w] \begin{bmatrix} X_r & Y_r & Z_r \\ X_g & Y_g & Z_g \\ X_b & Y_b & Z_b \end{bmatrix}^{-1} \qquad [4]$$

$$[M] = \begin{bmatrix} S_r X_r & S_r Y_r & S_r Z_r \\ S_g X_g & S_g Y_g & S_g Z_g \\ S_b X_b & S_b Y_b & S_b Z_b \end{bmatrix}$$

$$[R \; G \; B] = [X \; Y \; Z][M]^{-1}$$

e) Transform Matrix

The scaling factors are multiplied by their respective color coordinates in order to complete the transform matrix (M). The result of the matrix multiplication of the transform by the desired color coordinate [X Y Z] is an array of three values [R G B]. This array represents the relative proportions of each primary required in order to produce the desired color point.

f) Duty Cycle

These values are then scaled to the domain of [0,1] by taking each primary and dividing it by the maximum value in the primary color array.

$$D_r = R/\max(R,G,B) \quad D_g = G/\max(R,G,B) \quad D_b = B/\max(R,G,B) \quad [5]$$

The result is the required duty cycle (D), which can be implemented using a number of modulation techniques (i.e. Pulse Width Modulation or Pulse Frequency Modulation). Duty cycle is the percent of power that is applied to the light source, which relates to the intensity. A duty cycle with more increments has a finer resolution, which leads to smooth transitions between colors and precision adjustments for error correction algorithms. The duty cycle calculation produces the brightest combination of the primary colors required to make the target color.

The foregoing methodology of color mixing is known in the art. It requires substantial, but manageable, mathematical calculations to operate. However, it is limited to three primary color mixing.

2. Simplified Form

These known three-color mixing calculations described above can be reduced algebraically to a simplified form that accounts for color space conversions.

If the target color is represented by $(x_c, y_c)$, the relative values of the three sources required to make that color are calculated as follows:

$$\text{color} = (x_c, y_c) \quad [6]$$

$$R = -\frac{y_r[x_b(y_c - y_g) + x_c(y_g - y_b) + x_g(y_b - y_c)]}{y_c \cdot Y'_r \cdot [x_b(y_g - y_r) + x_g(y_r - y_b) + x_r(y_b - y_g)]}$$

$$G = \frac{y_g[x_b(y_c - y_r) + x_c(y_r - y_b) + x_r(y_b - y_c)]}{y_c \cdot Y'_g \cdot [x_b(y_g - y_r) + x_g(y_r - y_b) + x_r(y_b - y_g)]}$$

$$B = \frac{y_b[x_c(y_g - y_r) + x_g(y_r - y_c) + x_r(y_c - y_g)]}{y_c \cdot Y'_b \cdot [x_b(y_g - y_r) + x_g(y_r - y_b) + x_r(y_b - y_g)]}$$

$$D_r = R/\max(R, G, B)$$

$$D_g = G/\max(R, G, B)$$

$$D_b = B/\max(R, G, B)$$

Whereas in the first three-color mixing method the target color was given in XYZ coordinates, this simplified method uses only xyY' coordinates. The simplified equations assume that the reference white is the full contribution of each of the primary sources, so $S_r$, $S_b$, and $S_g$ are all equal to one.

The above-described known algorithms demonstrate the reduction of a three-primary system and their duty cycles, given a target color coordinate. These algorithms have been used for color calculations of RGB LED mixing systems.

However, in a trichromat system, there is a trade-off between maximizing the color space, achieving saturated color, and being able to produce colors in the outlying areas of the CIE color space (such as pastels or deep purples).

It has been recognized that if more primary colors were added to the system, the gamut size increases and fewer performance compromises may be required. An advantage of a tetrachromat or pentachromat system (with 4 and 5 primaries, respectively) is that the spectral content of the illuminating source renders surfaces to a quality that more closely imitates natural daylight. However, one obstacle to calculating the relative contributions of systems beyond trichromat is that matrix M, discussed above, becomes non-square and is overdetermined. Its inversion, which is required to calculate the required primary contribution, is not deterministically solvable with traditional methods. Methods such as pseudoinverse using the Moore-Penrose Method could be attempted, but would provide only a least-squares fit of a sampling of the final target colors desired. The inherent approximation of the pseudoinverse calculation introduces error into an already highly complex system. The complexities stem from many sources including degradation of output with time, temperature response characteristics, and manufacturing variability. The compound effect of real-world variation and the best-fit calculations would result in the defeat of the primary objective of accurate, repeatable color.

Thus, with the three-color mixing algorithms described above, the primary values matrix cannot simply be expanded to accommodate more colors because it then becomes an unsolvable non-square matrix. In a tetrachromat or pentachromat system, the algorithm must be applied several times.

U.S. Pat. No. 6,633,302 ("the '302 patent") recognizes the limitation on gamut utilizing only three primary sources. It purports to offer an improvement over the same. The '302 patent discloses a static display system that utilizes a cumbersome three-dimensional approach to integrating at least four primaries. This cumbersome approach represents the color space 14 in three dimensional XYZ volumes instead of two-dimensional CIE slices. In an attempt to streamline its process, the '302 patent discloses a lookup table and interpolation calculation for performing the necessary conversion from target pixel color to relative contribution of primaries. However, this approach introduces another form of estimation or approximation (including the interpolation calculation) which, in turn, introduces potential inaccuracies into the calculation of the combination of the primary sources. Thus, the '302 system is an inadequate video projection system, especially in light of the present stringent requirements of the high definition digital cinema market.

Therefore, there is room for and a real need for improvement to the state of the art. In particular, there is a need for a color mixing methodology, which allows efficient calculation of target color in color space from four or more colors.

Additionally, many of the existing technologies utilize an incandescent or gas discharge light source. As is well known in the art, such light sources have inherent variations and limitations, such as size, longevity, and durability. The broad spectrum nature of conventional light sources limits the efficiency of saturated primary production because of the filtering required. Superior display characteristics are not solely a function of accurate color reproduction, but also of the brightness and consistency of the light source. Therefore, there is also a need in the art for alternatives and improvements in light sources used for light projection.

II. SUMMARY OF THE INVENTION

It is therefore a primary object, feature, advantage and/or aspect of the present invention to provide apparatus, methods, and systems for multi-primary display or projection, which improve over the problems and deficiencies in the art.

Further objects, features, advantages, and/or aspects of the present invention include apparatus, methods, or systems for multi-primary display or projection and general illumination which provide one or more of:

a. Efficient and effective color mixing to achieve target colors.
b. Wide color gamut.
c. Enhanced color rendition and more life-like color.
d. High color rendering (e.g. 90+)

e. Accurate color and grayscale.
f. Excellent direct display or projection.
g. High efficiencies for the color white.
h. Consistency of color, even during dimming, and for repeated specific colors.
i. Accurate and repeatable specifiable colors (e.g. 0.004 duv).
j. Low color separation.
k. Relatively low mathematical or processor overhead.
l. A relatively economical system.
m. Customizability.
n. Applicability to different light sources.
o. Applicability to different display or projection methods.
p. Applicability to different color encoding and decoding techniques and protocols.
q. Compensation to account for source variation or degradation.
r. Compensation for temperature or other variables of the display or projection system.
s. Low maintenance.
t. Long lamp life.
u. Robust.
v. Scene Adaptive Contrast Control™ that can be applied to the entire display or particular areas of a display broken up into zones.
w. Implementation of narrow spectrum emission sources in a projection system.
x. Implementation of solid state emission sources in a projection system.
y. A digital projection system having an optical arrangement of multi-primaries constructed with a minimum focus length between the source and the projection lens.
z. Efficient thermal management of high lumen density light sources.

These and other objects, features, advantages, and/or aspects of the present invention will become apparent with reference to the specification and claims herein.

One aspect of the present invention comprises an algorithm for utilizing at least four primary light sources to represent a target color. The algorithm and associated system can be applied to both a natively monochromatic light source or traditional light sources filtered for their colored components. The algorithm can be used for either color sequential or parallel modes of operation. The algorithm takes input pixel data represented in a universal color coordinate system, performs a color transform, and disperses the results among parallel display devices or sequentially to a single device such that each pixel is represented by the combination of four or more primaries. The more primaries, the more points of color that can be created in color space. The result is wider gamut, more accurate, life-like, purer colors. Also, in projection, higher pixel brightness is possible because more light can be put into producing the output of a pixel, so the colors are brighter and more vivid. The more primaries used for the target color, the brighter the color will be.

Another aspect of the invention comprises the optional use of a closed loop optical feedback algorithm to account, correct, or compensate for variation of the primary light sources and an optical path. The feedback algorithm and an accompanying sensor provide a consistent reference white or target color. The feedback system can use an RGB or tristimulus corrected color sensor that feeds input data into three PID (Proportional Integral Derivative) algorithms. The third PID algorithm can perform an auto tuning function. This system can also learn and correct, in essentially real time, the subsequent selection of the same color.

Another aspect of the present invention is the implementation of narrow spectrum emission sources into a projection system. These narrow spectrum emission sources include solid state devices such as light emitting diodes (LEDs) and lasers. The integration of LEDs or lasers into the projection system allows for enhanced color projection. Monochromatic sources eliminate the need for filtering, thus reducing the complexity of the optical system and providing more saturated primaries. LEDs and lasers also have operational lifetimes and output maintenance curves that far exceed conventional light sources. Solid state light sources are receiving generous amounts of research attention, which is reflected by the fact that their efficacy has improved dramatically over the past few years and is forecast to continue to improve. In the future, LEDs and lasers will likely exceed the efficiency of the most advanced incandescent and gas discharge technology known today.

Another aspect of the present invention comprises optional contrast control to provide more dynamic color display. The fast response time of the solid state emission source also allows for modulation of the primary source intensity on a frame-to-frame basis to provide an electronic Scene Adaptive Contrast Control™ that acts as a dynamic iris. The frame-to-frame control is the result of utilizing fast response emission sources in a dynamic range improvement algorithm to enhance the contrast ratio of projected images. A histogram analysis of grayscale in a video image determines the proportions of light and dark colors and grayscale. Light sources projecting the image are increased or reduced in intensity to change the dynamic range of the image, depending on that analysis.

Another aspect of the present invention comprises thermal management of narrow spectrum emission light sources. The present invention utilizes a heat pipe package that physically isolates a working fluid from the outside environment. The heat pipe package maintains a pressure differential across its walls, and enables heat transfers from and into the working fluid. Movement of working fluid creates a thermodynamic system that moves heat from one location near the heat source to another location away from the heat source, thus enabling the compact heat source to be spread over a larger area for improved heat dissipation.

Other aspects of the invention comprise a projection system, which utilizes several optical arrangements to integrate the primary color sources to produce a target pixel color. The projection system could also utilize dichroics to reflect/direct the lights to combine colors and conserve etendue. The projection system allows reduction of distance between the sources and the projection optics for a four or more color projection system, to minimize light loss.

III. BRIEF DESCRIPTION OF THE DRAWINGS

Figure 4A:
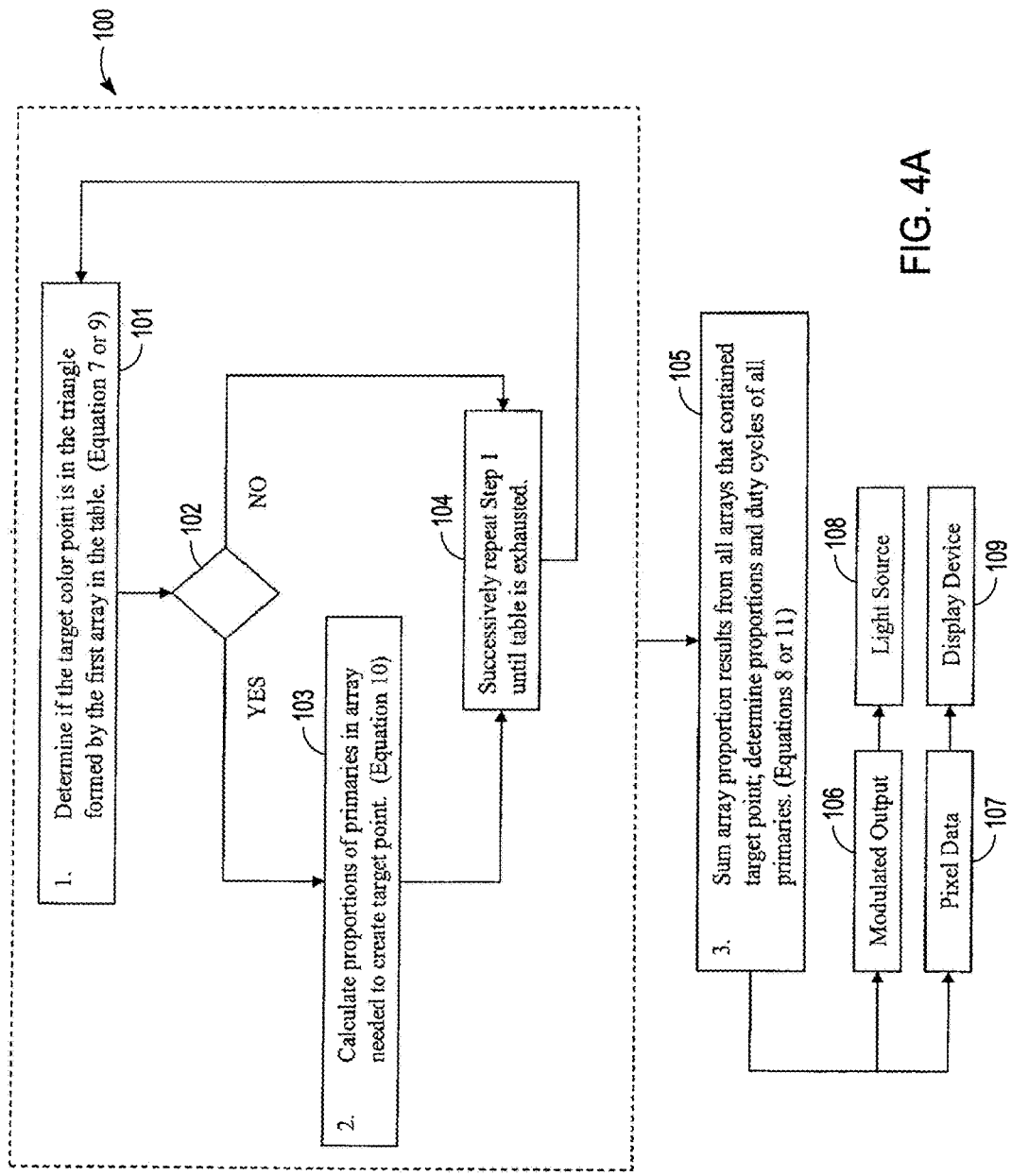
FIG. 4A is a flow chart of a color mixing algorithm according to one exemplary embodiment and aspect of the present invention.

FIGS. 5A-G are illustrations of an alternative color mixing methodology similar to that of FIG. 4A.

Figure 6A:
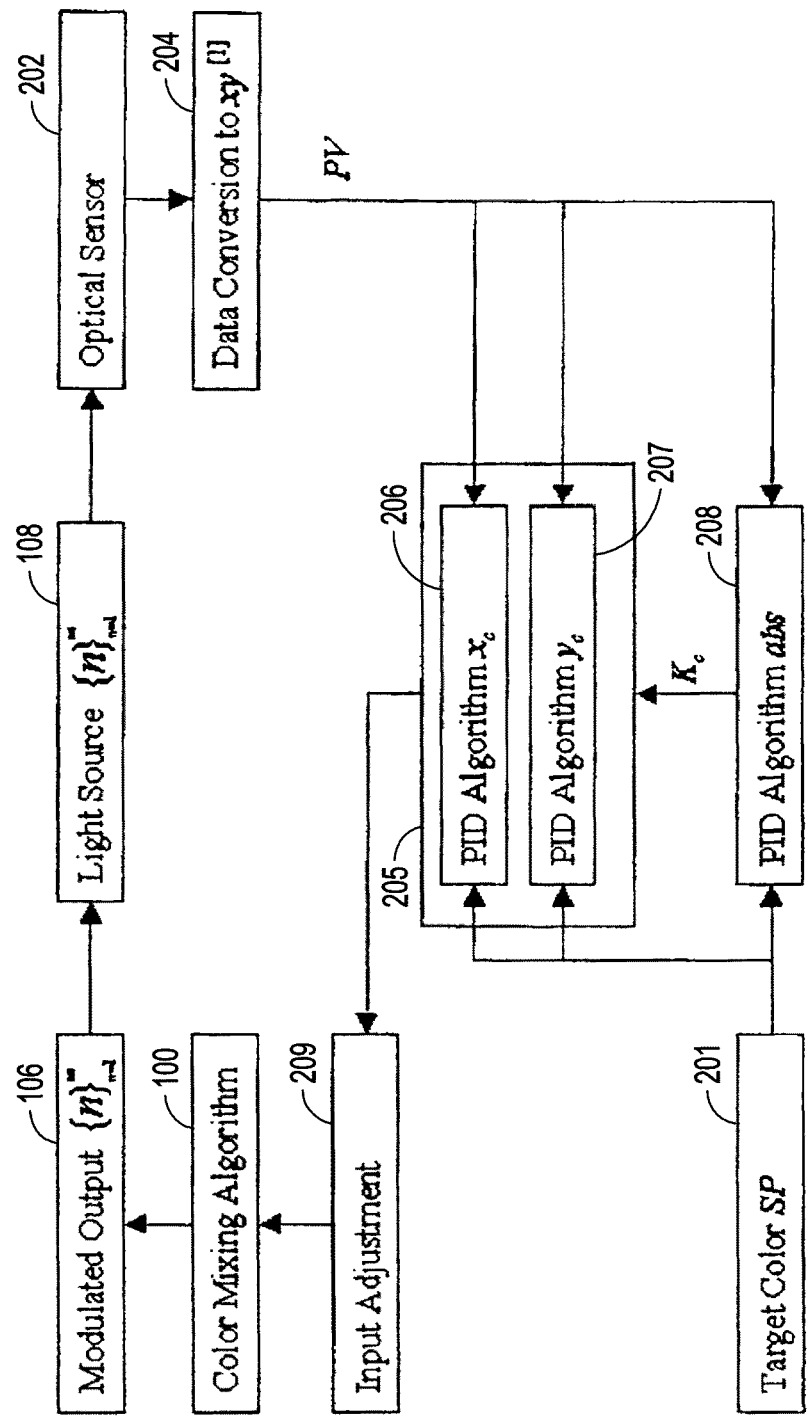

FIG. 6A is a block diagram of an error correction algorithm and system according to an exemplary embodiment and aspect of the present invention.

Figure 6B:
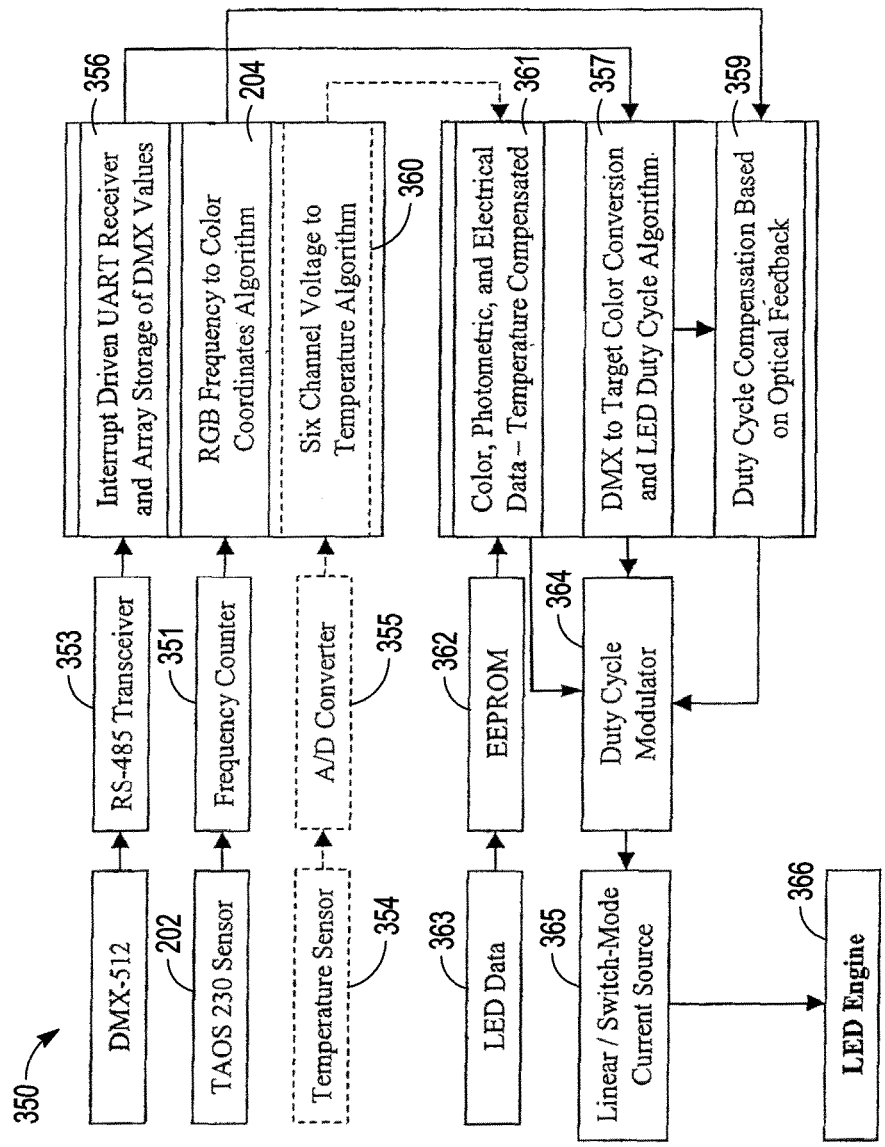

FIG. 6B is a software flow diagram for an implementation of the error correction algorithm of FIG. 6A, showing additional optional compensation methods.

Figure 7A:
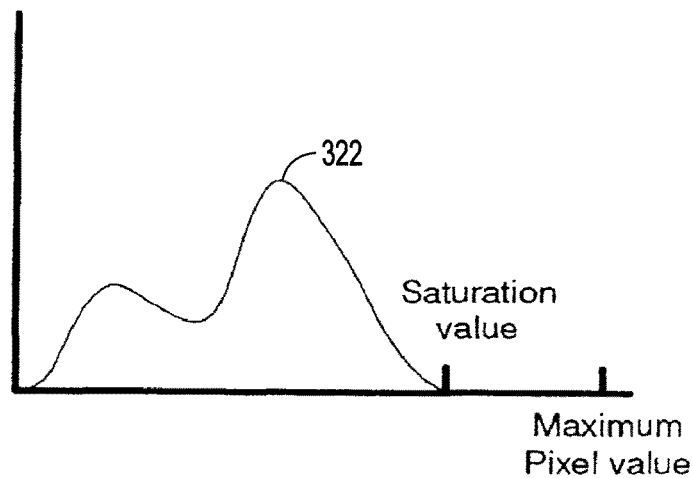

FIG. 7A is an RAGCB Pixel Histogram illustrating a scene, which makes use of less than full dynamic range of a display.

Figure 7B:
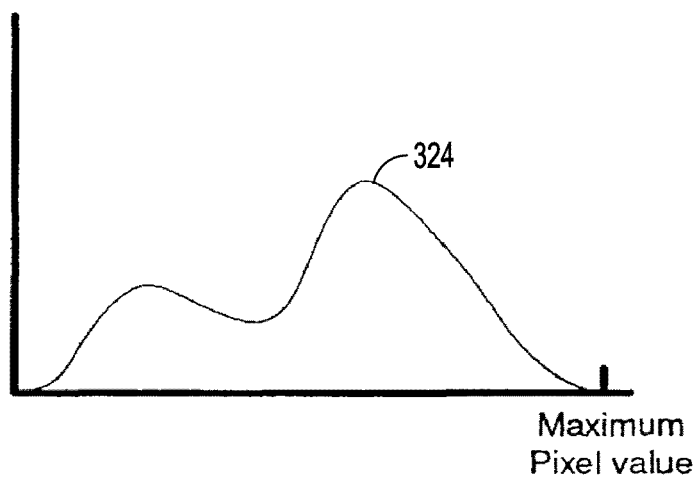

FIG. 7B is a Gain Modified RAGCB Pixel Histogram of FIG. 7A, where the image is stretched over the entire range.

Figure 7C:
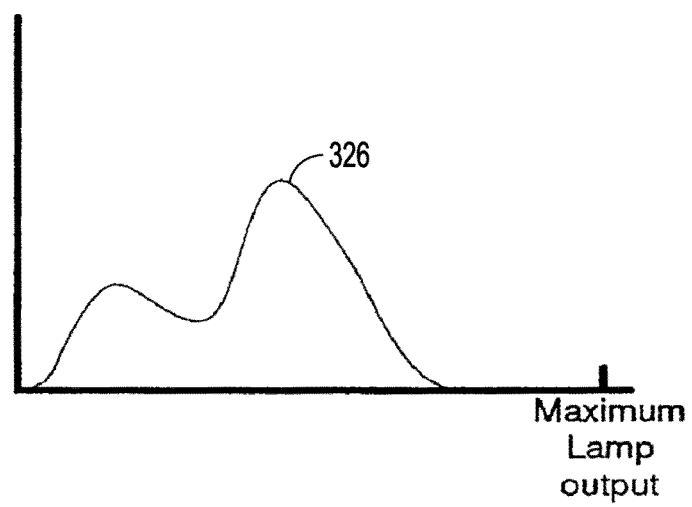

FIG. 7C is a Projected RAGCB Intensity Histogram of FIG. 7B with grayscale of the light source decreased by the reciprocal of pixel gain.

Figure 8:
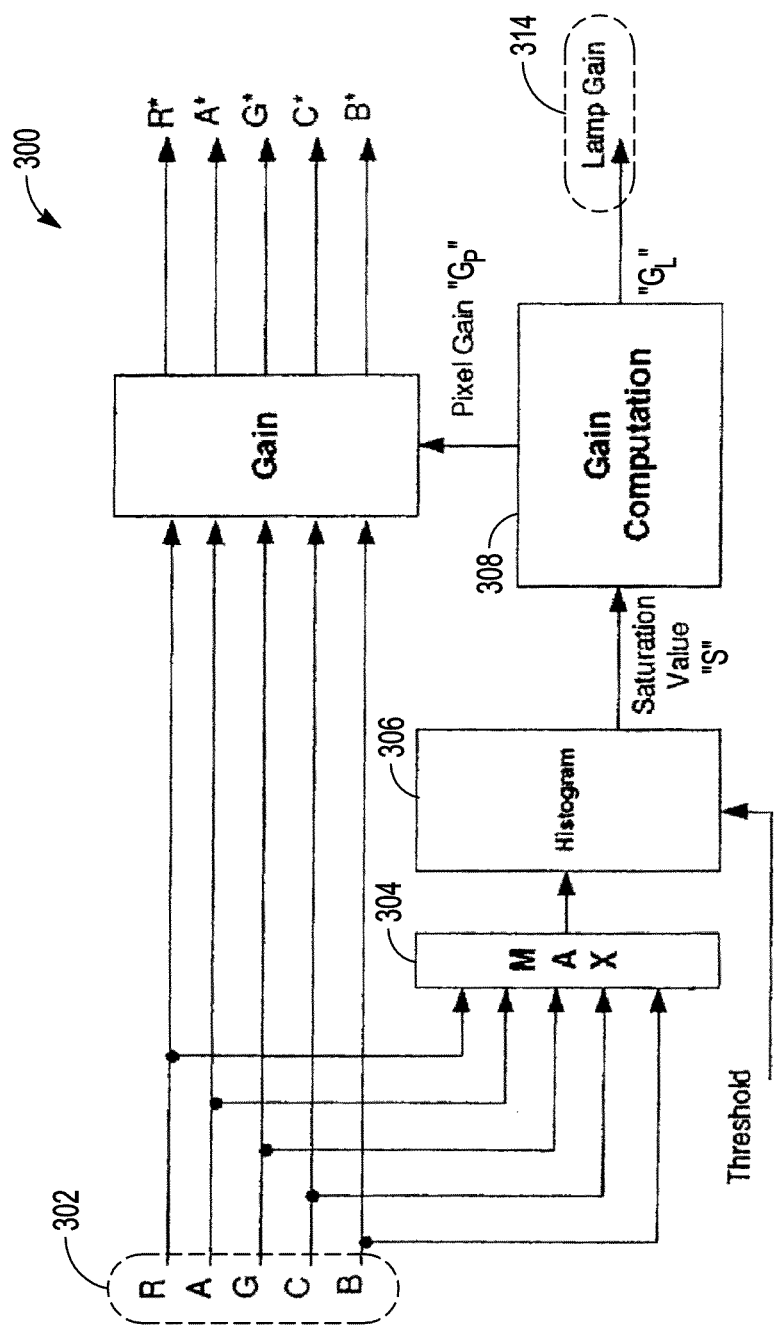

FIG. 8 is a block diagram of a Scene Adaptive Contrast Control™ or SACC™, according to an aspect of the present invention.

Figure 9:
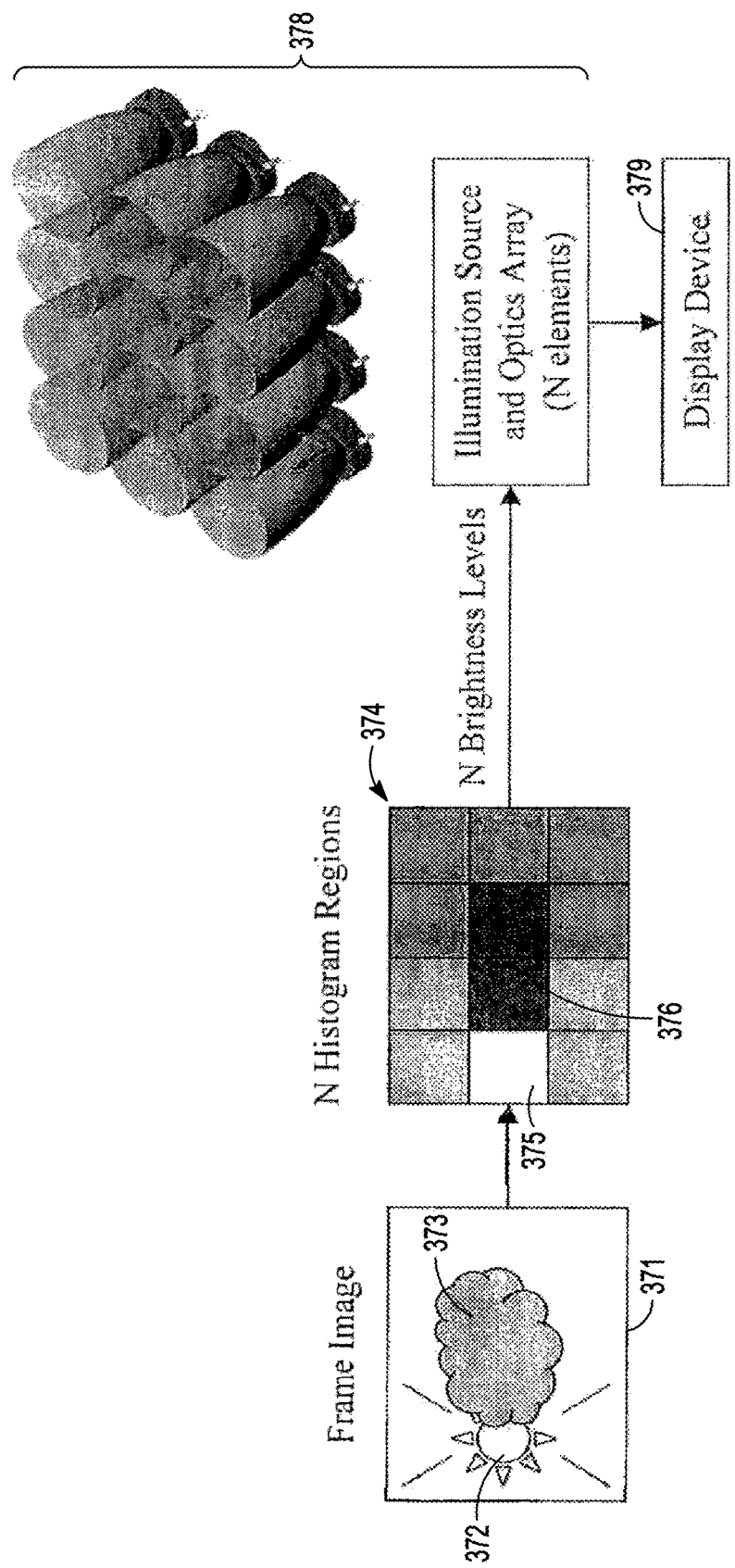

FIG. 9 is an illustration of an alternative concept regarding SACC™.

FIGS. 10A-D are an exemplary embodiment of a color mixing projector utilizing five color sources with 30°/60° dichroic mirrors to create a three lens output.

Figure 10A:
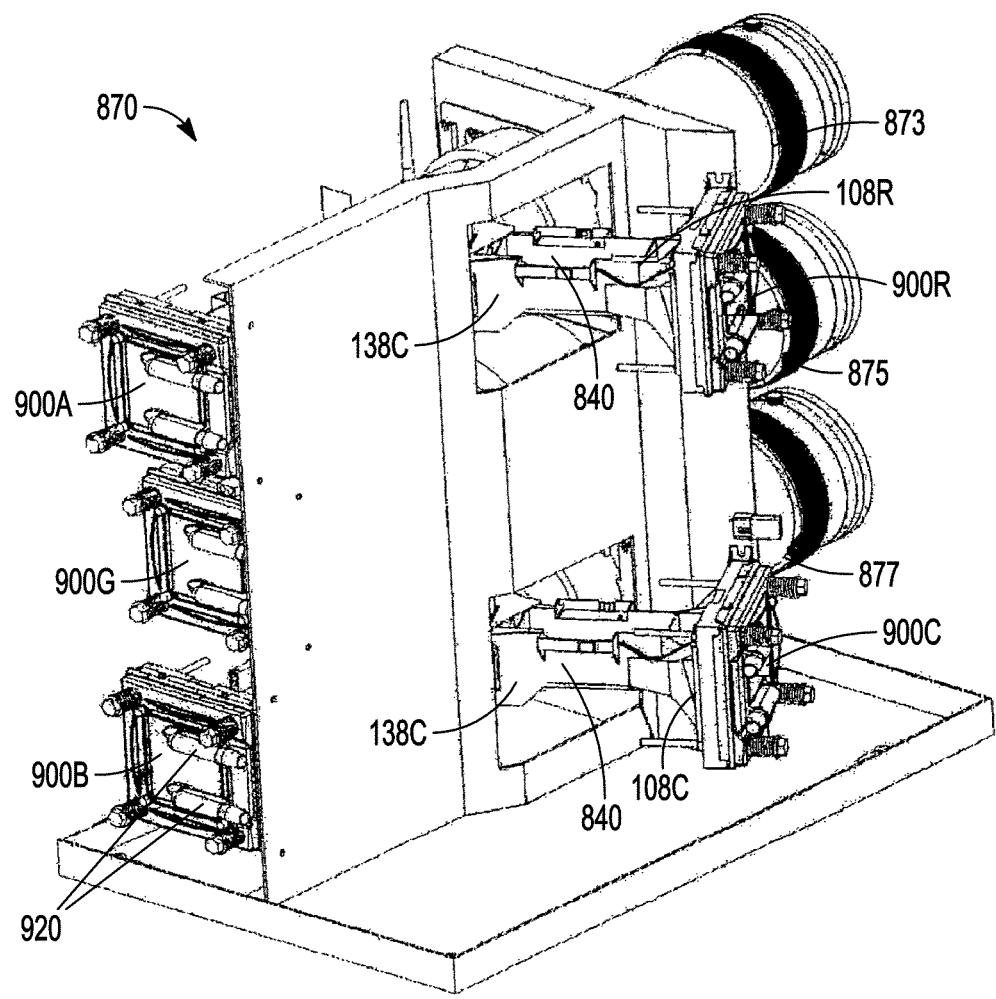
Figure 10B:
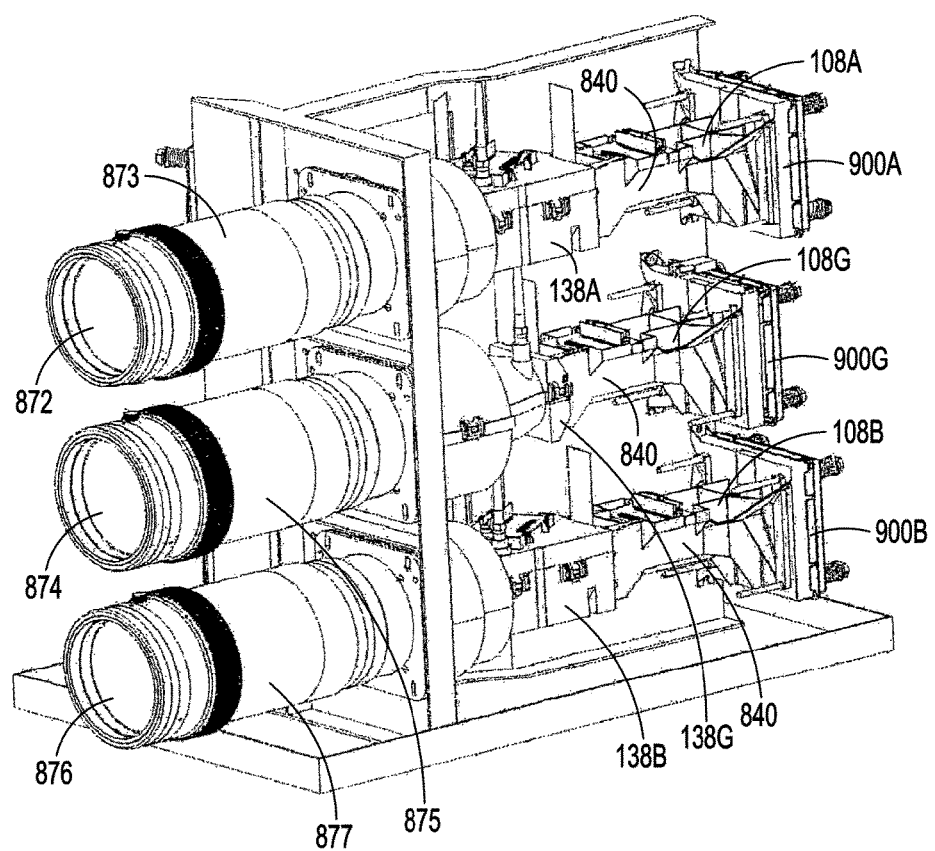
Figure 10C:
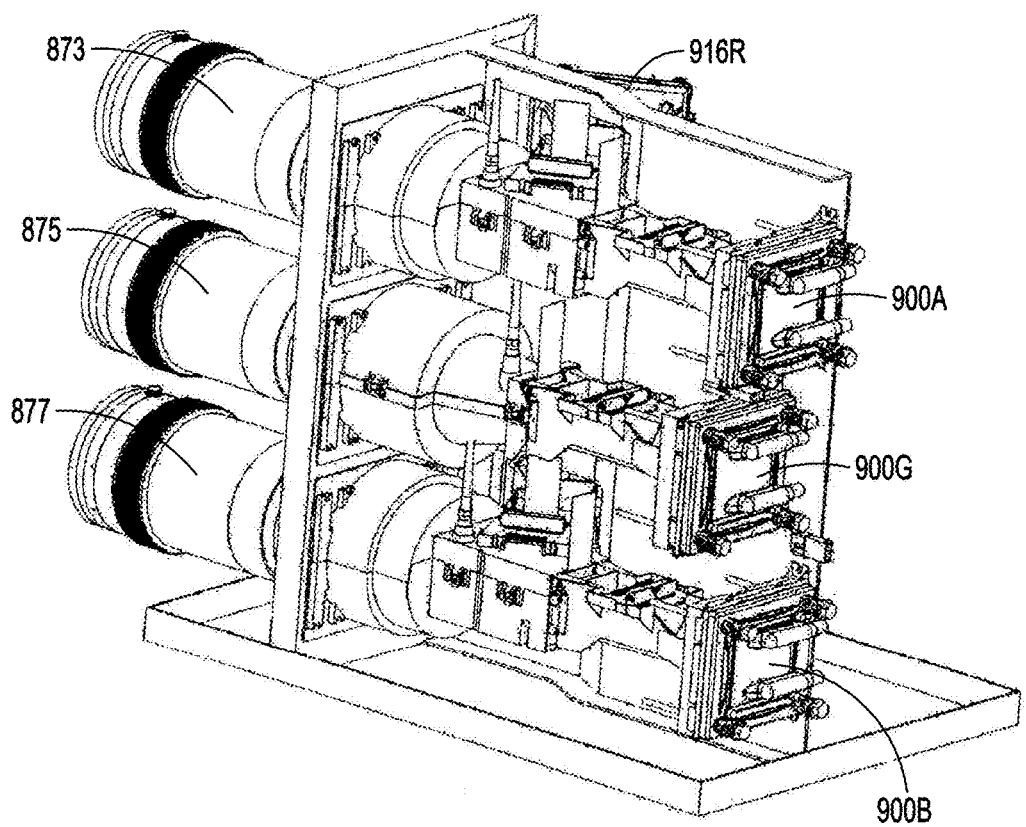
Figure 10D:
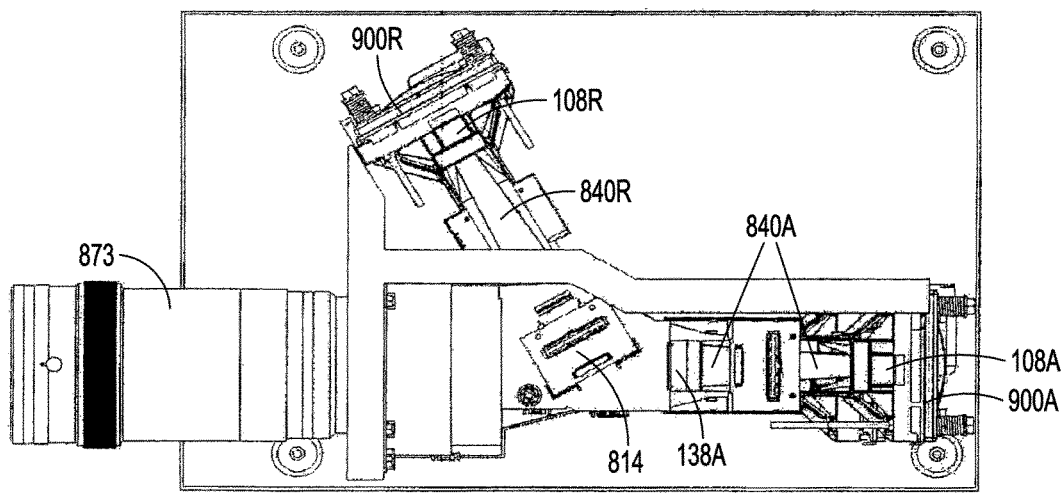
Figure 11:
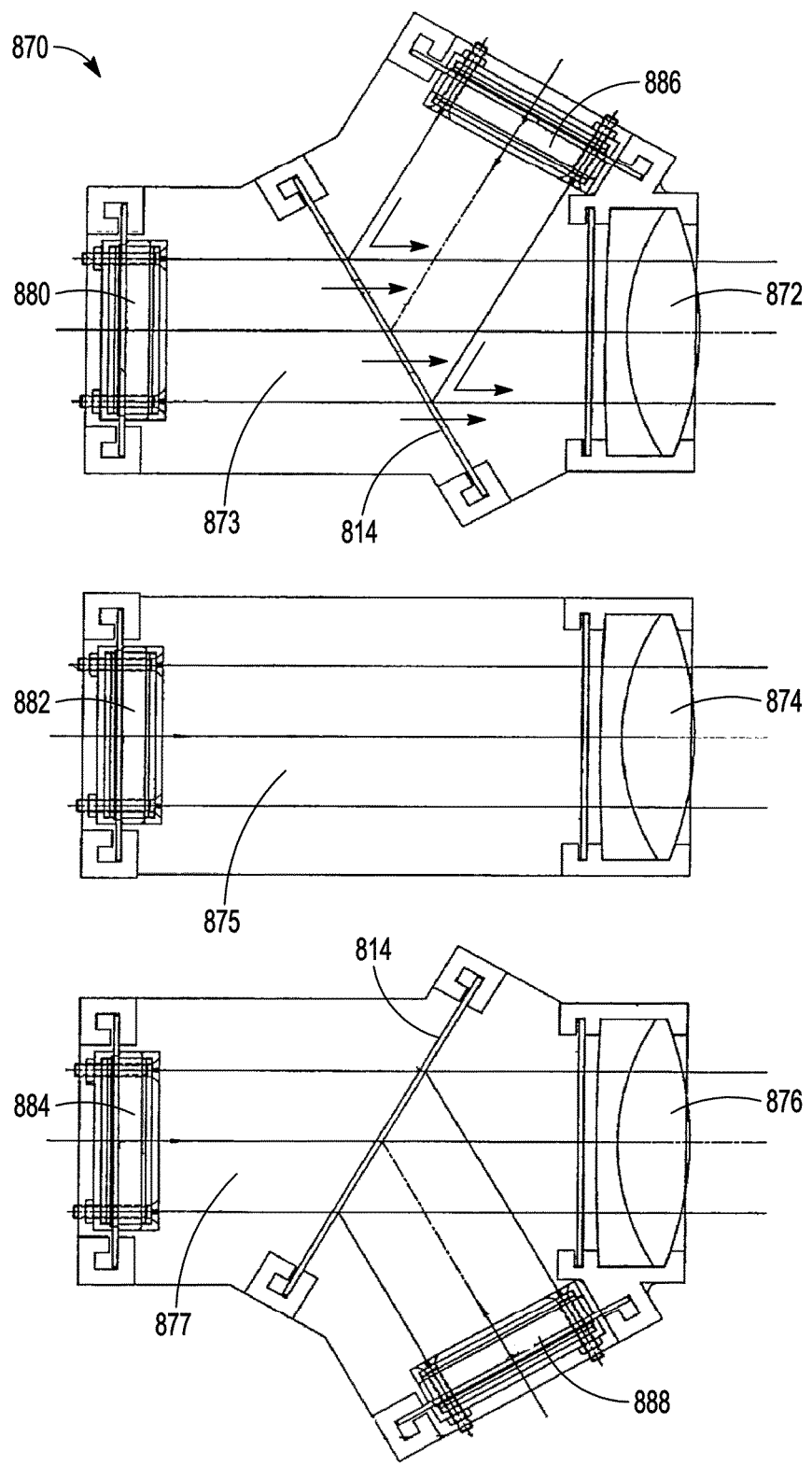

FIG. 11 is an enlarged sectional view of portions of FIG. 10A.

Figure 12:
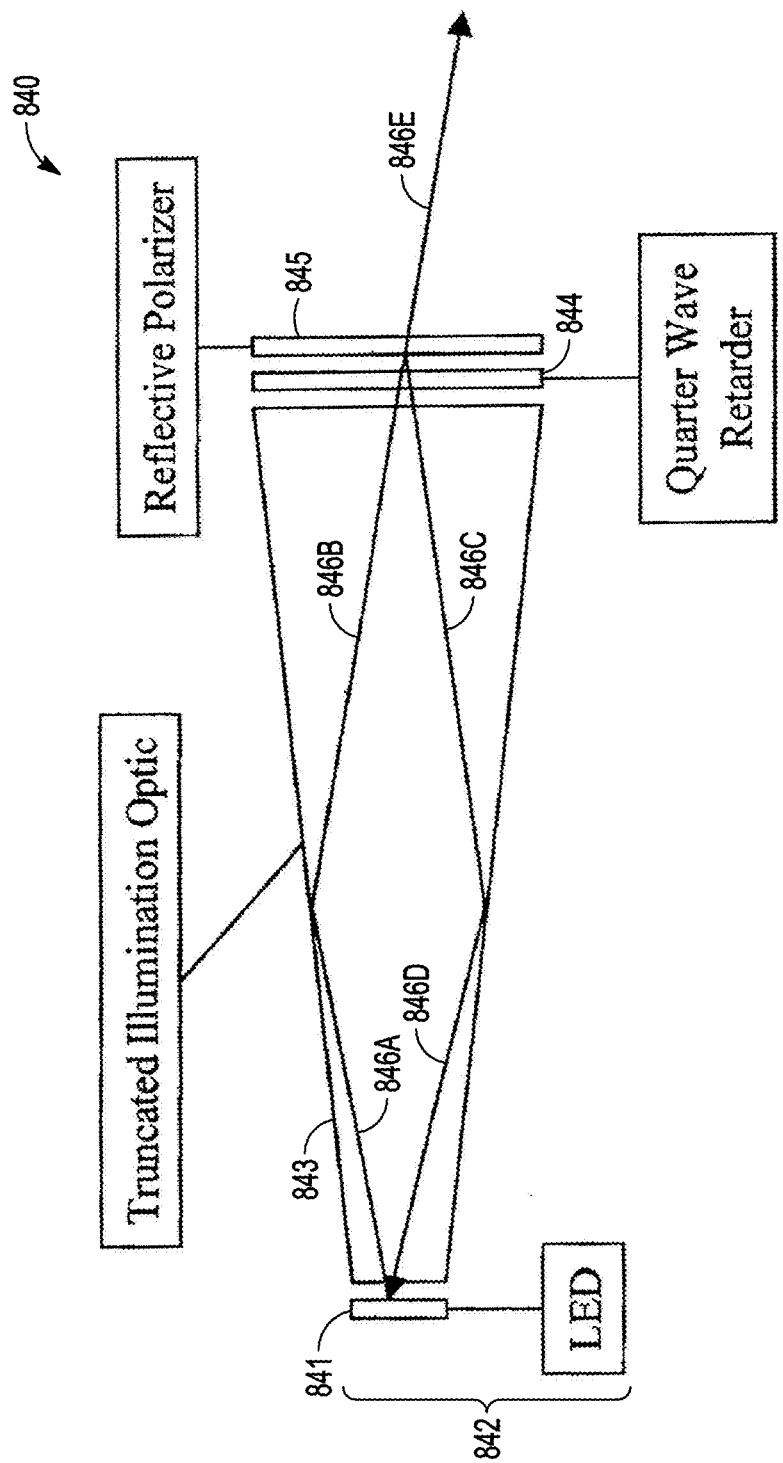

FIG. 12 is an isolated diagrammatic view of an optional truncated illumination optic with reflective polarizer and quarter wave retarder that can be used for an individual LED light source.

Figure 13A:
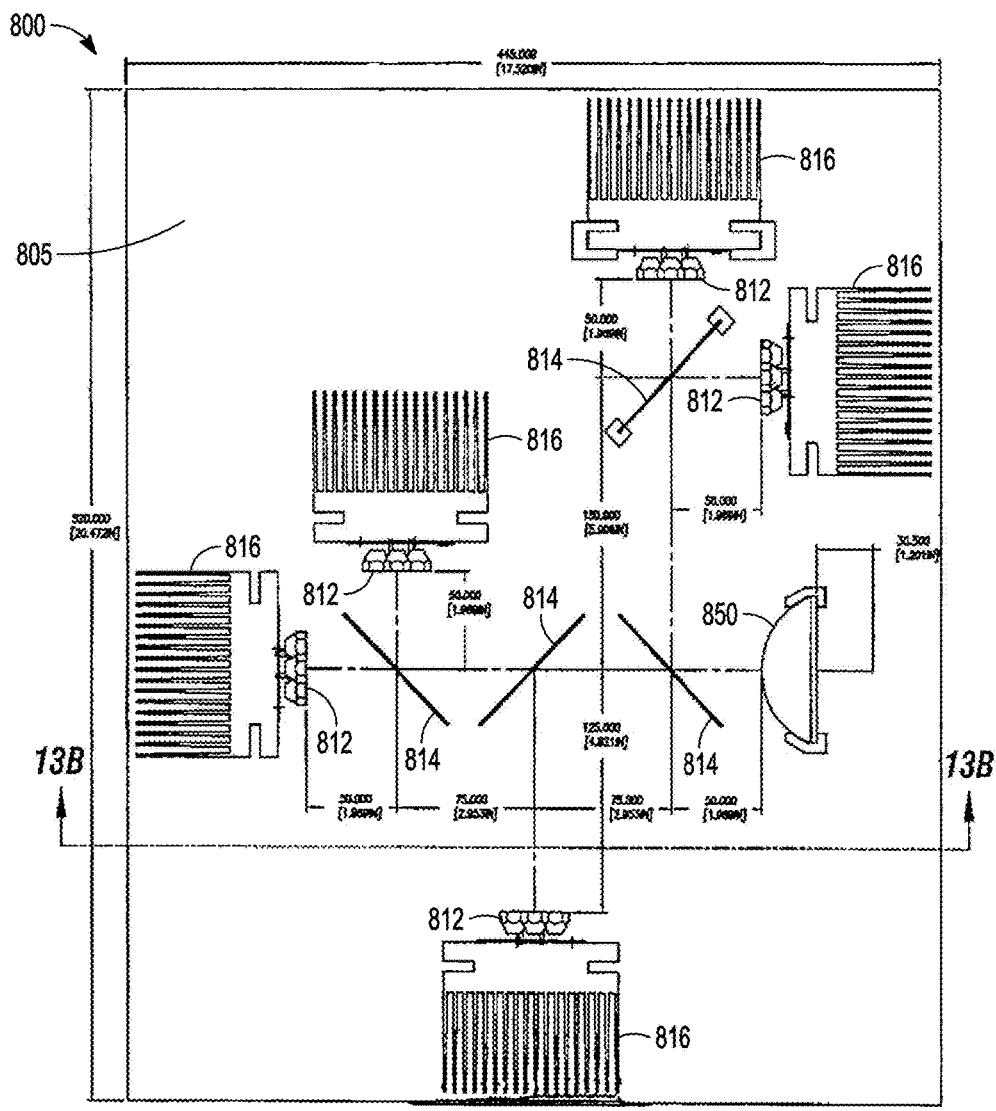

FIG. 13A is a top plan view of a projector system using an optic system according to one aspect of the present invention, in particular utilizing five different color sources with a combination of dichroic mirrors at 45° to beam path to create a combined output through a single lens.

Figure 13B:
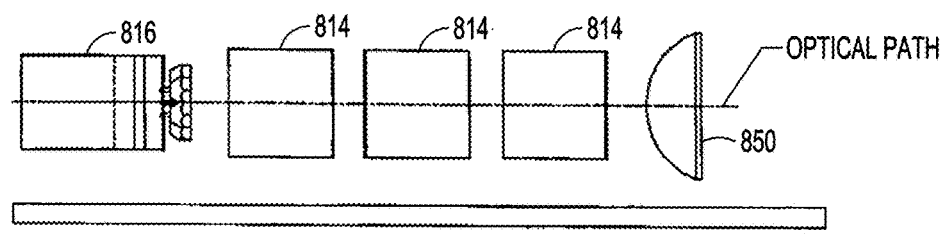

FIG. 13B is an elevation view taken along line 13B-13B of FIG. 13A.

Figure 13C:
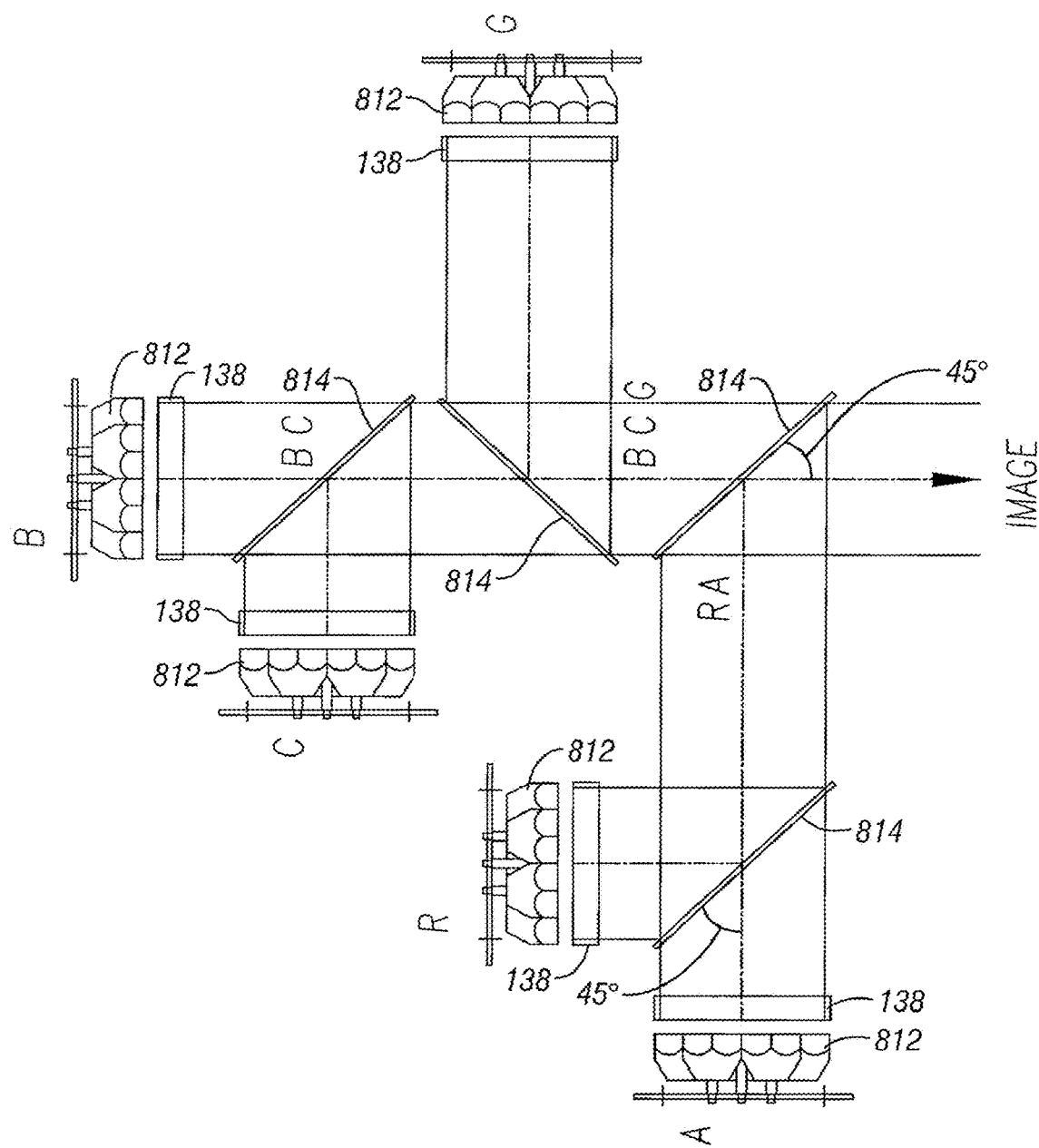

FIG. 13C is a simplified isolated view of the optics of FIGS. 13A and B.

Figure 14:
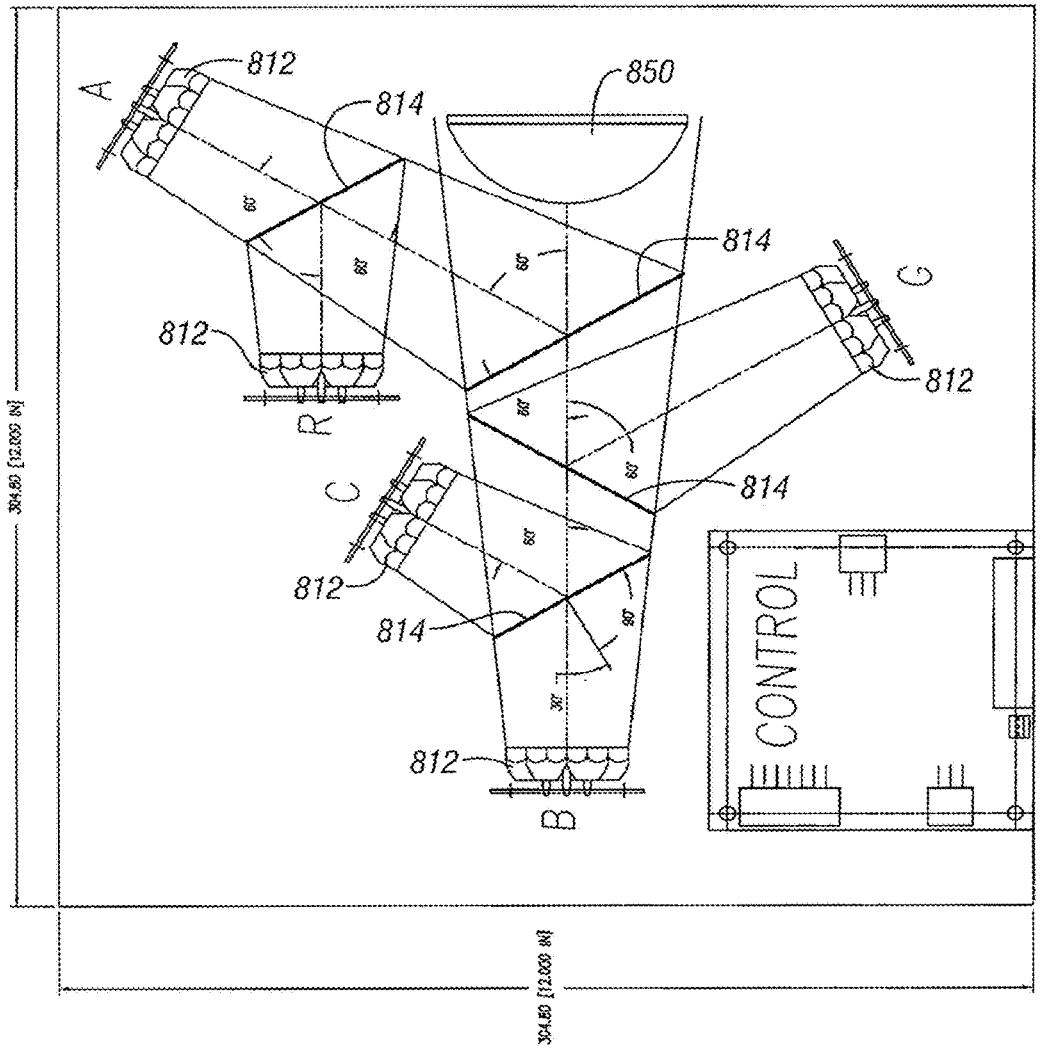

FIG. 14 is an alternative embodiment for a five color source single lens projector.

Figure 15A:
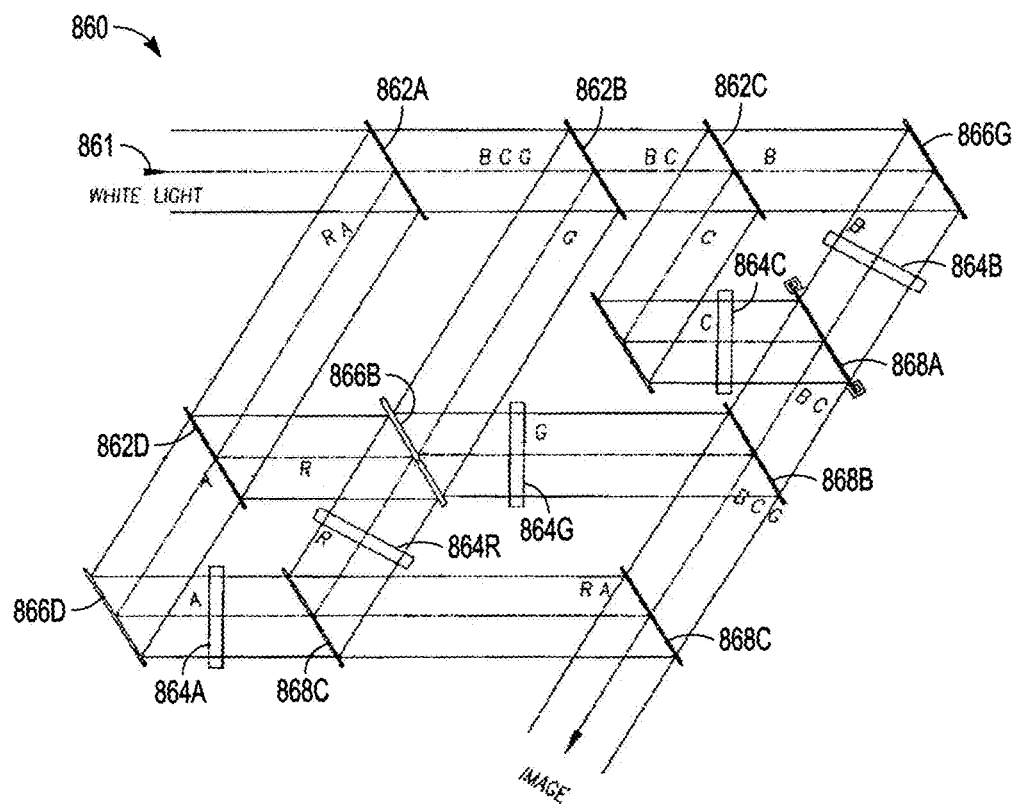

FIGS. 15A and B are alternative views of a still further embodiment of a five color source, single lens projector using a white light source input.

Figure 16A:
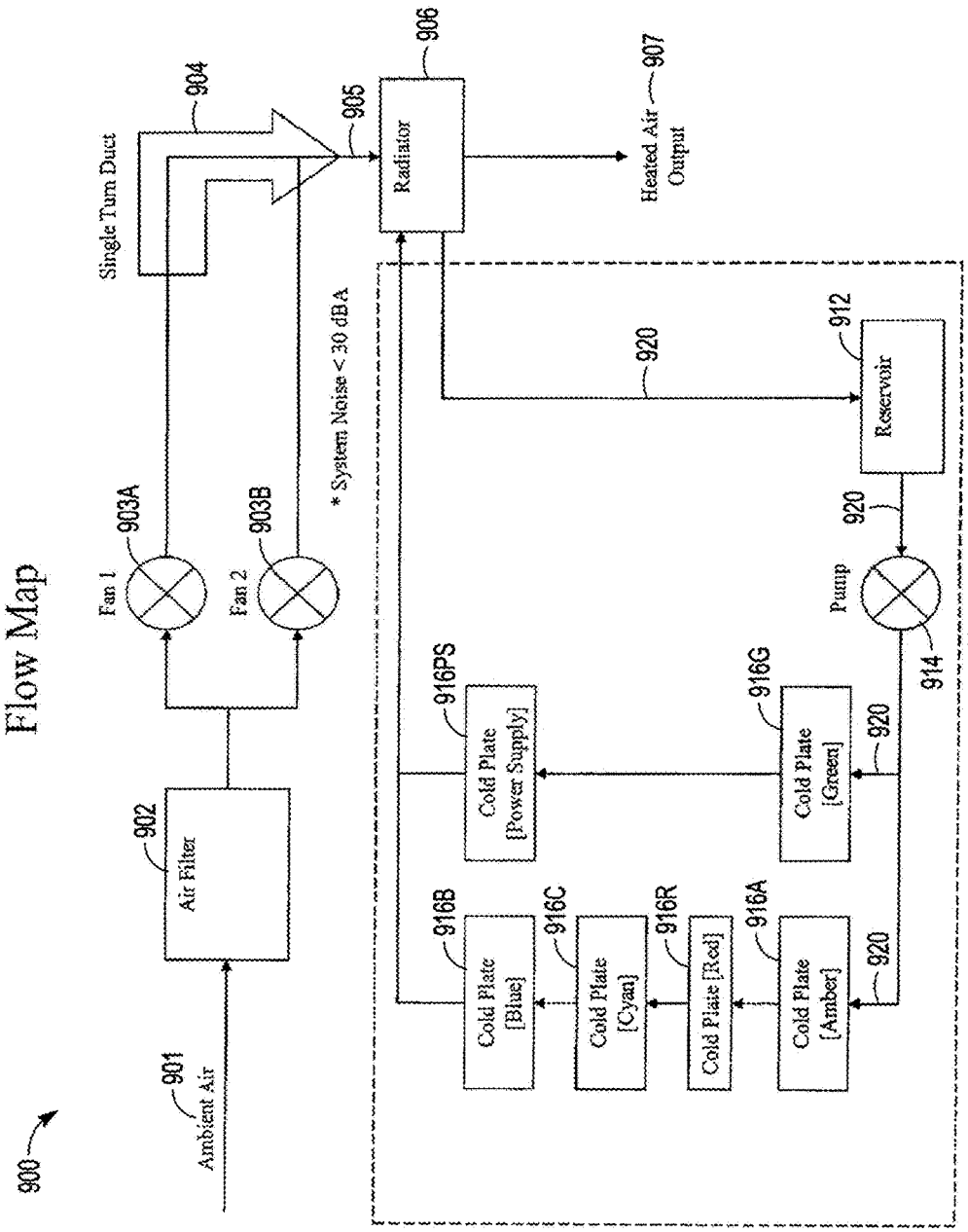

FIG. 16A is a flow map of an active thermal management option for solid state light sources such as FIG. 13A.

Figure 16B:
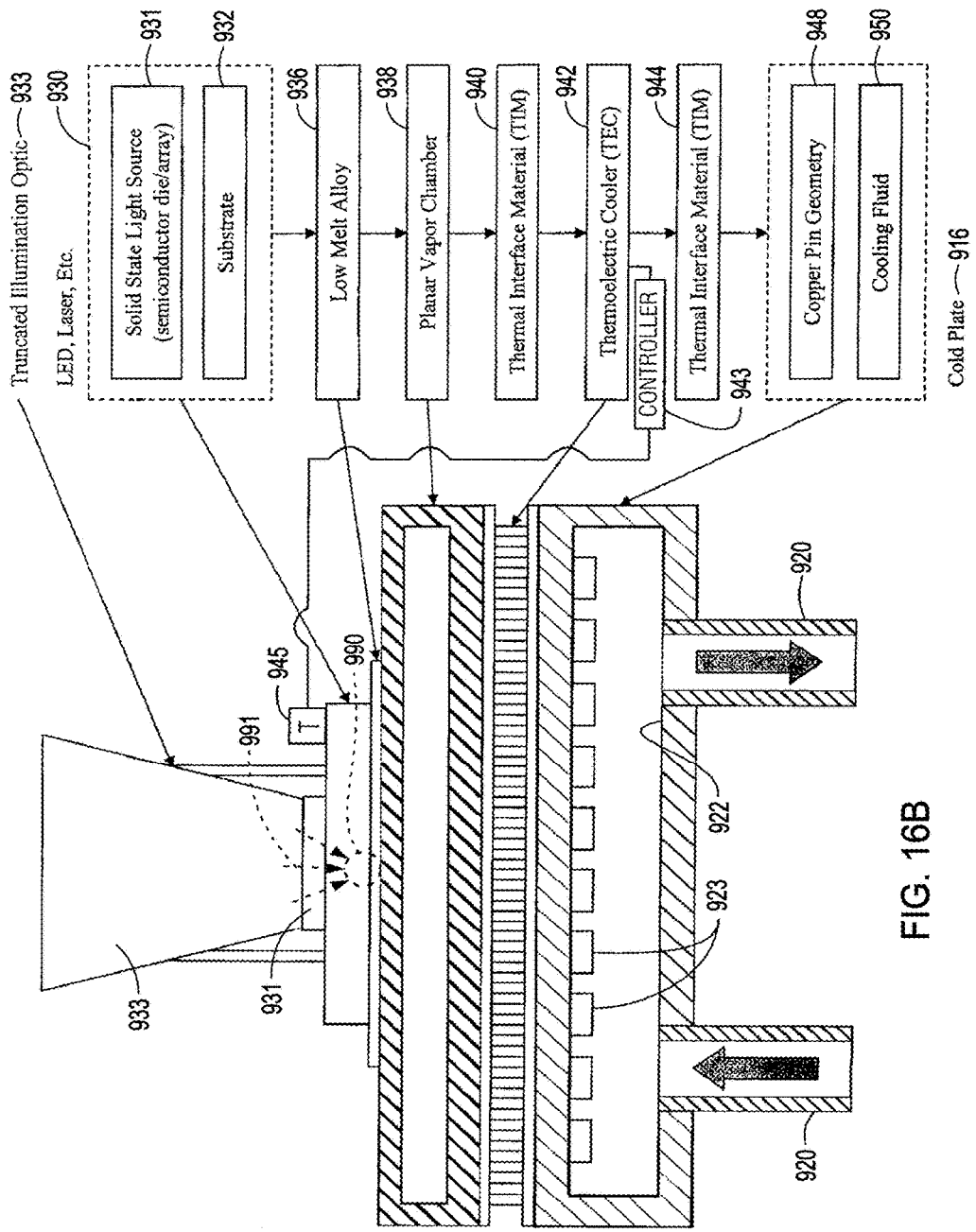

FIG. 16B is a diagrammatic elevation view of a cold plate assembly that could be used with the method of FIG. 16A.

Figure 17:
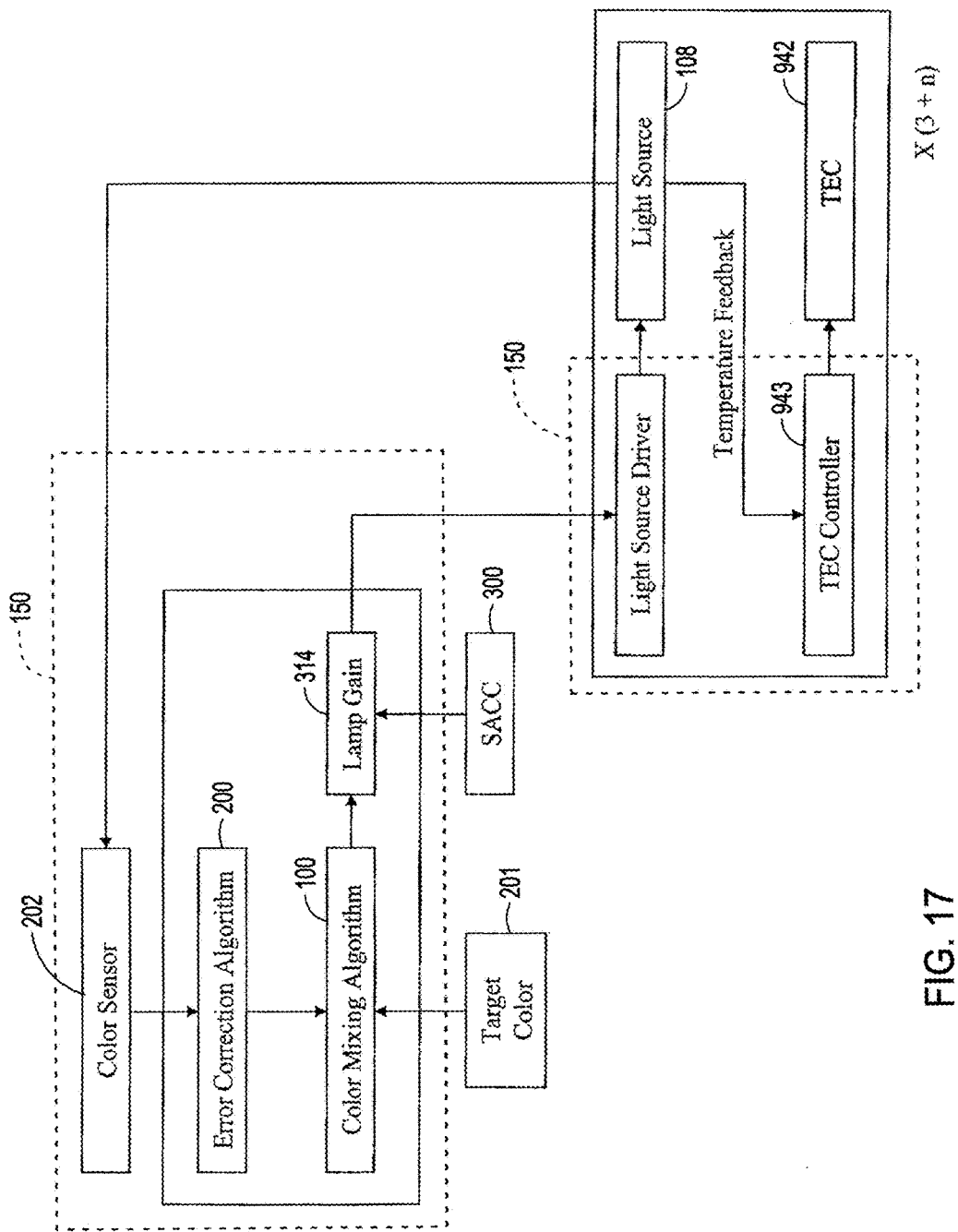

FIG. 17 is a high level block diagram of an exemplary embodiment which includes several different aspects according to the invention.

IV. DETAILED DESCRIPTION OF EXEMPLARY EMBODIMENTS OF THE PRESENT INVENTION

A. Overview

For a better understanding of the aspects of the present invention, exemplary embodiments will now be described in detail. It is not intended that the present invention be limited to the described embodiment. It is intended that the invention cover all modifications and alterations obvious to those skilled in the art, which may be included within the scope of the invention and its aspects, which are defined solely by the appended claims.

B. Color Mixing Algorithm

The algorithm takes well-known display technology and enhances the user's experience by representing the image with more than three primaries. The two main advantages of a multi-primary image system are a wider color gamut and brighter colors, both because more primaries are used.

Figure 2A:
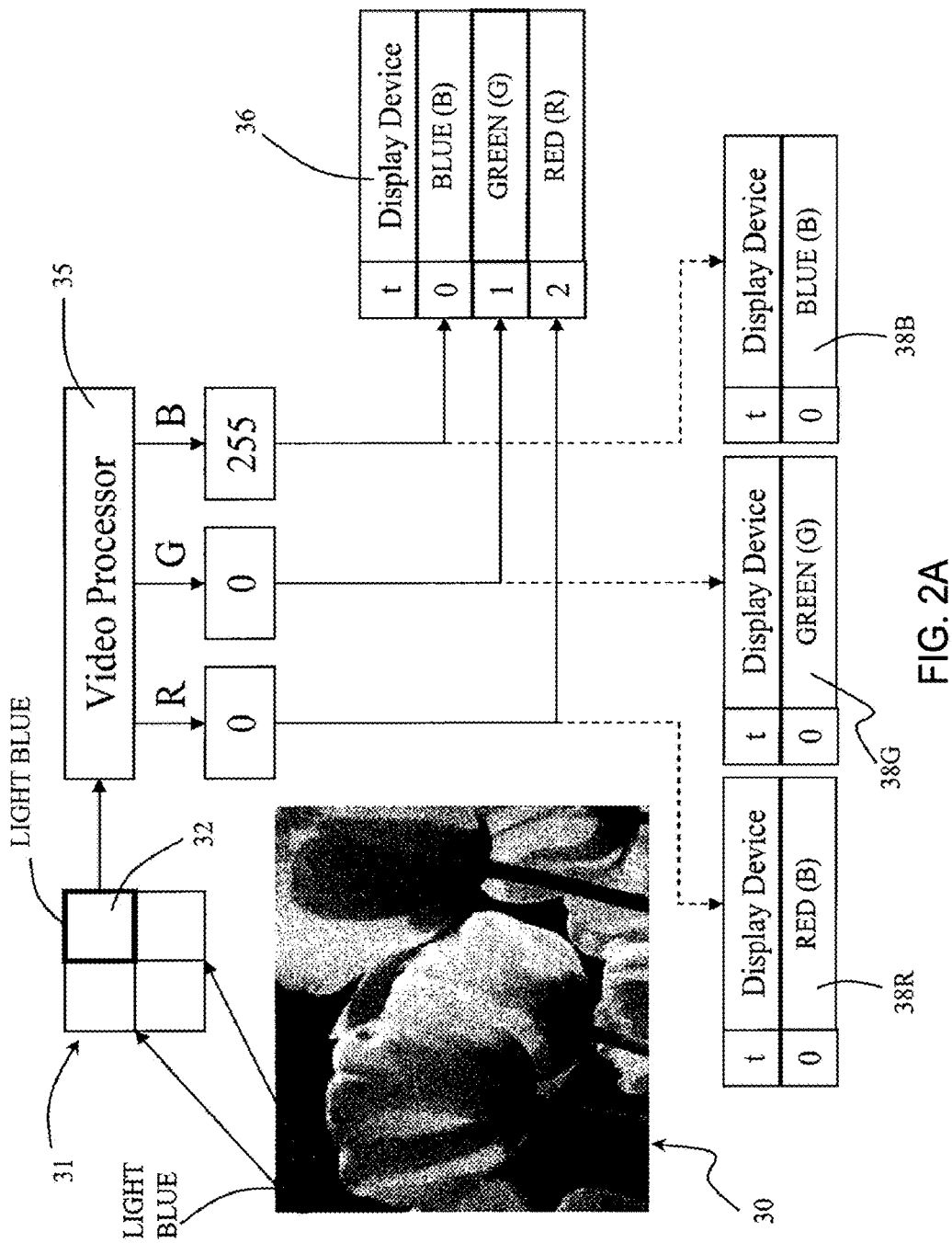
FIG. 2A is a diagram illustrating prior art processing and display of a color image using three primary color sources RGB.
Figure 2B:
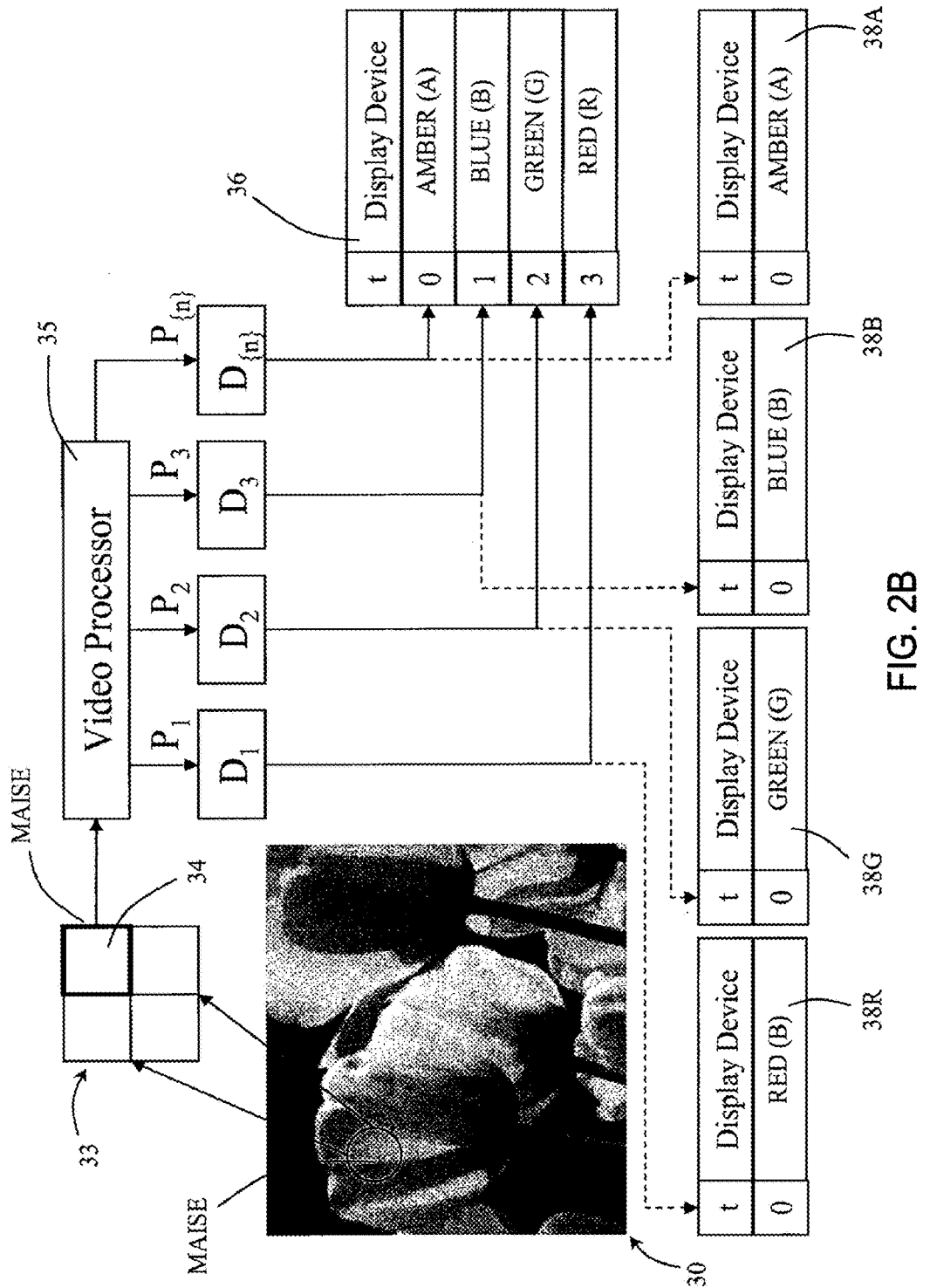
FIG. 2B is a diagram like FIG. 2A but illustrating, at a high level, processing and display of a color image using four or more color sources $P_1$, $P_2$, $P_3$, and $P_4$, according to one aspect of the present invention.

FIG. 2B illustrates the exemplary embodiment. Contrary to the previously described prior art method of FIG. 2A, the exemplary embodiment of FIG. 2B encodes the target color for the pixel using at least four primary colors (here four, namely, red 38R, blue 38B, green 38G and amber 38A to represent a pixel 34 from a maize colored tulip in the image 30). The color mixing algorithm thus has more primaries to characterize the target color, and thus a wider gamut of color for better, more accurate color rendition. An example of a video encoding protocol is high definition multimedia interface (HDMI) video input, but the algorithm is applicable to most, if not all, video inputs.

The algorithm also promotes uniformity of how the colors look each time they appear. The human eye perceives subtle differences in color. This can affect not only the clarity but the enjoyment of such things as TV and movie projection, and also architectural, theatrical, and other lighting.

1. Color Mixing Algorithm Example 1—Tetrachromat System (Colors RBGA)

The color mixing algorithm of this exemplary embodiment is implemented with the following general method steps:
1. The three (XYZ) primary color encoded video signal is processed and color pixel array data extracted.
2. The color mixing algorithm transforms individual pixel data into an array that represents four or more primaries that would display the target color.
3. Primary color data is parsed to display devices or sequentially to a single device.

A projected image is displayed with a larger color gamut and more authentic color representation than an RGB system.

Figure 1A:
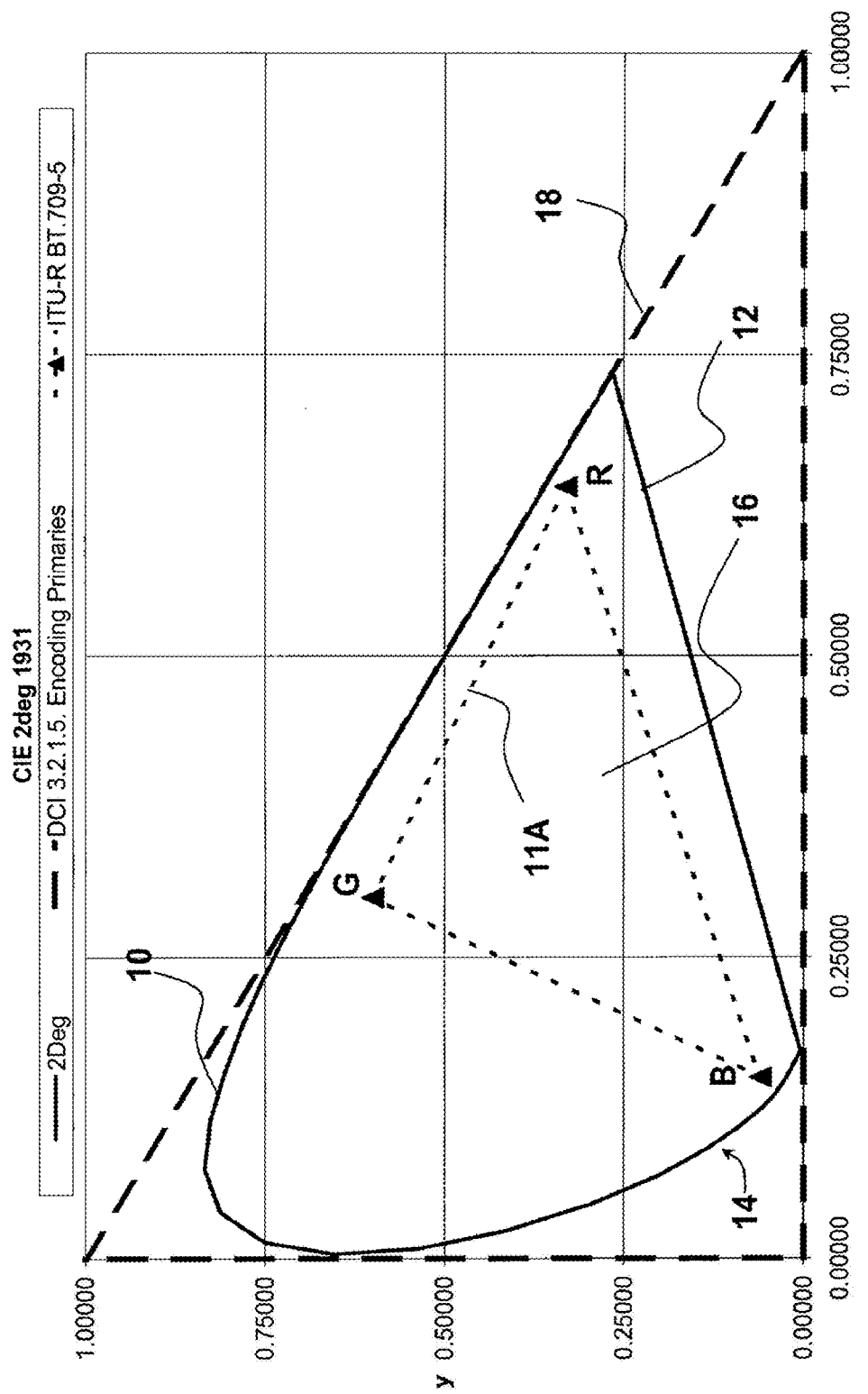
FIG. 1A is a graphical representation of prior art CIE color space with a conventional, state of the art, three primary color area triangle superposed on it.
Figure 1B:
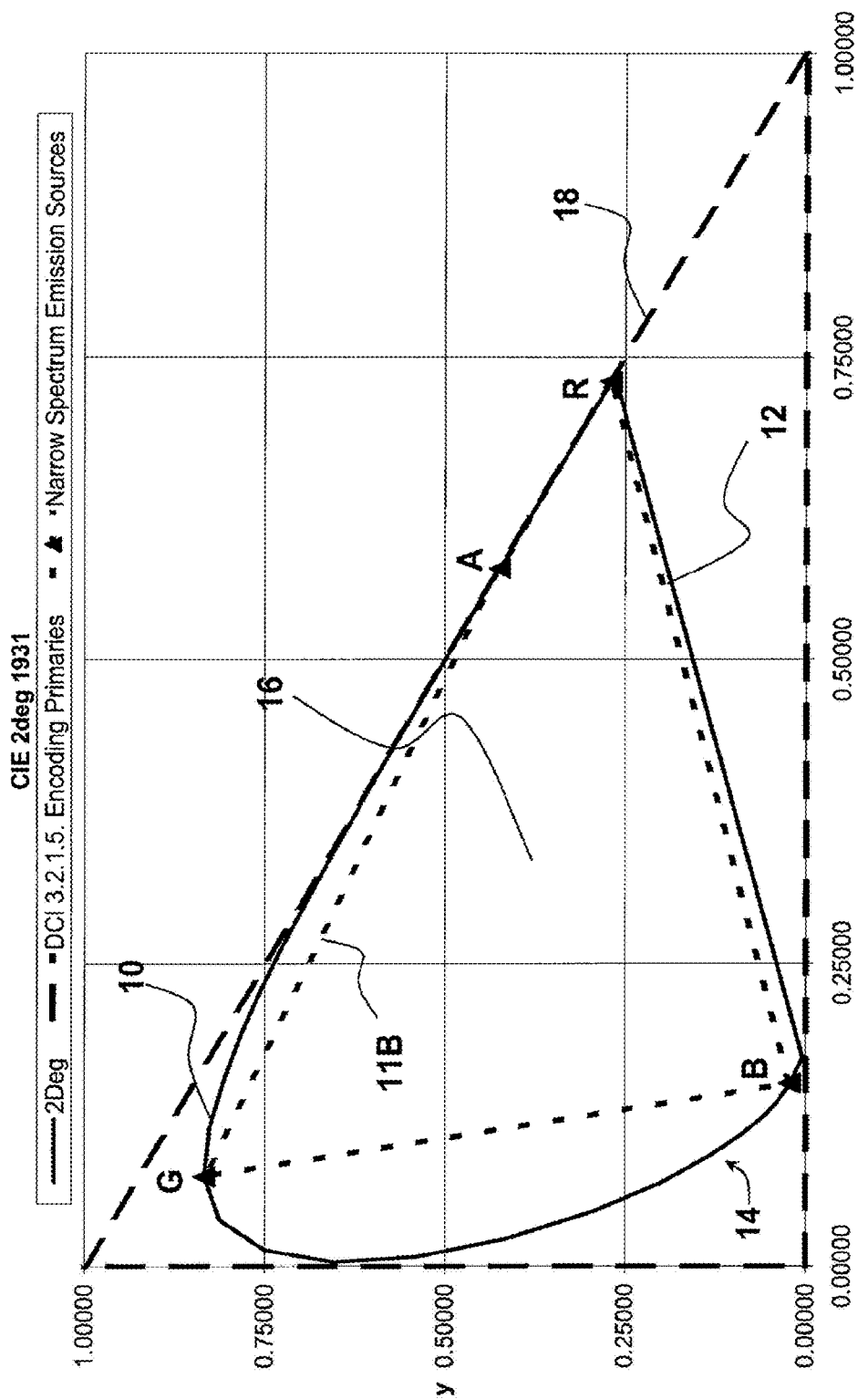
FIG. 1B is a graphical representation of prior art CIE color space with a four primary color area, according to one exemplary embodiment of the present invention, superposed on the CIE color space.
Figure 3A:
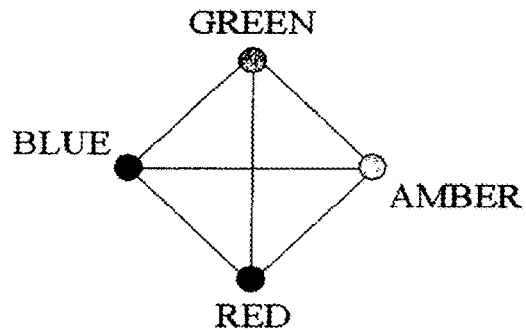
FIG. 3A is an idealized illustration of a four primary color area of FIG. 1B of CIE color space divided into plural triangles by lines between vertices.

In a three-color system such as described in the Background of the Invention, the primaries form one triangle 11A in the CIE color space 14 with vertices RGB (see FIG. 1A). In a four-color or tetrachromat system of the present exemplary embodiment, the primaries (for example, red, amber, green, and blue) form four triangles in color space 14. The vertices of these triangles are RAG, AGB, GBR, and BRA in FIG. 1B. FIG. 3A provides an idealized representation of each of the four triangles relative to their vertices.

FIG. 4A is a flow chart 100 of an example of a color mixing algorithm according to an exemplary embodiment of the present invention. It implements a computed target color into a projection system that effectively and accurately combines at least four primary light sources using two-dimensional color space and matrix calculations for computing the target color.

Contrary to state of the art three-primary systems, the algorithm 100 adds one or more additional primaries for the representation of a pixel's color. This technology could be applied to natively monochromatic sources or traditional white sources filtered for their colored components. Furthermore, the algorithm is not dependant on a particular display device and works with color sequential or parallel modes of operation.

A challenge to processing four or five colors, instead of three, is the processing overhead of the math needed to do so. For example, with high definition (HD) video, approximately 124.4 million pixels a second need to be processed. Thus, the calculations for each pixel must be done in about 8 nanoseconds ($8 \times 10^{-9}$ second). It is not commercially practical to utilize expensive and large processors for most video projectors. Therefore, the method was streamlined to reduce computing overhead.

a) Method (1) Steps 101-103

It must first be determined whether the target color point is inside each of the four triangles of FIG. 3A (see reference number 101 in FIG. 4A). A function $f$ is used that determines whether the target point is to the "right" or "left" of each side of triangle RAG, for example. Each vertex has an (x, y) coordinate expressing its location. Point R has the coordinates $(x_R, y_R)$, point A is located at $(x_A, y_A)$, and point G is at $(x_G, y_G)$. The target color point has the coordinates $(x_c, y_c)$. If the results of the functions are uniformly positive or negative, the target point is inside the triangle. If the results are positive for one or two vertices and negative for the other(s), then the point is outside the triangle. Equation 7 defines the calculation for the red-amber-green (RAG) triangle of FIGS. 1B and 3A:

$$fRA = (y_c - y_R)*(x_A - x_R) - (x_c - x_R)*(y_A - y_R)$$

$$fRA = (y_c - y_G)*(x_R - x_G) - (x_c - x_G)*(y_R - y_G)$$

$$fRA = (y_c - y_A)*(x_G - x_A) - (x_c - x_A)*(y_G - y_A) \quad [7]$$

(2) Step 104

Equations 7 are then repeated for the remaining three triangles AGB, GBR, and BRA. If it is determined that the target point lies within a particular triangle, the color mixing algorithm is calculated using the triangle vertices as the three primary colors.

(3) Step 105

All of the valid primary color results are summed (in this case, all reds would be summed, all ambers, all greens, and all blues). This produces the proportions of the four primary colors required to create the target point. The duty cycles of the primaries are then calculated in order to normalize the proportions to a 0-1 scale. Each of the four total primary results is then divided by the maximum of the four values. In this example, equation 8 defines the duty cycle for red:

$$D_R = \sum_{i=1}^{k} P_{Ri} \quad [8]$$

Where $k$ is the number of triangles containing the target.

Note that the method does not require an unspecified number of iterations or a sufficient starting point in order to provide an accurate solution. In other words, in contrast to the well known Moore-Penrose and Newton method, feedback from the previous triangle calculation is not required in order to determine the outcome of the next and the system is completely solvable without the input of a representative sample of desired outputs. The straightforward nature of the method allows for the calculations to be completed within a short period of time with a standard processor.

The result of algorithm 100 is a modulated output 106 that instructs each light source 108 as to its intensity for a given point in time (e.g. for either producing collectively a reference white color or for illumination using a target color, or for instructing pixel data 107 to drive display devices 109 to collectively produce a target color).

b) Apparatus

The above-described method can be implemented in conventional apparatus, which typically would include a programmable digital processor at the heart of a controller board. The light sources and a digital storage medium could be placed on their own separate board or substrate. Data representing the chromaticity characteristics and degradation profile of the primary light sources can be burned onto a digital storage medium (e.g. EEPROM) on the light source board, as opposed to a controller board. The data would be formatted such that it could be married to any controller board and the information would flow seamlessly into the controller's operational algorithm.

2. Color Mixing Algorithm Example 2—Pentachromat System (Colors RBGAC)

Figure 1C:
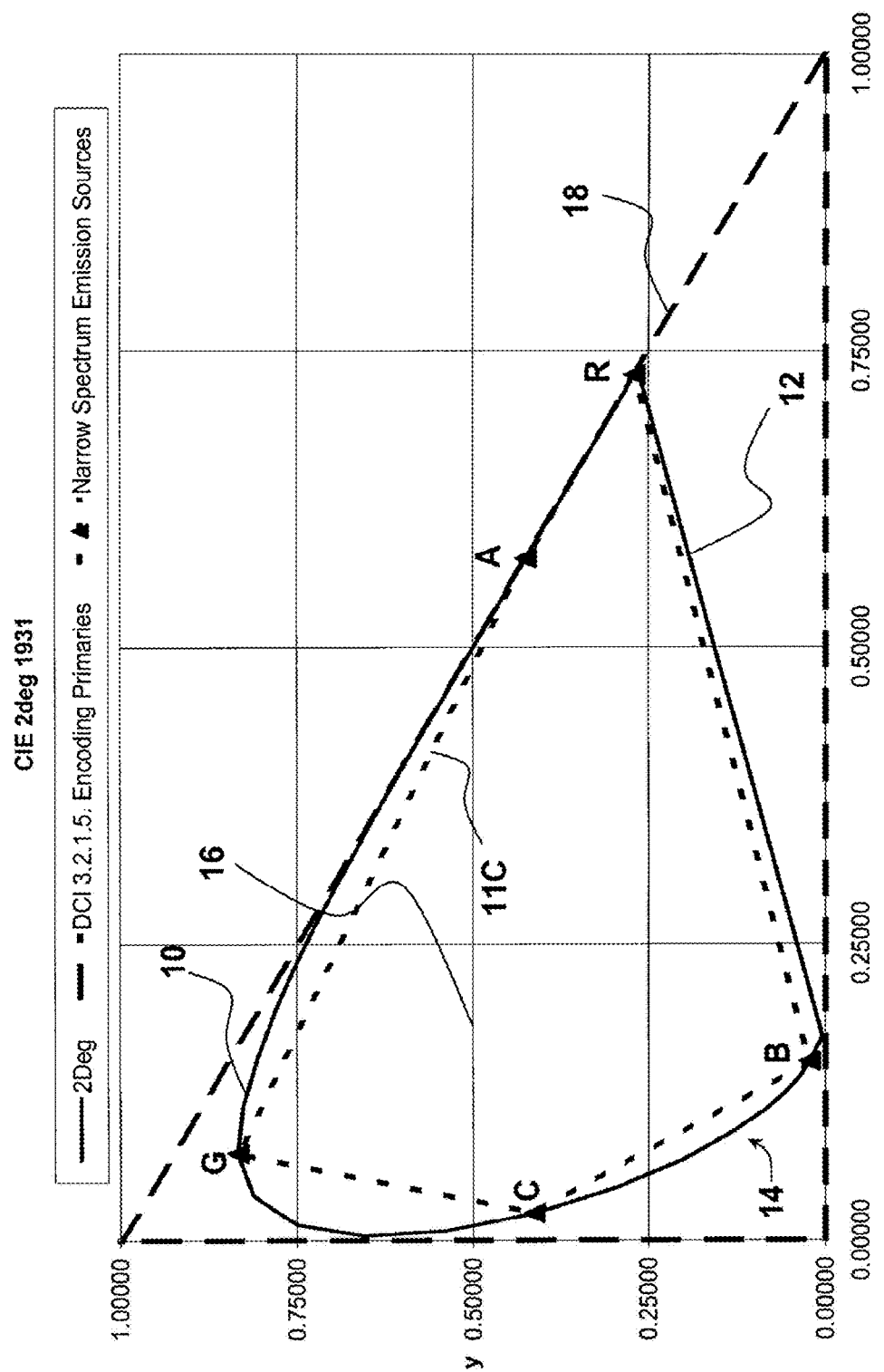
FIG. 1C is a graphical representation of prior art CIE color space with a five primary color area, according to another exemplary embodiment of the present invention, superposed on the CIE color space.
Figure 3B:
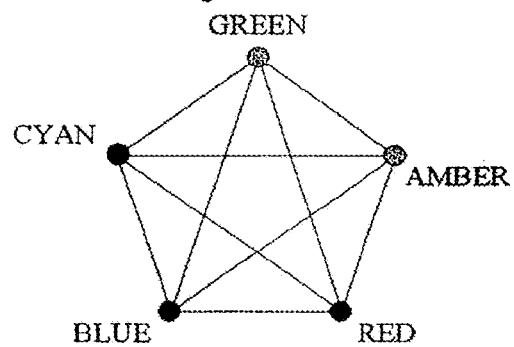
FIG. 3B is an idealized illustration of a five primary color area of FIG. 1C of CIE color space divided into plural triangles by lines between vertices.

The above-described system can be further expanded to include five primary colors. Whereas four primaries created four triangles, five primaries (see FIG. 1C) form 10 triangles. FIG. 3B defines each of the vertices of the ten triangles formed in a red-amber-cyan-green-blue (RACGB) primary system.

At this point, the same procedure is followed as for a tetrachromat system. It is first determined whether the target point $(x_c, y_c)$ is within each of the ten triangles. In the generic form of these equations, $P_1$, $P_2$, and $P_3$ are the vertices of the triangle being tested. Each primary has corresponding x,y coordinates in the CIE color space.

Generic Point within Triangle Test $$fP_1P_2 = (y_c - y_{P_1})*(x_{P_2} - x_{P_1}) - (x_c - x_{P_1})*(y_{P_2} - y_{P_1})$$

$$fP_3P_1 = (y_c - y_{P_3})*(x_{P_1} - x_{P_3}) - (x_c - x_{P_3})*(y_{P_1} - y_{P_3})$$

$$fP_2P_3 = (y_c - y_{P_2})*(x_{P_3} - x_{P_2}) - (x_c - x_{P_2})*(y_{P_3} - y_{P_2}) \quad [9]$$

The color mixing algorithm is run on each triangle that contains the target point. Below is the generic form of the algorithm:

Generic Color Mixing Algorithm color = $(x_c, y_c)$ $$P_1 = -\frac{y_{P_1}[x_{P_3}(y_c - y_{P_2}) + x_c(y_{P_2} - y_{P_3}) + x_{P_2}(y_{P_3} - y_c)]}{y_c \cdot Y'_{P_1} \cdot [x_{P_3}(y_{P_2} - y_{P_1}) + x_{P_2}(y_{P_1} - y_{P_3}) + x_{P_1}(y_{P_3} - y_{P_2})]}$$

$$P_2 = -\frac{y_{P_2}[x_{P_3}(y_c - y_{P_1}) + x_c(y_{P_1} - y_{P_3}) + x_{P_1}(y_{P_3} - y_c)]}{y_c \cdot Y'_{P_2} \cdot [x_{P_3}(y_{P_2} - y_{P_1}) + x_{P_2}(y_{P_1} - y_{P_3}) + x_{P_1}(y_{P_3} - y_{P_2})]}$$

$$P_3 = -\frac{y_{P_3}[x_c(y_{P_2} - y_{P_1}) + x_{P_2}(y_{P_1} - y_c) + x_{P_1}(y_c - y_{P_2})]}{y_c \cdot Y'_{P_3} \cdot [x_{P_3}(y_{P_2} - y_{P_1}) + x_{P_2}(y_{P_1} - y_{P_3}) + x_{P_1}(y_{P_3} - y_{P_2})]}$$

[10]

As in a tetrachromat system, the primary color results are then summed (all reds summed, all ambers, all cyans, all greens, and all blues) to produce the proportion of the five primaries needed to create the target point. The proportions are then normalized to a 0-1 scale by dividing each of the five primary results by the maximum of the five values. In the duty cycle calculation below, k is the number of triangles containing the target point and n is the first term in the primary array.

Generic Duty Cycle Calculation: [11]

$$D_{P_n} = \sum_{i=1}^{k} P_{ni}$$

$$D_{P(n+1)} = \sum_{i=1}^{k} P_{(n+1)i}$$

$$D_{P(n+2)} = \sum_{i=1}^{k} P_{(n+2)i}$$

...

In the equations above, when k=0, the sum must equal zero. Negative results are not summed because they are not within the triangle.

3. Color Mixing Algorithm Example 3—More than Five Colors

This color mixing system could be expanded to more than five colors, and beyond the examples given, using the concepts described. A simple equation calculates the number of triangles that need to be tested for a given number of primary colors. The generic form of this equation determines the number of permutations of n items chosen from a group of m items. For the purposes of color mixing, it must be determined how many triangles (or groups of 3) are formed in an m-color system. The triangles are tested and the algorithm runs exactly as for tetra- and pentachromat systems.

$$C(m, n) = \frac{m!}{(n)!(m-n)!}$$ [12]

$$C(m) = \frac{m!}{6(m-3)!}$$

4. Exemplary Implementation of Color Mixing Algorithm

Figure 4B:
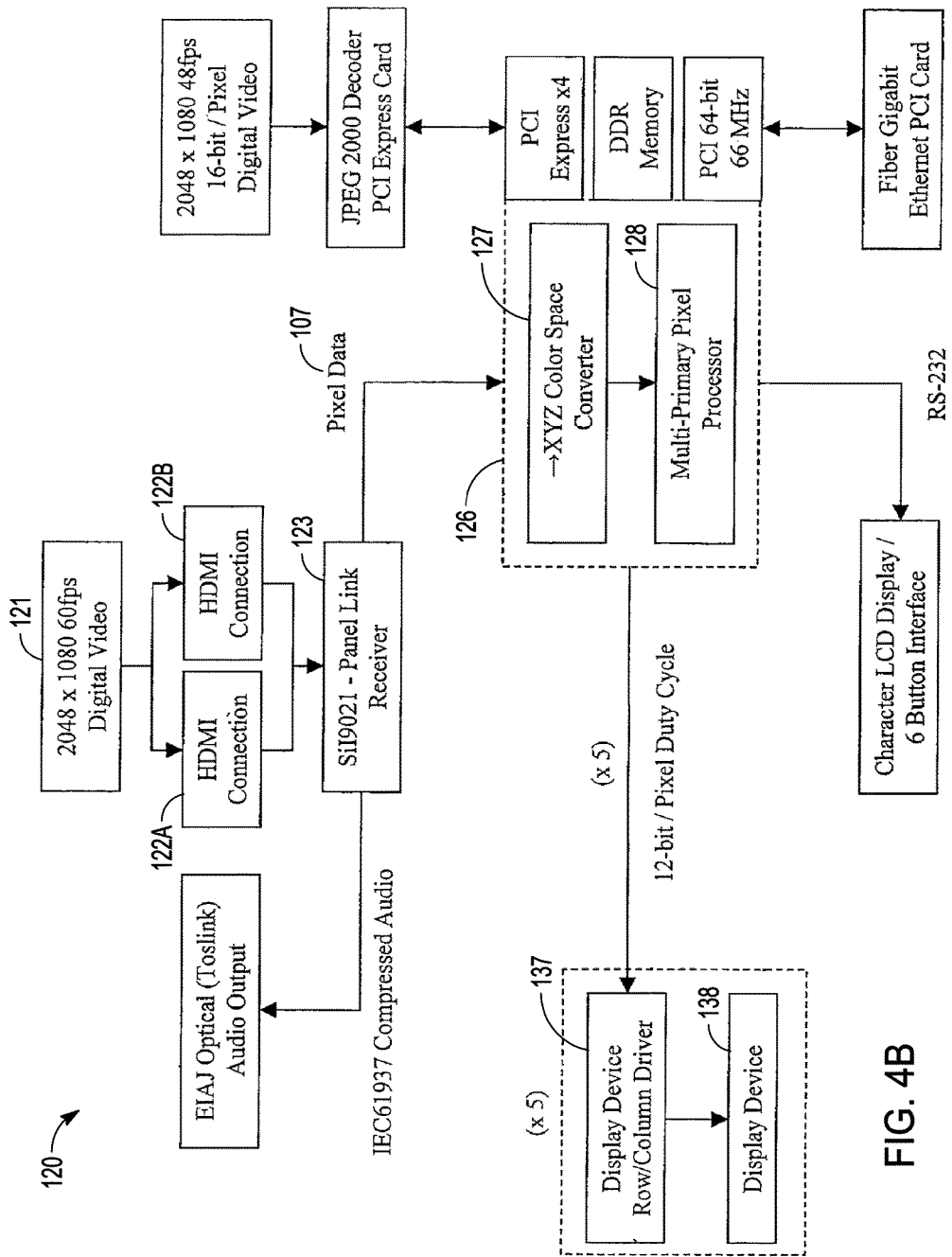
FIG. 4B is a block diagram of one example of an implementation of the algorithm of FIG. 4A.

FIG. 4B is a block diagram illustrating one example of an implementation of a color mixing algorithm like that discussed with respect to FIG. 4A. FIGS. 5A-G illustrate additional specifics about such an implementation.

FIG. 17 is a block diagram that places the color mixing algorithm in context of a complete multi-primary illumination system. Color mixing algorithm 100 would receive a target color instruction 201 from input data and generate a lamp gain instruction 314 that would be passed to the driver for each light source 108. In this manner, color mixing algorithm controls the intensity of light source 108. It is to be understood that this arrangement would be used for each light source 108. In the embodiments described herein, there are more than three (3+n) light sources that each have their color controlled by the system of FIG. 17. The four or more light sources can be used to produce combined illumination (e.g. pure white when all the light sources are combined or any color possible by mixing of the sources). On the other hand, as is well known, each light source 108 could be projected through a display device 137/138 (not shown in FIG. 17, but shown in FIG. 5A) (e.g. a pixilated light valve such as LCD, LCoS, or DMD) to project a static image or video images. Error correction (see reference numerals 200 and 202), contrast control (reference numeral 300), and heat management (reference numerals 942 and 943) will be discussed in later sections.

Figure 5A:
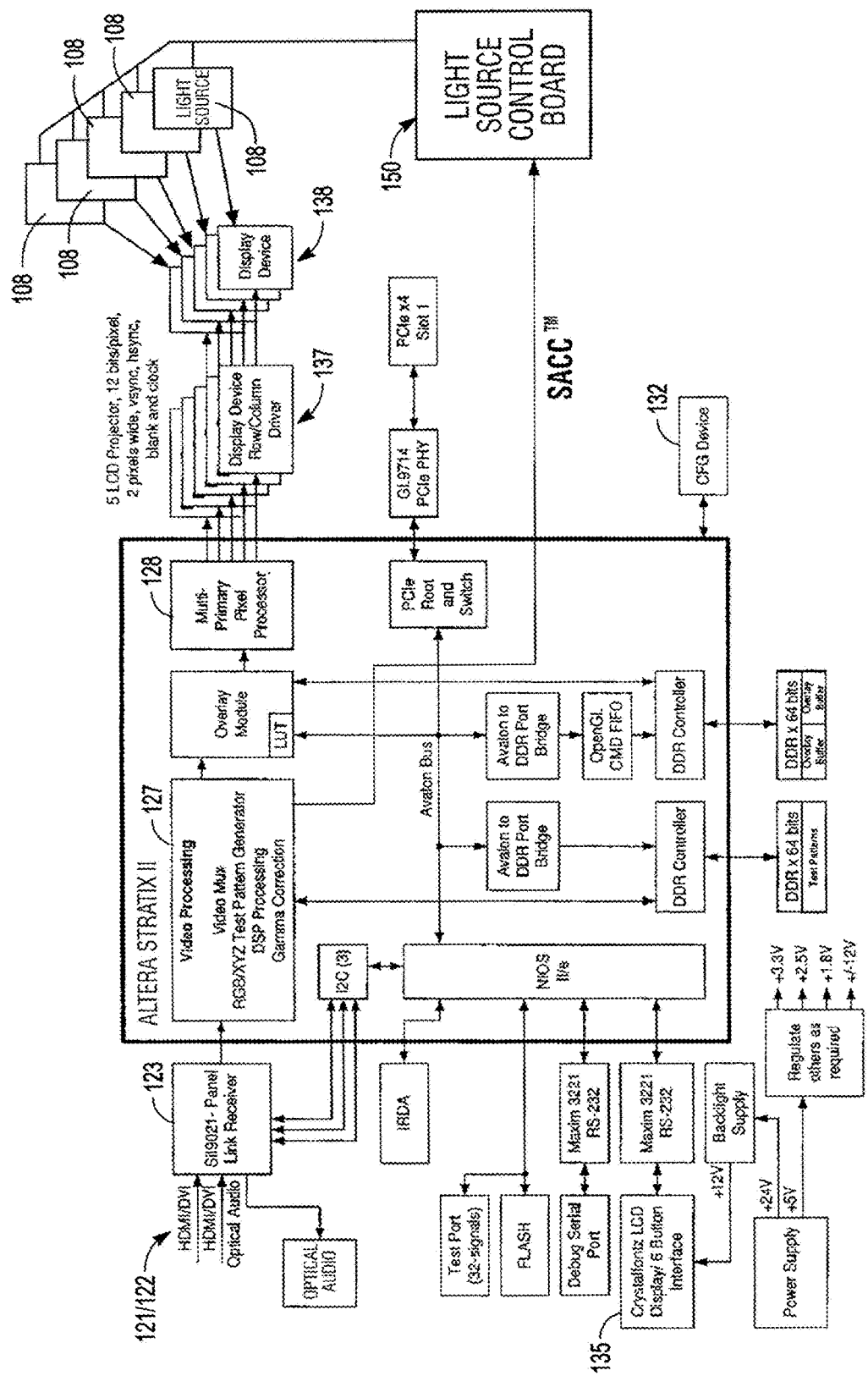
Figure 5B:
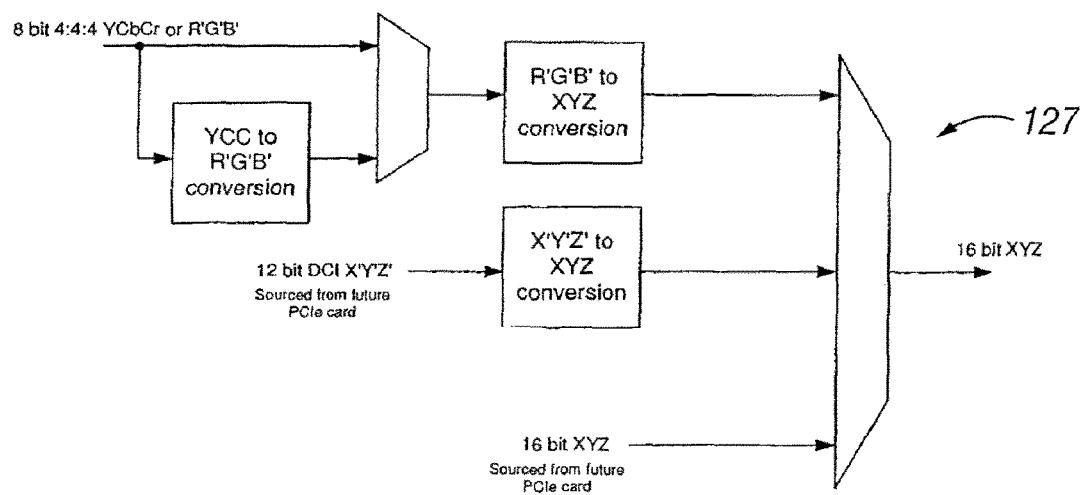
Figure 5C:
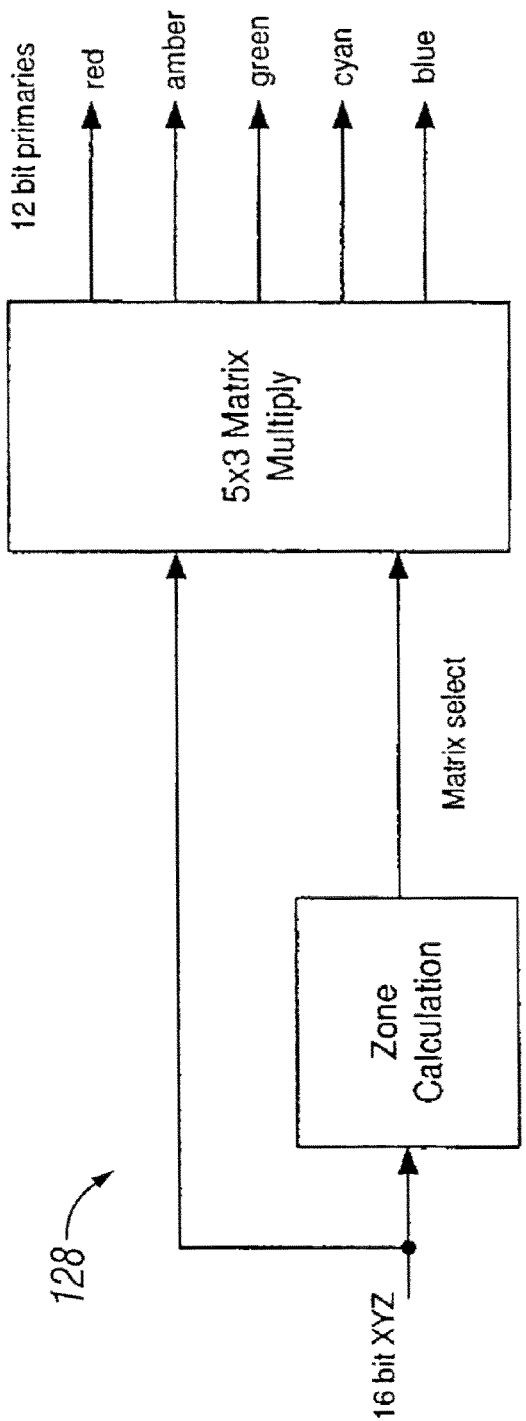
Figure 5D:
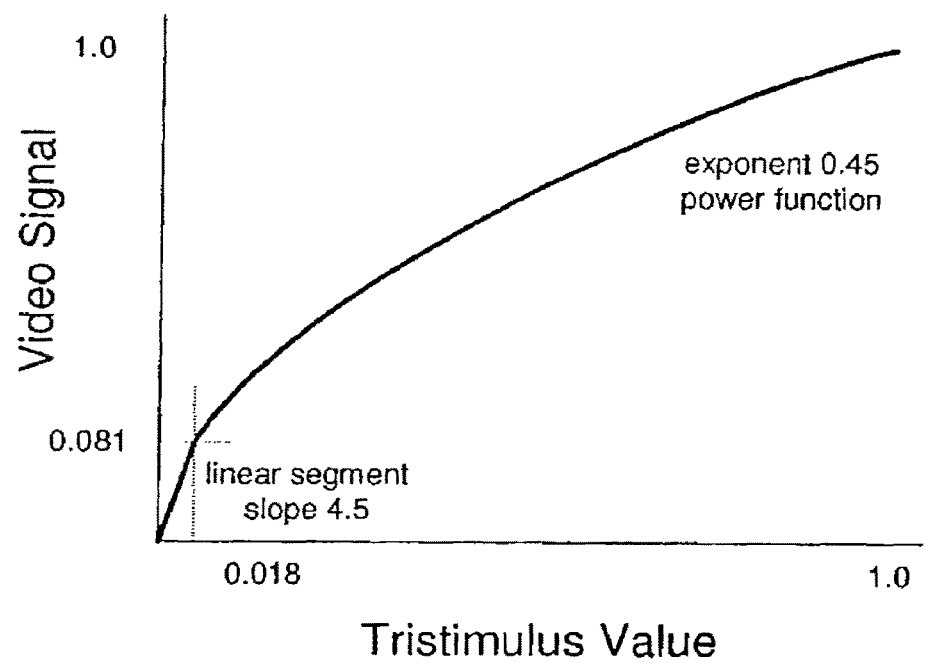

This exemplary embodiment is in the context of a high definition (HD) projector using a field programmable gate array (FPGA) chip to provide video processing functions (see generally ref no. 120). FIGS. 4B and 5A show block diagrams of the same. The device could be implemented in other integrated circuits, such as an ASIC instead of FPGA. As can be appreciated, the embodiment of FIG. 5A is described in the context of driving LCD's, but could drive any display device.

Input video data is an HDMI compliant video stream decoded by a Silicon Image (Sunnyvale, Calif. USA) type SIL9021CTU-7 decoder chip. Input video will be 1920× 1080 (1080p) pixels, progressive scan, 60 Hz, 24-bit R'G'B' or Y'CbCr video data. As further discussed, projector 120 will include these features:

1. Programmable Test Pattern Generation
2. Tri-channel programmable Gamma Correction
3. XYZ Color Space Conversion for increased gamut
4. Hardware—what is called a symbology overlay with OpenGL graphics provided by an on-chip NIOS II processor and DDR RAM overlay buffer. The symbology overlay is available from Digital Design Corp., Palatine, Ill. USA. Details can be found at http://www.digidescorp.com/products/IP/DataSheets/DDC_symbology_overlay.pdf
5. Multi-Primary Pixel Processor for conversion to 5-primary colorspace
6. IRDA port for remote control 7. Interface to Flash memory for multipurpose data storage
8. RS-232 interface to CrystalFontz LCD display w/6 button interface (available from CrystalFontz America, Inc., Spokane Valley, Wash. USA).
9. PCI Express or PCIe core, a well known implementation of the PCI, to allow expandability, such as custom hardware decoding cards.
10. Output to display devices (here 5 LCDs).

The high definition projector (HDP) FPGA 120 will take as input a 1080p 60 Hz video signal 121/122 which is sourced from an HDMI decoder IC. It will then perform several video processing tasks, and drive a 5-primary display device projector system (ref no. 126) for projection display.

The signal processing chain includes two major blocks, what will be called Color Space Conversion block 127 and XYZ to 5-primary conversion block 128.

Color Space Conversion block 126 must accept 8 bit/channel 4:4:4 YCbCr or R'G'B' data or 12 bit/channel DCI X'Y'Z' data and generate 16 bit/channel XYZ data at the output. See FIG. 5B.

XYZ to 5-primary Conversion block 128 accepts the 16 bit/channel XYZ and generates the 12 bit/channel primary control signals. See FIG. 5C.

Incoming video from Silicon Image decoder IC 123 can be encoded with two possible colorspaces, namely $^{709}$Y'Cb'Cr', or Gamma Corrected RGB (R'G'B'). The pixel data will be converted to the XYZ colorspace prior to symbology overlay 139 and 5 primary conversion.

If the incoming video is already R'G'B', this conversion is skipped. If the incoming video is 8-bit $^{709}$Y'CbCr, it is first converted to gamma-corrected R'G'B' with Eq. i:

$$\begin{bmatrix} R' \\ G' \\ B' \end{bmatrix} = \begin{bmatrix} 1 & 0 & 1.5748 \\ 1 & -0.187324 & -0.468124 \\ 1 & 1.8556 & 0 \end{bmatrix} \cdot \left( \begin{bmatrix} ^{709}Y' \\ Cb \\ Cr \end{bmatrix} - \begin{bmatrix} 16 \\ 128 \\ 128 \end{bmatrix} \right) \quad [i]$$

Only a subset of valid $^{709}$Y'CbCr codewords fall within 0-255 values in the R'G'B' space after transformation—according to modeling, 75.8% of codewords are out of range. These values can be clipped, however the out of range data can be maintained into the XYZ space and clip the values there in order to preserve maximum accuracy, since some illegal R'G'B' values may fall as legal XYZ values after the conversion process is complete.

Modeling indicates that the possible ranges of the R'G'B' values are:

$R' = \{-202 \ldots 455\}$ $G' = \{-83 \ldots 339\}$ $B' = \{-238 \ldots 491\}$

Therefore, the R'G'B' values can be expressed as signed 10-bit binary (s9) numbers without resorting to clipping, providing a range of +/−512.

Pixel data in the R'G'B' space has been gamma corrected, and this correction must be undone before the values can be converted into the XYZ colorspace. This conversion will be implemented in programmable look up table (LUT) 140 to provide flexibility, and because several different transfer functions are in widespread use. The LUT approach also allows non-linear transfer functions to be expressed easily. For example, the transfer function specified for Rec. 709 (FIG. 5D) is an exponent of 0.45, with a linear segment of slope 4.5 near the black level to prevent the infinite slope a pure exponential would provide.

Conversion of Rec. 709 RGB to CIE XYZ can be accomplished with the matrix transform in Eq. ii:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \cdot \begin{bmatrix} R_{709} \\ G_{709} \\ B_{709} \end{bmatrix} \quad [ii]$$

Figure 5E:
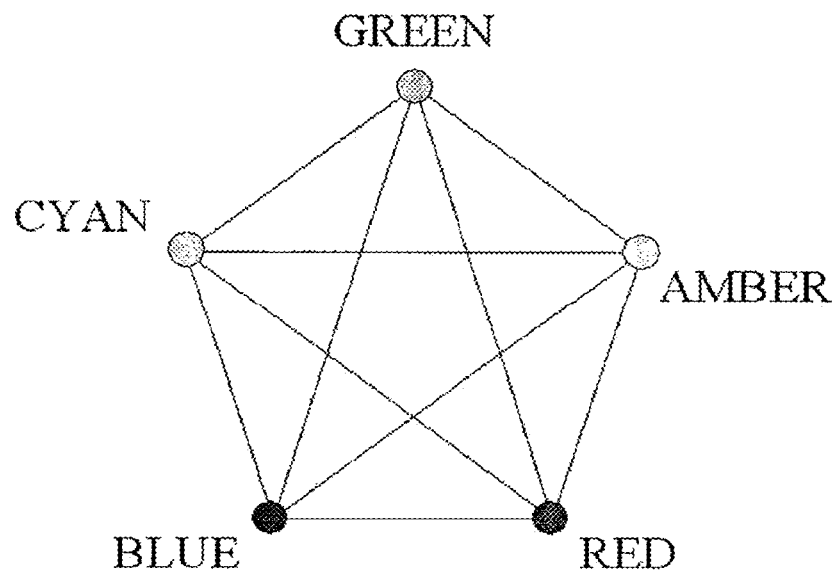

As described previously, the gamut of the 5-primary color space is defined by the chromaticity coordinates of the five primaries. These points enclose the convex two dimensional space 14 of FIG. 1C. Additionally, there are ten possible triangular sub-gamuts as shown in FIGS. 3B and 5E.

The algorithm for conversion from XYZ color space to the 5-primary color space involves detecting which of the ten sub-gamuts the desired color belongs to. A conversion from XYZ to each 3-primary sub-gamut is calculated and the results are averaged to form the conversion from XYZ to 5-primary space.

In order to reduce the complexity of the hardware, as many calculations as possible must be pre-computed. The color conversion algorithm turns out to be fairly deterministic (it behaves predictably). One difference between the methodology of this exemplary embodiment and that described with respect to FIG. 3B, is that the gamut is divided into eleven zones, see numbers 1-11 in FIG. 5F, as opposed to the ten zones of FIG. 3B.

By determining which of the eleven zones the desired color is in, the associated triangular sub-gamuts are determined. Consequently the conversion matrix from XYZ to 5-primary space can be pre-computed. The details of this are presented below.

Figure 5F:
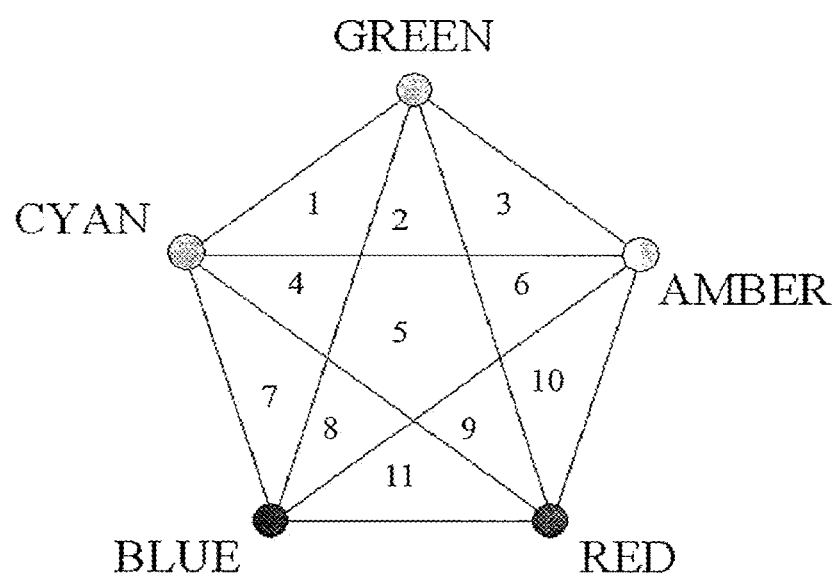
Figure 5G:
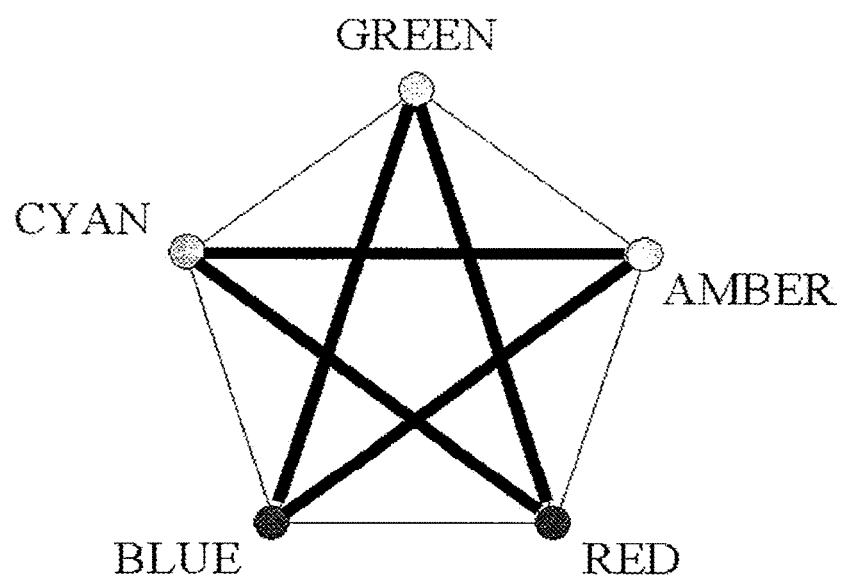

A given pixel P (X,Y,Z) must be located within one of the eleven 5-primary gamut zones of FIG. 5F. In order to determine in which zone the pixel resides, it must first be transformed into the two dimensional CIE chromaticity coordinate space. The location of an incoming pixel in CIE space is determined based on the XYZ colorspace values according to Eq. iii.

$$x = \frac{X}{X+Y+Z}$$
$$y = \frac{Y}{X+Y+Z} \quad [iii]$$

Now that the coordinates of the pixel P(x,y) are known, we must also know the coordinates of the 5 primary colors in order to locate the zones. Sample primary coordinates are listed in Table 1 below. These values will be programmable and dependent on the colors of the lamps in the projector.

TABLE 1

| xy Coordinates of Primary Colors | | |
|---|---|---|
| | x | y |
| $R_p$ | 0.6990 | 0.2861 |
| $Y_p$ | 0.5920 | 0.4016 |
| $G_p$ | 0.2867 | 0.6866 |
| $C_p$ | 0.0590 | 0.3730 |
| $B_p$ | 0.1570 | 0.0213 |

The 5-primary gamut is subdivided into zones by five internal lines between the five primary points. These lines are highlighted in FIG. 5G. We will not be making a determination of whether P(x,y) is out of gamut, therefore the five outside lines will be ignored. We can determine which zone P(x,y) resides in by determining which side of each of the internal lines P(x,y) is on, and then using a LUT to determine the zone. The procedure is as follows:

1) Find vectors which start at the pixel P(x,y), and terminate at each respective primary coordinate. These five vectors now represent the bearing and distance to each of the 5 primary points, and will be referred to as $$\vec{R}(x,y), \vec{A}(x,y), \vec{G}(x,y), \vec{C}(x,y), \vec{B}(x,y)$$

2) We can now calculate the Determinant (2D cross product) of each pair of vectors corresponding to one of the five internal lines (Eq. iv):

$$D_{BG} = \begin{vmatrix} \vec{B}(x) & \vec{G}(x) \\ \vec{B}(y) & \vec{G}(y) \end{vmatrix}$$ [iv]

$$D_{BY} = \begin{vmatrix} \vec{B}(x) & \vec{Y}(x) \\ \vec{B}(y) & \vec{Y}(y) \end{vmatrix}$$

$$D_{CR} = \begin{vmatrix} \vec{C}(x) & \vec{R}(x) \\ \vec{C}(y) & \vec{R}(y) \end{vmatrix}$$

$$D_{CY} = \begin{vmatrix} \vec{C}(x) & \vec{Y}(x) \\ \vec{C}(y) & \vec{Y}(y) \end{vmatrix}$$

$$D_{GR} = \begin{vmatrix} \vec{G}(x) & \vec{R}(x) \\ \vec{G}(y) & \vec{R}(y) \end{vmatrix}$$

3) The polarity of the five resulting determinants index a lookup table (Table 2) which provides the corresponding zone of P(x,y).

TABLE 2

Zone Determinant Polarity Table (Det polarity)

| Zone | $D_{BG}$ | $D_{BY}$ | $D_{CR}$ | $D_{CY}$ | $D_{GR}$ |
|---|---|---|---|---|---|
| 1 | + | + | + | + | − |
| 2 | − | + | + | + | − |
| 3 | − | + | + | + | + |
| 4 | + | + | + | − | − |
| 5 | − | + | + | − | − |
| 6 | − | + | + | − | + |
| 7 | + | + | − | − | − |
| 8 | − | + | − | − | − |
| 9 | − | − | + | − | − |
| 10 | − | − | + | − | + |
| 11 | − | − | − | − | − |

Once the zone has been determined, one of the eleven pre-computed color conversion matrices is used to generate the drive signals for each of the primaries. The actual conversion multiplies the XYZ vector by the conversion matrix, to generate the 5 element output vector of drive signals. This can be expressed as:

$$\begin{bmatrix} R \\ A \\ G \\ C \\ B \end{bmatrix} = M_k \begin{bmatrix} X \\ Y \\ Z \end{bmatrix}$$ [v]

where $M_k$ is a 5×3 color conversion matrix, and k is the zone in which this XYZ point lies.

Each of the zones of the gamut consists of an intersection of several triangles whose vertices are three of the five primaries. For example, referring to the zone diagram (diagram 3, below), zone 1 is an intersection of the three triangular sub-gamuts, AGC, GCB and RGC. A complete list of the zones with the intersecting triangles follows:

Diagram 3: 5-Primary Conversion Zones

| Zone | Intersecting Triangular Sub-gamuts |
|---|---|
| 1 | AGC, GCB, RGC |
| 2 | AGC, RBC, RGB |
| 3 | RAG, AGC, AGB |
| 4 | GCB, ACB, RGC |
| 5 | RGB, RAC, AGB, RGC, ACB |
| 6 | RAG, RAC, ACB |
| 7 | ACB, GCB, RCB |
| 8 | RCB, AGB, RGB |
| 9 | RGC, RAB, RGB |
| 10 | RAG, RAB, RAC |
| 11 | RAB, RGB, RCB |

To compute the color conversion matrix for each zone, the inverse of the 3×3 matrix made up of the XYZ primaries for each intersecting triangle is computed. These matrices are used to populate the appropriate rows of a set of larger 5×3 matrices with the remaining matrix entries set to zero. This group of 5×3 matrices is then averaged to form the final conversion matrix. The following example for Zone 1 illustrates the computation. The primaries colors are indicated by the triple $X_p Y_p Z_p$, where p refers to one of the five primaries: R, A, G, C, B.

Thus, the method uses the following two foundational steps:

a. First compute 3×3 conversion matrix for each of the three intersecting triangles:

$$N_{AGC} = \begin{bmatrix} X_A & Y_A & Z_A \\ X_G & Y_G & Z_G \\ X_C & Y_C & Z_C \end{bmatrix}^{-1}$$ [vi]

$$N_{GCB} = \begin{bmatrix} X_G & Y_G & Z_G \\ X_C & Y_C & Z_C \\ X_B & Y_B & Z_B \end{bmatrix}^{-1}$$

$$N_{RGC} = \begin{bmatrix} X_R & Y_R & Z_R \\ X_G & Y_G & Z_G \\ X_C & Y_C & Z_C \end{bmatrix}^{-1}$$

b. Place each of the 3×3 conversion matrices inside a 5×3 sub-gamut conversion matrix and pad the remaining entries with zero. The notation $N_{AGC1,2}$ indicates the matrix element in row 1, column 2 of the 3×3 conversion matrix $N_{AGC}$.

$$M_{AGC} = \begin{bmatrix} 0 & 0 & 0 \\ N_{AGC1,1} & N_{AGC1,2} & N_{AGC1,3} \\ N_{AGC2,1} & N_{AGC2,2} & N_{AGC2,3} \\ N_{AGC3,1} & N_{AGC3,2} & N_{AGC3,3} \\ 0 & 0 & 0 \end{bmatrix} \quad [\text{vii}]$$

$$M_{GCB} = \begin{bmatrix} 0 & 0 & 0 \\ 0 & 0 & 0 \\ N_{GCB1,1} & N_{GCB1,2} & N_{GCB1,3} \\ N_{GCB2,1} & N_{GCB2,2} & N_{GCB2,3} \\ N_{GCB3,1} & N_{GCB3,2} & N_{GCB3,3} \end{bmatrix} \quad [\text{viii}]$$

$$M_{RGC} = \begin{bmatrix} N_{RGC1,1} & N_{RGC1,2} & N_{RGC1,3} \\ 0 & 0 & 0 \\ N_{RGC2,1} & N_{RGC2,2} & N_{RGC2,3} \\ N_{RGC3,1} & N_{RGC3,2} & N_{RGC3,3} \\ 0 & 0 & 0 \end{bmatrix} \quad [\text{ix}]$$

c. Finally, compute the element by element average of the group of 5×3 matrices:

$$M_1 = \frac{(M_{AGC} + M_{GCB} + M_{RGC})}{3} \quad [\text{x}]$$

A similar calculation follows for each of the eleven zones of the gamut in FIG. 5F. These can all be pre-computed and saved in tables in the hardware.

There is some flexibility in the final computation of the zone matrix. The example given above used an average of the sub-gamut conversion matrices since this matched the computations of the original reference model, however, any linear combination of the matrices would be a valid solution. It may be possible to choose some other linear combination which optimizes the system with respect to some performance parameter. For example, if observer metamerism is to be reduced, certain combinations of the sub-gamut matrices may minimize the overall change of the reproduced spectrum when crossing zone boundaries. This calculation may be pre-computed as in the above example and applied globally. It may also be computed in real time based on the xy coordinates of each pixel. This, of course, would require further analysis and hardware but does provide an option for future system enhancements.

Details and further information regarding concepts described above can be found at Poynton, C., *Digital Video and HDTV—Algorithms and Interfaces*, Morgan Kaufmann, 2003, including pg. 317 and 251, incorporated by reference herein.

5. Summary Re Color Mixing Algorithms

It can therefore be seen that the exemplary embodiments of the color mixing algorithm generally involve a method of breaking up a color space into square matrices so that it can be solved. The solution requires the inversion of a matrix, but this cannot be performed because each primary is described in terms of tristimulus values (X,Y,Z) and the inclusion of more than three primaries would result in a matrix that is non-square. The invention discloses an algorithm that essentially breaks up the non-square matrix into plural square matrices in order to solve the target color.

The result is a solution based on more colors, which provides the described advantages over the state of the art. The result also is accomplished with reasonable processing overhead and in timely fashion for pixel-by-pixel generation. A prior art attempt to use more than three colors uses computational intense algorithms that only approximate the solution in a "least squares" method. Our disclosed solution is a two-dimensional color space approach that is streamlined and without approximation, resulting in an ideal situation for high definition video processing.

Another area not sufficiently addressed by the state of the art is display device valve response or light sourceerror correction. In the following paragraphs we will disclose an optional error correction algorithm that accounts for time and temperature degradation. Degradation compensation is necessary for solid state devices because both chromaticity and intensity are sensitive to the aforementioned variables. In addition, component variation can be mitigated by error correction.

Simplistically, the algorithm takes pixel data represented in a universal color coordinate system, performs a color transform, and parses the result among parallel display devices or sequentially to a single device such that each pixel is represented by the combination of four or more primaries.

Flow diagram (see generally FIG. 2B)
  Video signal processed and color pixel array data extracted.
  Algorithm transforms individual pixel data into an array that represents four or more primaries that would display target color.
  Primary data parsed to display devices or sequential to a single device.
  Image displayed with a larger color gamut and more authentic color representation than an RGB system.

The color mixing algorithm can be applied in a number of scenarios and applications. One application is a video projection system, where the color mixing algorithm processes the incoming pixel data, based on the input of an array of primaries and parses the data to display devices in a parallel or sequential manner. An alternate scenario of the same application is the video pixel data is processed and the color mixing algorithm is applied as previously stated; however a parallel algorithm is also applied to independently controllable illuminating primaries so that the target combination of all illumination is a reference white point. The advantage of adjusting the illuminating primaries to produce a reference white is that the available dynamic range of each pixel is enhanced because generally video data is encoded with a reference white. However, this is not a required feature. A second category of applications is the use in general illumination. The color mixing algorithm controls four or more sources such that their combination produces any range of colors within a gamut, defined by the primaries, in a static or dynamic manner. The illumination device could receive target color data from any number of communication protocols, not limited to DMX 512, Ethernet, or an internal data bus.

C. Error Correction Algorithm

Optionally, what will be called an error correction algorithm can be used with the color mixing algorithm described above. Some of the advantages of such feedback include, but are not limited to:

(a) if actual color is not quite true, it can add offset to correct it.

(b) provision of consistent reference white.

(c) calibration in a manufacturing environment as well as calibration at the end user's discretion.

(d) accounts and compensates for light source degradation.

Error correction algorithm 200 (see FIG. 6A) could be implemented in software or a FPGA. As shown in the context of the system block diagram of FIG. 17, a color sensor 202 could feed back sensed actual output color of light source 108 to algorithm 200. Any offset between target color 201 and actual sensed color from source 108 could be detected (the "error") and algorithm 200 could adjust color mixing algorithm 100 to compensate or correct for the same.

The fact that light sources, especially Light Emitting Diodes (LED), are inherently variable is well-known. Even though LEDs are typically sorted by bin (color and intensity), there is still significant variation within each bin, to the point where each LED within a given bin is unique.

In addition, a closed-loop system using optical feedback is broadly considered important for consistent color control. See, e.g., Muthu, Subramanian & James Gaines. "Red, Green and Blue LED-based White Light Source: Implementation Challenges and Control Design." *Industry Applications Conference*, 2003. 38*th IAS Annual Meeting* (12-16 Oct. 2003). Volume 1: 515-522. Proportional Integral Derivative (PID) algorithms are widely implemented for the compensation of variability in complex systems. See, e.g., Wikipedia. "PID Controller." 5 Nov. 2005. 7 Nov. 2005 <http://en.wikipedia.org/wiki/PID_controller>.

The error correction algorithm according to this exemplary embodiment implements these two commonly-known techniques (closed-loop optical feed back and PID algorithms) for non-square matrix color systems. The lack of symmetry in these systems requires a deviation from the conventional approach to eliminate error.

FIG. 6A illustrates the error correction algorithm 200. The algorithm will be described with respect to the following projection system and color sensor.

1. Step 202

The light source 108 for a projection system could utilize five colors, namely red, amber, green, cyan, and blue LEDs from a modulated output 106 (which provides a duty cycle for each source to produce a target color 201) from color mixing algorithm 100 described above. A color sensor 202 (e.g. model number TCS230 RGB from Texas Advanced Optoelectronic Solutions, Inc. of Plano, Tex. USA.) would sense not only real time feedback of color from the light source, but intensity of the light energy from the mixed sources and produce an output signal.

2. Step 204

Data conversion 204 of the optical sensor output signal is then accomplished as follows. A color correction transfer matrix is calculated for the sensor by the method described in "Sensing color with the TAOS TCS230," with several modifications. See Poynton, Charles. "Sensing color with the TAOS TCS230", copyright May 17, 2005 TAOS, Inc. and available at www.taosinc.com, and incorporated by reference herein.

Specifically, the Macbeth color checker chart reflectance samples of the Poynton method referenced immediately above were replaced with the radiometric distribution of the desired combinations of the LEDs. In addition, the response curves of the red, green, and blue sensors were scaled such that the full contribution of all the light sources would result in a measurement of one across each color channel. Finally, the reference white was set equal to illuminant E. These modifications were necessary because optical sensor 202 is looking at the direct emission from a combination of sources and not the reflectance off a surface.

Sensor 202 does not have to be RGB. For example, it can be a three channel color corrected sensor as produced by MAZeT Electronic Design and Manufacturing Services of Jena, Germany. The color corrected sensor reduces the complexity of measuring accurate chromaticity data for the source(s).

The color transformation matrix is used to translate the scaled data from the sensor into chromaticity coordinates. The information is broken into three parts: x, y, and the absolute magnitude of error between the measured point and the target point.

3. Steps 205-209

The three parts of the signal from data conversion step 204 are fed into parallel PID algorithms 206, 207, and 208, where the x and y portions (see reference number 205) are collectively used to modify the input 209 to color mixing algorithm 200, and the third PID algorithm 208 is used for an auto-tuning function.

Algorithm 208 is tuned such that under varying conditions, the response is smooth, consistent and time-efficient. The tuning can be accomplished several ways, however the application of magnitude-of-error PID 208 to provide tuning feedback for this exemplary embodiment is configured as follows.

If the target chromaticity coordinate (target color SP 201 in FIG. 6A) is far away, the algorithm makes a large change to input adjustment 209. Conversely, it makes a small change if the coordinate 201 is close.

PID algorithm 206, 207, and 208 is implemented using the following generic equations:

Error Calculation [13]
$$e(k) = (SP - PV_f)$$
Proportional Action
$$u_P(k) = (k_c * e(k))$$
Trapezoidal Integration
$$u_I(k) = \left(\frac{K_c}{T_i}\right)\left(\sum_{i=1}^{k}\left[\frac{e(i) + e(i-1)}{2}\right]\right)\Delta t$$
Partial Derivative Action
$$u_D(k) = -K_c\frac{T_d}{\Delta_t}(PV_f(k) - PV_f(k-1))$$
PID Output
$$u(k) = u_P(k) + u_I(k) + u_D(k)$$
Output Limiting
If $u(k) \geq u_{max}$ then $u(k) = u_{max}$
and
if $u(k) \leq u_{min}$ then $u(k) = u_{min}$ $$u(t) = K_c\left[(SP - PV) + \frac{1}{T_i}\int_0^1 (SP - PV)dt - T_d\frac{dPV_f}{dt}\right]$$

In the above equations, SP is the set point or target color 201 and signal PV is the measured point or feedback from the optical sensor. The generic form is applied to $x_c$, $y_c$, and abs separately, with the exception that error is calculated for abs as follows:

$$e\_abs(K) = \sqrt{(SP_{sc}-PV_{sc})^2+(SP_{yc}-PV_{yc})^2}$$ [14]

The product of the tuning function (u_abs) and optional scaling factor ($g_a$) determines the value of $K_c$, known as gain.

$$K_c = u\_abs * g_a \qquad [15]$$

The output of the x and y coordinate PID 205, $u\_x_c$ and $u\_y_c$ respectively, modify an input 209 to color mixing algorithm 100, as shown in FIG. 6A. Color mixing algorithm 100 can be of the type of the examples of color mixing algorithms discussed above, or other types.

4. Optional Control

An additional layer of control could be employed such that PID algorithms 206, 207, and 208 could learn from previous convergence on a solution. The fundamental principle could be implemented by a simple memorization of past target points and required inputs or by devising a transformation matrix that is continually refined to represent the bridge between the assumed color coordinates of the sources and the measurement of their combinations. A system that learns could use this data to reduce convergence time in subsequent selections of the same color (when the memorization technique is used) or any color (when the transformation matrix technique is used).

5. Summary of Error Correction Algorithm

As stated previously, the closed-loop optical feedback in combination with the PID implementation, in which the optical sensor channels and system primaries are mismatched, is adapted to correct systems with more than three primaries using a low-cost optical sensor and features a self-tuning and learning function. The invention offers a customizable, high-quality, and consistent lighting tool for various markets, not limited to entertainment, architectural, film, and studio lighting.

Implementation of the closed-loop optical feedback system, using an RGB color or tristimulus value corrected sensor, includes the following:

(a) calibration of the color sensor.
(b) feeding the color sensor data into three parallel PID algorithms.
(c) the third PID algorithm provides an auto tuning function.
(d) the system can learn correction trends and use this data to reduce conversion time in subsequent selections of the same color.
(e) provide consistent reference white;
(f) characterize the response of each display device given a particular color and digital grayscale setting.
(g) calibration in a manufacturing environment and any time the end-user wishes to recalibrate their projection or illumination system.

The PID algorithm looks at error in three ways:
(1) Proportionally—from a magnitude standpoint; how far is the measurement from desired point.
(2) Integrally—continually sums the magnitude of error.
(3) Derivatively—how fast is the algorithm approaching a point based on slope. Answering the question: Is the algorithm over- or under-compensating?

It is important to note that there are many ways to tune a PID algorithm or apply a self tuning method. The one given is for example and is particularly suited for situations where the point of interest is far away and a large change is made, and if the point of interest is close, a small change is made.

The algorithm allows for correction for temperature, time, and color degradation. As LEDs heat up their dominant wavelength shifts toward red; when they cool, it shifts toward blue. There are intensity changes with temperature, especially the AlInGaP (Aluminum Indium Gallium Phosphide), which is amber and red. InGaN (Indium Gallium Nitride), which is blues, cyans, and greens tend to be more stable, however their variation is significant enough to warrant the need for correction.

Thus, this closed loop feedback compensates for time and temperature degradation and component variation. The method corrects for transient changes (e.g. temperature changes) or long term changes (e.g. lumen depreciation over thousands of hours).

It can also make the LED manufacturing process shorter and cheaper. The manufacturer would not need the best manufacturing data with this system of correction, which would save time and resources. The manufacturer and customers could be content with just bin numbers. Manufacturing calibration could include the following process. A set of red LEDs could be turned on. A spectrometer measurement is taken. That primary or chromaticity data and intensity data is then fed into the video processor board so it knows the basic operating parameters of the LEDs, at least during initial operation.

FIG. 6B is a flow chart diagram 350 indicating a specific implementation of a general illumination LED controller for DMX-512 digital multiplexed signals communications protocol. DMX-512 is a well-known communications standard, which covers digital multiplexed signals. It is the most common communications standard used by lighting and related stage equipment.

The DMX-512 signals are processed by RS-485 Transceiver 353 into DMX values 356 which can be processed by color mixing algorithm 357. Color mixing algorithm 357 can be that described earlier with respect to FIGS. 1-5, which outputs instructions to duty cycle modulator 364 to, in turn, control current source 365 which then controls LED engine 366 to generate the appropriate average intensity for the given LED light source (not shown). The current source could be based on a switch mode power supply topology so that it has high efficiency (i.e. the HV9910 available from Supertex, Sunnyvale Calif.).

However, system 350 provides correction for offset between the instructed target value based on the received DMX values and the actual color generated from the LED light source. Color sensor 202 generates frequency values of R, G, and B signals representative of actual sensed colors of the LED being powered by LED engine 366. The RGB frequencies signals from TAOS 230 color sensor 202 are measured by a color channel selectable frequency counter 351. The RGB values are converted to x,y color coordinates using principles of step 204 to create a duty cycle compensation signal at reference numeral 359. The compensation signal is fed back to duty cycle modulator 364 and adjusts the duty cycle of electrical power to LED engine 366 to compensate for any offset or error between the instructed color and the sensed color. As previously described, this can produce more accurate and consistent color by compensating for whatever might affect the actual produced color to differ from the instructed color.

FIG. 9 also shows additional possible optional compensation. Similar to the color sensor and compensation, an appropriate temperature sensor 354 (e.g. thermocouple or thermistor) could be operatively placed relative to the light source and its analog voltage signal, representing sensed operating temperature of the light source, can be converted to digital (reference number 355) and processed in six channel voltage to temperature algorithm 360 to convert voltage to temperature. Data 363 about the operating characteristics of the LED being used could be stored in EEPROM 362. Such information could include information about how color output of the LED varies with operating temperature. Sensed operating temperature could be compared to the data and a compensation instruction could be generated (see reference numeral 361) which, in turn, could be used to generate a compensation signal from 361 which would be fed back into duty cycle modulator 364 to adjust or compensate for operating characteristics as programmed into 362. Variations in color or output from the LED can be compensated for to promote accurate and consistent color regardless of operating temperature. It is well known that, e.g., the color and output of LEDs vary with operating temperature.

Note also that FIG. 6B indicates other operating criteria about the particular light source could be stored in EEPROM 362 and used to correct or compensate the light source output. This would allow the manufacturer of the lighting system to build-in, at the factory, compensation sub-systems for many of the reasons there can be variation in color or light output from light sources. For example, some light sources experience lumen depreciation over operating life. Lumen depreciation could result in substantial reduction in light output from the light source, which could materially affect performance of the lighting system. There could be other color, photometric, or electrical characteristics for which compensation could essentially be programmed into the system.

Thus, as indicated at FIG. 6B, error correction can adjust, correct or compensate for such variances or conditions. In a theatre light, color compensation could ensure an accurate, consistent true white output.

D. Narrow Spectrum Sources

The projection system discussed above that implements the aforementioned color mixing and error correction algorithms can optionally and beneficially use narrow spectrum emission sources as primary light sources. For example, FIGS. 13A-C disclose an exemplary embodiment having an arrangement of primary light sources 812 arranged and aligned with dichroics 814. These narrow spectrum sources 812 can be light emitting diodes (LEDs) of the type that collectively can produce hundreds of lumens. One example is the OSTAR LED from Osram Opto Semiconductor, Munich, Germany. Other narrow spectrum devices could include, but are not limited to, lasers or a filtered wide spectrum source such as xenon or UHP lamps currently sold on the market.

They can be modulated in intensity on a frame-to-frame basis to provide an "electronic dynamic iris", as opposed to state of the art mechanical iris. The fast response of the source in accompaniment with a dynamic range improvement algorithm, Scene Adaptive Contrast Control™ (SACC™), discussed in detail later, provide enhanced contrast ratio of the image based on the relative intensity of the frame itself.

The prior art tends to use multi-chromatic sources with filters. This involves complexity and cost to those systems, and does not provide the advantages of narrow spectrum sources.

Solid-state, narrow band emission sources have advantages of long expected operating life, individual primary component modulation for the correction of the reference white point, and the ability for frame-to-frame modulation to produce enhanced image contrast.

For example, the use of LEDs, a solid state source, as the primary source has the inherent advantage of allowing individual primary component modulation for the correction of the projected color. The LED also allows for the necessary frame-to-frame modulation necessary to implement what is called Scene Adaptive Contrast Control™ or SACC™, which will be discussed in more detail below. The LED devices also have a greater life expectancy, higher lumen maintenance, and low ultraviolet (UV) and infrared (IR) which contribute to display device degradation. Additionally, LEDs have no hazardous material (i.e. mercury).

Generally speaking, conventional prior art projector bulbs have a life expectancy of 1,000-3,000 hours. An LED of the type contemplated herein typically will last 50,000 hours before the source has degraded by 30% in intensity. LEDs, when properly controlled, typically have these types of advantages:

(a) High color rendering (90+)
(b) Repeatable specifiable color (0.004 duv)
(c) Precision target illumination
(d) Low maintenance, long life (70% lumen maintenance after 50K hours)
(e) Explosion proof, high vibration resistance, withstands extreme temperatures.
(f) Color or specific wavelengths
(g) High repeatability Although not required for the color mixing and error correction algorithms described, they can advantageously be used with them.

E. Scene Adaptive Contrast Control™ (SACC™)

Contrast is one of the most important aspects of video. SACC™ looks at a histogram analysis of the grayscale in a video image to determine if there are a lot of bright or dark colors and if the image in its entirety is dark or bright. Depending on that analysis, the light source(s) are turned up or down in intensity to change the dynamic range of the image.

As indicated at the block diagram of FIG. 17, SACC™ contrast control algorithm 300 (see FIG. 8) could be implemented in software or a FPGA and adjust lamp gain 314 before it is sent to the light source driver.

When there is a bright light source, the human eye will adapt to that light source. If an image is produced that is mostly dark, and then an image of the sun is produced, if one takes the same level of light, the image will look washed out because the eye adjusts to that light source. So if it is sensed that the current frame is a "dark" frame, the light source is turned down a little and the apparent contrast ratio goes up significantly.

The challenge is modulating the light source at a speed to change the source's intensity with every frame. Even though typical video frame rates are between 24 and 60 frames per second, the light source needs to be adjusted significantly faster than the reciprocal of the frame rate; otherwise, there would be a lag between the scene and the illumination level. Standard gas discharge lamps make this essentially impossible. However, LEDs respond on the order of 40 nanoseconds, so it is possible to change LED intensity in the first few moments of any given frame. Thus, SACC™ closely can match the relative brightness of an image and effectively change the dynamic range of that image or series of images frame-by-frame. Essentially this comprises dynamic lamp correction or a dynamic iris. An entire frame is reviewed. A comparison of darkness and brightness is made. Intensity is scaled down.

A state of the art approach to contrast control is to use essentially a mechanical iris to control the amount of light. However, this is relatively slow, so it may not be effective.

Also, there is a very real increase in the probability the device will fail over time. SACC is essentially an "electronic iris" which is high enough speed to adjust frame-by-frame, and is also robust over long operating times.

The use of the previous described primary color mixing algorithm and corrective algorithm allow for what will be called Scene Adaptive Contrast Control™ (SACC™). SACC™ is the process of dynamically modulating the backlight of a display device based on the scene statistics. This process improves the dynamic contrast by matching the brightness of the backlight with the brightest pixels in the scene.

The underlying intent of SACC™ is to assure that the full dynamic range of the display device is being utilized for all scenes. The diagram of FIG. 7A shows a histogram of a scene which makes use of less than the full dynamic range of the display (see curve 322 relative to "saturation value" and "maximum pixel value"). By adjusting the gain of the digital pixel values, the image can be modified so that the histogram stretches over the entire range, as shown in FIG. 7B (see curve 324). Then, in order to maintain the same projected scene brightness, the intensity of the lamp or light source(s) is/are decreased by the reciprocal of the pixel gain. The resulting intensity histogram (see curve 326) is as shown in FIG. 7C.

By comparing FIG. 7A to FIG. 7C, it would appear that no effective change has resulted. There is no difference in overall intensity; however, by scaling the pixel values, there is an increase in grayscale resolution. This means that details in dark or shadowed areas which are indistinguishable without SACC™ become visible with SACC™. In other words, SACC™ decreases the brightness of the light source(s) to increase the contrast ratio (dynamic range) of the projection. This can basically increase the "life-like" qualities of a projected image.

Implementation of SACC™ is reasonably straight-forward. A high level block diagram 300 is shown in FIG. 8. The incoming five primary data, RAGCB, (collectively referred to by reference number 302) is from the output of the XYZ to RAGCB conversion of the color mixing algorithm previously described. This data has been processed to clip negative values and the pixel values have a large number of fractional bits below the binary point due to the matrix multiply. A predetermined number of most significant bits of these values are passed to the Histogram and Gain Calculation path (see path through components 304, 306, and 308 of FIG. 8). Since the algorithm only cares about the higher portions of the dynamic range, the maximum value (see reference number 304) of RAGCB is passed to Histogram (ref no. 306). The purpose of Histogram 306 is to determine how much of the dynamic range is actually used by the current frame. A "Threshold value" is provided to the Histogram block. This value is set so that a small number of bright outliers do not influence the selection of the Saturation Value or "S" that is passed to gain computation 308 which controls lamp gain with lamp gain signal "$G_L$" and pixel gain with pixel gain signal "$G_P$".

Once per frame, histogram 306 is analyzed. The frame can be processed in real time or from a frame buffer. This is accomplished by summing the histogram bin values starting at the highest bin value. When this sum exceeds Threshold, the corresponding bin is selected as the Saturation Value, S. The Pixel Gain, $G_P$ is calculated from S and the Maximum Pixel Value, M with:

$$G_P = \frac{M}{S} \quad [16]$$

The Lamp Gain, $G_l$ is the reciprocal of this:

$$G_l = \frac{S}{M} \quad [17]$$

For a moderately sized histogram, these calculations could be handled with a pre-calculated look-up table. The SACC™ algorithm can be implemented within the main processor.

The SACC™ is useful for such things as the following:
(a) a Scene Adaptive Contrast Control™ that can be applied to the entire display or particular areas of a display broken up into zones, wherein each zone could be illuminated by single or multiple LEDs and each modulated accordingly to the grayscale histogram analysis of each zone.
(b) the ability to characterize the response of each display device given a particular color and digital grayscale setting.
(c) the ability to modulate the intensity of the light sources on a frame to frame basis by providing an electronic dynamic iris.
(d) integration of a fast response source with a dynamic range improvement algorithm that provides enhanced contrast ratio of the image based on the relative intensity of the frame itself.

Essentially, SACC™ lowers the intensity of the light sources for dark pixels and raises intensity for bright pixels for improved contrast ratio or dynamic range, and can do so with reasonable computational overhead and at a complementary speed to most, if not all, video refresh rates.

FIG. 9 illustrates a variation on SACC™. A single frame image 371 with relatively bright portion(s) 372 (e.g. image of the sun) and relatively dark portion(s) 373 (e.g. a dark cloud) can be broken up into a plurality of histogram regions (in FIG. 9 the number of regions N is twelve. As can be seen histogram region 375 (corresponding to image portion 372—the sun) would have a much brighter intensity value than histogram region 376 (corresponding to image portion 373—the cloud). The histogram component 374 would direct N (here twelve) brightness levels to an illumination source and optics array 378 (having a corresponding number N of illumination sources, each with an associated optics array). The SACC™ algorithm would control brightness levels of each light source/optic of array 378, which in turn illuminates the image on display device 379.

F. Active Temperature Control

Solid state narrow band emission sources have the inherent advantages of long life, individual primary component modulation for the correction of the reference white point, and the ability for frame-to-frame modulation that allows an enhanced image contrast. However, these benefits come at the cost of high thermal density and sensitivity. Solid state sources require a thermal management system which maintains the sources at a constant temperature, below their maximum junction temperature, for repeatability and reliability of the system.

Incandescent light sources radiate approximately 85% of their heat. In contrast, LEDs radiate about 15% and conduct about 85%. Because an LED is a solid state semiconductor, it has a maximum junction temperature (e.g. 125 degrees C.) and a sensitivity to heat.

LEDs of the type used in system 800 of FIG. 13A dissipate about 120 watts and have a junction to case thermal resistance of 0.67 degree per watt. This means the LED board cannot get hotter than 44.6 degrees C. The ambient environment surrounding the light source typically is 25 degrees C. Therefore, the temperature delta between source and ambient is small, which poses a challenge. Additionally, the semiconductor die area is approximately 1 square centimeter, which rivals the power densities of state of the art computer processors.

Typical prior art heat management uses heat sinks 816 (see, e.g., FIG. 10A or FIG. 13A) and/or movement of air. However, this can be insufficient for systems such as a video projection system 800 of FIG. 13A. A typical heat sink for an LED of the type used herein would have to maintain a temperature only several degrees higher than the ambient temperature, which is not practical. Heat sinks are generally considered passive heat dissipating devices and are insufficient for precise temperature control. Active temperature control is beneficial to maintain a certain temperature to minimize sensitivity to heat.

Thus, a primary concern with the use of LEDs, or other light sources with similar heat issues, is the thermal management of the heat generated by each primary source. The management of the heat is critical for the reliability and repeatability of the digital video projection system.

An exemplary embodiment of a heat management system 900 that could be used with, for example, each LED, laser, or other light source is illustrated at FIGS. 16A and B. Generally, heat management system 900 uses (a) a heat spreading assembly (with optional active control) to effectively spread and transfer heat from each of the 5-primary color sources (for example, Blue, Cyan, Red, Amber, and Green) (see FIG. 16B) and (b) cold plate technology and a circulating cooling fluid/radiator system to radiate heat from the heat spreading assembly to the air. Active thermal management components can be added to the system to control the temperature more precisely.

The projector power supply, which powers the primary sources and control circuitry, can be cooled by cold plate technology as well.

The block diagram of FIG. 17 illustrates that one example of active heat management could be use of a thermoelectric cooler or TEC 942 that uses operating temperature feedback from the light source to adjust the amount of heat transferred away from light source 108. The TEC 942 can be controlled by a programmable TEC controller 943, or controller 943 could be controlled by the system processor.

1. Heat Spreading from Each Heat Source

FIG. 16B illustrates a heat spreading assembly for each light source or light engine 930. Light source 930 is a solid state device, comprising a semiconductor die or array 931 operatively mounted on a substrate 932. Also, a truncated illumination optic 933 extends from light source 931 opposite substrate 932. Optic can be of the type illustrated in more detail in FIG. 12.

During operation, heat from the relatively small die/array 931 tends to concentrate at location 991 of substrate 932. The heat spreading assembly, discussed below, spreads this concentrated heat over a much larger surface, which then can more effectively be managed.

a) Heat Pipe or Vapor Chamber 938

Heat management employs a commercially available flat heat pipe or planar vapor chamber 938. In application, heat pipe 938 would be operatively associated with each LED light source. Heat pipe 938 essentially wicks heat from its area of abutment 990 to the heat source to a separate, larger region. FIG. 16B is roughly representative of the physical scale of the light source and the heat spreading assembly.

The principles of heat pipes are well-known. An example of such a flat heat pipe can be found at www.Thermacore-.com and commercially available flat heat pipe products are available from Thermacore International, Inc. of Lancaster, Pa. USA. A description of how these commercially available systems work can be found at http://www.thermacore-europe.com/catalogue/category.asp?cat=1. Also see, Conroy, C. T., et al., "Multiple Flat Plate Evaporator Loop Heat Pipe Demonstration", at http://www.tthresearch.com/MultiEvapLHPBettis.pdf, which is incorporated by reference herein, for general principles of heat pipes.

Planar heat pipe or vapor chamber 938 comprises a sealed copper tube encasing a low pressure fluid solution. The upper side of heat pipe 938 is larger in perimeter dimensions than light source substrate 932 and is thermally connected to light source substrate 932 with low melt alloy (LMA) layer 936. LMAs are a type of thermal interface material (TIM). Specifically, LMAs are metals that become liquid at relatively low temperature. In this case, the melting temperature is selected to be higher than the normal operating condition of the light source, so that the LMA is a solid throughout the entire range of the semiconductor device's operation. However, the melting temperature is below the maximum junction temperature of the solid state light source. The LMA provides a high thermal conductivity path between the typical LED package (including the LED 931, its circuit and circuit board, and its typical heat dissipating substrate 932). Further details about LMAs can be found at U.S. Pat. No. 7,078,109, incorporated by reference herein.

The vapor chamber package 938 basically employs a sealed hollow container that physically isolates the working fluid from the outside environment. The vapor chamber or heat pipe package maintains a pressure differential across its walls, and enables heat transfers from and into the working fluid. Inside the heat pipe, the container is lined with a porous structure. The primary purpose of the porous structure is to generate capillary pressure to transport the working fluid from a condenser to an evaporator. As the temperature rises at the heat source, the heat pipe assembly boils the working fluid, turning it into a vapor. As the evaporating fluid fills the hollow heat pipe, it spreads throughout the assembly towards the cooler or lower side of the heat pipe. The working fluid then condenses at the cooler lower side, giving off heat in the process. As the working fluid cools, it condenses, and is sucked back to the evaporating section along the porous section of the heat pipe assembly. This movement of working fluid creates a thermodynamic system that moves heat from one location near the heat source to another location away from the heat source, thus spreading the high density heat at the solid state light source over a larger area. The working fluid of the heat pipe assembly provides a high thermal conduction path between the solid-state light source and the opposite side of the heat pipe.

Alternative heat spreaders are possible. An example is a metal matrix composite (MMC) heat sink, an example of which can be found at http://www.elecdesign.com/Articles/Index.cfm?AD=1&ArticleID=8955, incorporated by reference herein. Another example is graphite laminated to a high conductivity substrate with or without thermal vias. Alternatively, a layer or plate of solid material with good thermal conductivity could be used. Examples of material would be copper and diamond (natural or synthetic). Most materials with good thermal conductivity can function as a heat spreader. However, heat plate 938 is much more efficient. The lower the operating junction temperature of the LED source, the brighter it is.

2. TEC

Heat pipe 938 provides high thermal conductivity in the xy plane for optimal heat spreading. The dispersed heat is then pumped through a solid-state heat pump, otherwise known as a thermoelectric cooler or "TEC" 942 (see commercially available TECs from Melcor Corporation, Trenton, N.J. USA at www.Melcor.com), which uses the Peltier effect to force a temperature difference and move a specific amount of heat from one side of the device to the other.

TEC 942 is essentially a heat pump and a thermal control device. It is not passive like a heat sink, but rather can be termed active. It is sandwiched between heat pipe 938 and cold plate 916 by thermal interface material or layers (TIM) 940 and 944, as shown in FIG. 16B. TIM 940 and 944 can be thermal pads or film (phase change materials), or thermal grease or paste. They would provide effective heat transference as even two nearly flat surfaces usually have small gaps between them. Such TIMs are commercially available from a variety of sources, e.g. Dow-Corning, Midland, Mich. USA and Laird Technologies, Cleveland, Ohio USA.

Because the TEC is a p-n junction semiconductor, when current is forced across it during operation, it forces a temperature difference. One side gets relatively cool; one side relatively hot. TEC 942 uses the Peltier effect to force a temperature difference between the p-n junction of the semi-conductor material of TEC 942. The cool side is brought into abutment with planar heat pipe 938, the hot side into abutment with the cold plate 916. The bigger the temperature gradient is between the fluid source used to cool the object and the object itself, the more effective the system.

TEC 944 can be adjustably controlled by controller 943 (e.g. model LTC 1923 Thermoelectric Cooler Controller from Linear Technology Corp., Milpitas, Calif. USA). Instructions can be communicated from a processor (e.g. white point board processor). TEC 944 can use a PID algorithm, with feedback from thermistor 945 placed at the heat source, and be configured to actively control temperature to 38 degrees C. on the front side and a much hotter 40, 50, or even 70 degrees C. on the back. This involves tens of degrees of thermal difference, so the active thermal management system is much more effective. Also, thermistor 945 at light source 930 can feed back operating temperature to controller 943, and controller 943 can be programmed to maintain a relatively constant temperature for light source 930.

3. Cold Plates 916, Cooling Fluid, and Radiator System

As shown in FIG. 16B, TEC 942 for each light source is thermally interfaced with a cold plate 916. The power supply also has a cold plate assembly, see reference number 916PS.

Each cold plate assembly is essentially an enclosed chamber 922 with an inlet/outlet port. As shown in FIG. 16B, a plurality of bosses or pins 923 extend downward from the upper interior surface of cold plate 916 to increase total surface area of that surface (in comparison to it being flat). The pin geometry and positioning is optimized to the desired thermal resistance between the fluid and the heat source at a given flow rate. Tubing 920 brings cooling fluid in and out of chamber 922.

Cooling fluid 950 is circulated by pump 914 through fluid circuit 920 tubing or fluid conduit to and from radiator 906. A cool fluid reservoir 912 can store a quantity of cooling fluid (e.g. 0.5 liter). The tubes 920 carry fluids past each cold plate 916, thus drawing heat away from them. The working fluid can be water, fluorinert, liquid metal, or any other fluid that is optimized for the desired heat capacity, conductivity, turbulence through the fluid loop (heat circuit), heat load, and flow rate of the system. The heat circuit consists of the cold plates 916, pump 914, and a radiator 906.

Radiator 906 is a conventional design, having a plurality of heat radiating surfaces. Fans 903A and B (low noise and relatively low speed) move ambient air 901, filtered through air filter 902, through air duct 904 and over and thru radiator 906. Heat extracted from the five light sources and power supply by the cold plates, and moved to radiator 906 by heated fluid section 922 of the fluid circuit, is removed from radiator 906 by the pressurized air 905. A heated air output 907 can be directed into the ambient air around the projector.

As can be appreciated, the specific components to create the heat management system 900 of FIGS. 16A and B can vary according to need. By using cold plates, relatively substantial quantities of heat can be effectively removed from the light sources and dispersed into the air.

As shown in FIG. 16A, the cooling fluid circuit 920 has two pathways, one flowing in series through cold plates 916 for the amber, red, cyan, and blue color sources, and the other in series through the cold plates for the color green and for the power source. This arrangement is selected for the following reasons. First, the green LED light source has the highest power rating, and the amber and red LEDs are most sensitive to heat, so cooling fluid 950 is first presented to them. On the other hand, the power supply is less sensitive, as are cyan and blue LEDs, so cooling fluid is presented to them after passing through cold plates for the others. Second, minimization of the number of parallel flow paths allows for better flow rates of the cooling fluid 950 for heat transfer than if each cooling plate was in parallel.

The two flow paths will be relatively balanced in flow rate. Pump 914 (e.g. model DDC-2 from Laing Thermotech, Inc., Chula Vista, Calif. USA) was selected because it is relatively low noise and relatively small in size. It can pump around 400 liters/hour.

The fluid circuit would be sealed. Tubing 920 is of robust, durable non-permeable material. If material like Norprene® (Saint Gobain of Courbevoie, France) is used, it would be clamped over nipples at junctions to the components. If copper, it could be soldered. Pressure tests using vacuum could be conducted to remove all air bubbles and confirm the fluid circuit is sealed.

4. Assembly of Heat Management System

The assembly of FIG. 16B can be constructed as follows. The combination of cold plate 916, TEC 942, heat pipe 938, and light source 930 would be stacked vertically, with low melt alloy 936, and TIM 940 and 944 in place where indicated. A mechanical force would be applied to compress the combination of parts, and it would be heated to above the melt point for low melt alloy 936. This procedure would make the TIM layers and low melt alloy layer as thin as possible, which promotes better heat transfer (generally thermal resistance decreases with decrease in bond line thickness). The low melt alloy 936 would also change phase to a liquid and flow into even tiny gaps between the lower surface of light source substrate 932 and the upper surface of heat pipe 938. The subassembly would then be cooled and alloy 936 would change state back to a solid. It would essentially solder substrate 932 to heat pipe 938. The alloy 936 would essentially be "married" to the heat pipe 938 and be metal-to-metal contact.

5. Operating Features

Noise is a substantial issue with video projectors, particularly for home entertainment purposes. The reduction of noise in the projection system is a beneficial result that increases the user's enjoyment of a projected video display or illumination system. Using heat management system 900 allows use of a low speed fan(s) 903 (or to run fans at lower speeds), so that the projector is relatively quiet. It is believed that typically fan(s) 903 could be operated in a manner where noise would not exceed around 30 decibels, which is the level of noise in a recording studio. Pump 914 can also be low noise.

Optionally, temperature of cooling fluid 950 could be monitored by an appropriate sensor. If temperature exceeded a certain level, appropriate circuitry could reduce power, increase fan speed, or shut the whole projector down as an automatic failsafe.

Optionally, temperature of heated output air 907 exiting from radiator 906 could be measured (e.g. with a thermistor). Speed of fans 903 could be increased or total power consumption reduced as the air temperature rises. Additionally, fans 903 could be four-wire fans for adjustment of speed. A tachometer could measure fan speed and a pulse width modulated or other electrical signal could adjust fan speed. If the tachometer does not sense any rotation of a fan, it can assume the fan has malfunctioned and cause the other fan to increase speed.

Two fans 903 are used in the embodiment of FIG. 16A to spread air flow over a larger area. This allows use of a radiator with a relatively large surface area.

The thermal management system 900 promotes the following:
(a) low melt alloys that provide a high thermal conductivity path between a light source and a heat dissipating substrate.
(b) flat heat pipes to provide high thermal conductivity in the XY plane for optimal heat distribution.
(c) a video projection system that uses a solid state heat pump/thermal electric cooler to force a temperature difference across the substrate that moves heat from one side of the device to the other.
(d) a digital video projection system having a fluid filled heat circuit that circulates the fluid to cool the light source.
(e) a thermal management system that allows for precise and consistent control of the temperature of the solid-state light source, enabling consistent chromaticity and intensity.

Thermal management system 900 can be scaled and configured as needed for system 800. Mathematical modeling and empirical testing can establish the needed configuration. At a minimum, system 900 should not allow temperature to exceed the junction temperature for the semiconductor light source.

Thermal management system 900 is designed to be long-lasting and durable. LEDs have normal operating lives on the order of 50K hours. TECs of the type described can have mean time before failure (MTBF) on the order of 200K hours. Heat pipes of the type described have, as a practical matter, unlimited life. Although use of water or other fluids with a commercial projection system is counter-intuitive, system 900 is sealed, robust, and should outlast the LEDs.

It is believed that active temperature management may extend the MTBF of LEDs.

The exemplary embodiment thermal management system described above is but one form heat management could take. It is to be understood, however, that it does not preclude the use of the more traditional devices such as fans and heat sinks.

Some alternatives for heat management include forced air convection, or a fan over a heat sink.

G. Optic System

The method of integrating more than three primary colors to produce a target color, as discussed above, can be used for a number of various applications and can be implemented with a number of optic systems.

1. Three Lens Projector

FIGS. 10A-D and 11 disclose a three projection lens system projector 870 that has three lenses 872, 874, and 876 that project light and mix it onto a viewing surface. Each projection lens is mounted at the end of an optical chamber 873, 874, and 877, respectively (see also FIG. 11). Though having only three projection lenses 872, 874, and 876, projection system uses five color sources (e.g. LEDs or some other high intensity light sources—not shown), each illuminates a display device 880, 882, 884, 886, and 888, respectively. The display devices control the amount of light transmitted to and projected by the corresponding lenses 872, 874, or 876.

FIG. 11 shows basically a horizontal cross-section of each chamber 873, 875, and 877 and illustrates how five light sources are combined into three projection lenses. Each lens 872, 874, and 876 has an associated chamber 873, 875, or 877. Two of the chambers, 873 and 877 have two primary light sources (here LCD displays 880 and 886 for chamber 873, and displays 884 and 888 for chamber 877). Chamber 875 has only one display 882. The arrangement of FIGS. 10A-D and 11 allows placement of all light source/display combinations relatively close to its lens which reduces light loss.

The triple projection lens system allows for green to be very close in spectral content to cyan or amber without interference. The advantage of having the spectral content of green close to another primary component is that it allows for increased brightness on the screen without increasing etendue beyond the current value. It is preferable that the green light source have its own projection lens because the green wavelength is the most predominant color when generating white light.

The other two chambers combine two colors. A dichroic intentionally placed at an angle to the nominal light direction from both sources (30°/60°), has coatings that only allow the color of light intended to pass. The 30°-60° angle is selected for the most efficient transmission and reflection of light. As is well known, it is more efficient than 45°-45°. A 20-70° could be even more efficient, but may be less adaptable to this projection application.

The use of three projection lenses keeps distances of display devices to their respective projection lens very close. All five colors are grouped into three pieces, so effectively system 870 has the same advantages as a RGB projector as far as LCD distance to the lens. In other words, note how LCD 886 and 888 can be placed quite near its respective lens 872 and 876. This allows for a relatively short light path length for each. This not only allows for a more compact projector, but also for less light loss, which tends to occur with increasing distance. Thus, two additional colors can be added to projector 870. The color mixing algorithm 100 could be used for increased color gamut. Higher screen and white luminance can be created by projecting only green through one of the three lenses because of green's disproportionately large contribution to the reference white. Even though the remaining four colors must be combined in pairs relative to the other two projection lenses, the light paths are kept short to avoid light loss by use of a single dichroic.

FIGS. 10A-D show the relative locations of the display device, the LED or other solid state light source, with truncated optic 840 as shown in FIG. 12, as well as a thermal management system 900, as shown and described with respect to FIGS. 16A and B.

2. Single Projection Lens, Five Color Systems

FIGS. 13A-C illustrate another five color projector 800. But note that each of the five different LED light sources 812 are positioned in generally the same plane, and at different orientations to the optical path through a single optic 850. Projector 800 uses one projection lens as opposed to the three of projector 870 of FIGS. 10A-C and 11. Similarly, projector 800 uses monochromatic solid state narrow band emission sources (e.g. LEDs or LED arrays) which are controlled in intensity by color mixing algorithm 100.

In this embodiment, dichroics 814 are used to combine the five sources 812 into one. The five sources could be any narrow spectrum light. An example of the specific colors could be as follows:

| Color | Wavelength (nm) |
|---|---|
| Blue | less than 470 |
| Cyan | 470 to 510 |
| Green | 510 to 550 |
| Amber | 550 and 615 |
| Red | greater than 615 |

These ranges given are for specific dichroic designs and could be modified to incorporate other primary colors or change the wavelength composition of the primary components.

Dichroic mirrors 814 are placed along the optical paths for each light source as shown. FIG. 13C indicates the combination of each light source as two pairs B/C and A/R of sources 812 are first preliminarily combined, then G (green) is combined with B/C, and finally BCG is combined with RA at the output.

A conventional 45° split dichroics system is used in FIGS. 13A-C. Each dichroic comprises a plate of light transmitting glass with thin films of dielectrics deposited thereon. Each layer is nanometers thick. Each thickness creates essentially a resonant chamber. Whenever a wavelength of light enters that chamber, when it is equal to typically four times the thickness, the layer becomes resonant. By well known methods, the thin films or layers are built up on a glass plate so they reflect certain wavelengths (that is colors), and thus transmit other wavelengths (colors) (e.g. reflect blue, transmit red or visa versa). For additional explanation of the functionality and composition of dichroic mirrors, see http://www.rp-photonics.com/dielectric_mirrors.html, incorporated by reference herein.

The configuration of FIGS. 13A-C serves two main purposes for projection system 800. First, all sources 812 are brought as close as possible to projection optics 850. Light is diverging, so the farther away the display device or source is from the projection optic, the larger the projection optic has to be in order to collect all the light. Conversely, the shortest light path loses the least amount of light. It is, of course, beneficial to maintain the greatest amount of light in the projection system.

Second, it conserves etendue. The method of combining all five sources with the dichroics "tricks" the system into "seeing" one LED array when really there are five. This is extremely useful in projecting light. All the light ends up being at the same point with the colors combined.

FIG. 14 illustrates an alternative embodiment of a five color, single lens projection system but with 30°-60° dichroics.

3. Single White Light Source, Five Color Projection System

Figure 15B:
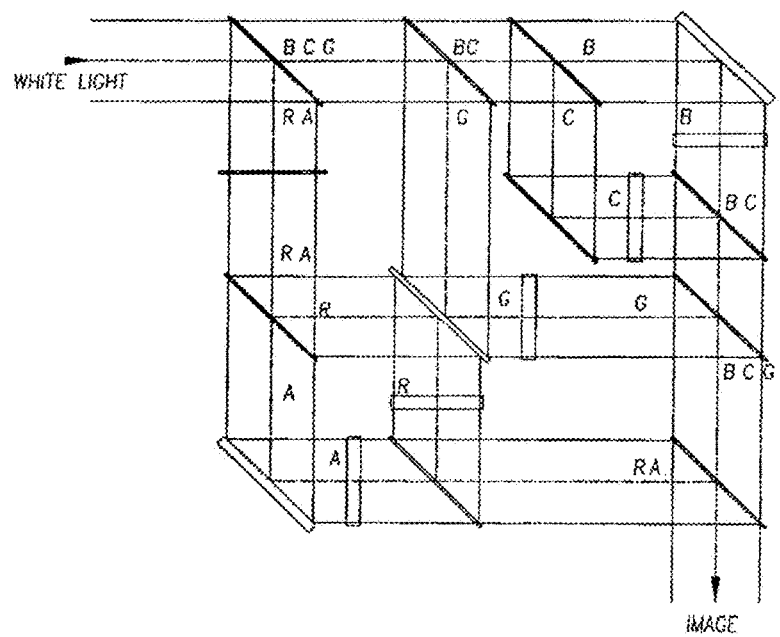

FIG. 15A is a view of an alternative embodiment of a five color, single lens projection system 860 with 30°-60° dichroics, and FIG. 15B has 45° dichroics. Note, however, the primary difference of the optic system is that a single white light source 861 is the input.

A first set of dichroics 862a-d are used as beam splitters to break white light 861 up into five colors B, C, G, A, R. A second set of dichroics or mirrors 866a-d re-direct the monochromatic light into corresponding display devices 864B, 864C, 864G, 864A, and 864R. A third set of dichroics 868a-d recombines the light from the display devices into the single output. All optical paths could be made equal. The dichroics would be selected to pass/reflect the appropriate wavelengths of light.

4. Truncated Illumination Optic

FIG. 12 illustrates an embodiment of an optic 840 that could be used with display devices requiring polarized light (for example, an LCD) described herein to increase efficiency of illumination of the display.

As shown, an LED source 842 emits light which is directed by reflector 841 into truncated illumination optic 843 which has total internal reflection (TIR). A quarter-wave retarder 844 and a reflective polarizer 845 are operatively positioned at the output end of optic 843.

As illustrated in FIG. 12, light beam 846 from source 842 would first travel part way down optic 843 (see portion 846a) and strike the interior of optic 843. By TIR, it reflects at an angle and travels to the output end of optic 843 (portion 846b). It passes through quarter-wave retarder 844 and strikes reflective polarizer 845.

A portion of light beam 846 (portion 846e) would be polarized by polarizer 845, and would project from optic 843 as indicated to illuminate the display with polarized light, such as LCD 880 of FIG. 10A.

A portion 846c, not allowed to pass by polarizer 845, would be reflected and travel back through retarder 844 into optic 843, bounce by TIR off of an interior surface of optic 843 (ray portion 846d), strike reflector 841, and "recycle" back along paths 846a and b. Because portion 846C passes twice through quarter wave retarder 844, it would essentially be converted to a polarization that would pass through polarizer 845 the second time.

This arrangement provides for what might be called polarization recycling. Polarization-recycling techniques have been proposed to increase the efficiency of illumination of LCD panels. For proper operation, illumination with polarized light is necessary, but a typical lamp generates unpolarized light. Passing the unpolarized source light through a polarizer on the way to the LCD panel wastes the half of the light that is in the undesired polarization. To increase the efficiency of illumination (could be on the order of 20 percent), system 840 essentially "recycles" the otherwise wasted light, converting the undesired polarization to the desired one.

Details regarding polarization recycling can be found at a variety of sources, including http://www.nasatech.com/Briefs/June01/NPO20824.html, incorporated by reference herein.

H. Options and Alternatives

As can be fully appreciated by those of skill in the art, the exemplary embodiments are but specific examples of some of the forms the invention can take. Variations and alternatives to the exemplary embodiments are possible. Variations obvious to those skilled in the art will therefore be included within the scope of the invention, which is defined solely by the appended claims.

For example, the exemplary embodiments primarily discuss examples using LED light sources. However, other sources are possible. In fact almost any source is possible. For example, a white bulb could be used as a source. Dichroics could be used to break the white source up into the four or more colors, and then recombine them with the color mixing algorithm. The same thing could be done with a white LED. Xenon and UHP lamps are some other examples of sources.

The combination of the conventional solid state light source technology and disclosed thermal management and optical systems allows a video projector to produce more than 250 lumens incident on the viewing screen. In order to view content at a reasonable size and ambient light level, this level of illumination or greater is required.

Furthermore, specific examples are given for mixing four and five colors. The invention can also be implemented for greater than five sources.

Also, the examples primarily discuss use with projectors, such as video projectors. However, aspects of the invention can be used in the context of direct view displays of video. Also, as briefly mentioned, aspects of the invention can be used in light projectors for lighting applications, as opposed to projecting or displaying video content. Entertainment, stage, film, architectural, and studio lighting, as well as underwater lighting are other examples. TV, home theatre, commercial movie theatre, and dynamic or static content based signage, handheld devices (iPod, cell phone, laptop), console or computer video games, and monitors are other possible applications.

Additionally, certain aspects of the invention can be used independently of other aspects. For example, FIG. 17 illustrates how color mixing algorithm 100, error correction algorithm 200, SACC™ contrast control 300, and active heat management 942 can be used together. It is to be understood, however, that color mixing algorithm can be used independently of these other aspects for a variety of application so long as more than three colors are mixed. Error correction algorithm 200 could be used with any light source and is not limited to four or more light source systems. Similarly, SACC™ contrast control is not limited to use with algorithms 100 and/or 200, nor is active heat management.

What is claimed is:

1. A light projector comprising:
a housing;
a lens operatively positioned on the housing;
a light engine configured for use to output a color represented in more than three primary colors, the light engine comprising a solid state light source, a substrate, an input adapted for operative connection to an instruction source, and a thermal management system, the light engine adapted to take in a target color and output the color represented in more than three primary colors;
a processor with a memory storage device; and
software operatively loaded on the memory storage device comprising a color mixing algorithm, wherein the processor is configured to operate on the color mixing algorithm to compute proportion of light from each of the three primary colors to create a target color in a deterministic manner.

2. The light projector of claim 1 wherein the solid state light source is a light emitting diode.

3. The light projector of claim 1 wherein the thermal management system comprising a heat spreader.

4. The light projector of claim 3 wherein the heat spreader comprises a heat pipe.

5. The light projector of claim 4 wherein the heat pipe comprises a planar vapor chamber.

6. The light projector of claim 1 wherein the thermal management system comprises an active thermal transfer device.

7. The light projector of claim 6 wherein the active thermal transfer device comprises a thermoelectric cooler.

8. The light projector of claim 1 wherein the thermal management system comprises a cooling fluid circulation system.

9. The light projector of claim 8 wherein the cooling fluid circulation system passes through a radiator.

10. The light projector of claim 8 wherein the cooling fluid circulation system further comprises a cold plate.

11. The light projector of claim 10 wherein the solid state light source is directly attached to the cold plate.

12. The light projector of claim 1 wherein the software further comprises dynamic contrast control.

13. The light projector of claim 1 further comprising a display device in operative association with the light engine.

14. The light projector of claim 1 wherein the instruction source comprises a high definition (HD) signal.

15. The light projector of claim 14 wherein the HD signal is an high definition multimedia interface (HDMI) signal.

16. A light projector comprising:
a housing;
a lens operatively positioned on the housing;
a light engine configured for use to output a color represented in more than three primary colors, the light engine comprising a solid state light source, a substrate, an input adapted for operative connection to an instruction source, and a thermal management system, the light engine adapted to take in a target color and output the color represented in more than three primary colors; and
a color correction subsystem comprising a color sensor adapted sense color to monitor the color output and intensity and a processor configured to operate on software to compensate for offset between the sensed color and a target color from the instruction source.

17. The light projector of claim 16 wherein the color correction subsystem is further configured to adjust operation of the light source to reduce or eliminate the sensed offset.

18. A light projector comprising:
a housing;
a lens operatively positioned on the housing;
a light engine configured for use to output a color represented in more than three primary colors, the light engine comprising a solid state light source, a substrate, an input adapted for operative connection to an instruction source, and a thermal management system, the light engine adapted to take in a target color and output the color represented in more than three primary colors; and
an operating characteristic compensation subsystem comprising a sensor, wherein:
the the sensor is adapted to generate a signal representative of an operating characteristic of the light source; and the operating characteristic compensation subsystem is adapted to compare the signal to a reference value and produce an output signal to the light engine to adjust operation of the light engine to reduce or eliminate any difference between the signal and the reference value.

19. The light projector of claim 18 wherein the operating characteristics comprise one or more of temperature, lumen depreciation, or cumulative operating time.

* * * * *

UNITED STATES PATENT AND TRADEMARK OFFICE
CERTIFICATE OF CORRECTION

PATENT NO. : 10,008,178 B2
APPLICATION NO. : 14/147109
DATED : June 26, 2018
INVENTOR(S) : Garrett Joseph Young It is certified that error appears in the above-identified patent and that said Letters Patent is hereby corrected as shown below:

On the Title Page

In Column 1, under "Related U.S. Application Data", Line 1, delete "(60)" and insert --(63)-- therefor On page 2, in Column 2, under "Other Publications", Line 48, delete "Heatpipe?"," and insert --Heat pipe?",-- therefor In the Claims In Column 38, Line 65, in Claim 18, delete "the the" and insert --the-- therefor Signed and Sealed this
Twenty-fifth Day of June, 2019

Andrei Iancu
*Director of the United States Patent and Trademark Office*